(12) United States Patent
Douglas et al.

(10) Patent No.: US 12,529,490 B2
(45) Date of Patent: Jan. 20, 2026

(54) INFECTION CONTROL TOOL FOR HVAC SYSTEM

(71) Applicant: Tyco Fire & Security GmbH, Neuhausen am Rheinfall (CH)

(72) Inventors: Jonathan D. Douglas, Mequon, WI (US); Kirk H. Drees, Cedarburg, WI (US); Michael J. Risbeck, Madison, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 764 days.

(21) Appl. No.: 17/459,963

(22) Filed: Aug. 27, 2021

(65) Prior Publication Data

US 2022/0065479 A1  Mar. 3, 2022

Related U.S. Application Data

(63) Continuation-in-part of application No. 17/393,138, filed on Aug. 3, 2021, now Pat. No. 12,222,124,
(Continued)

(51) Int. Cl.
*F24F 11/46* (2018.01)
*F24F 8/10* (2021.01)
(Continued)

(52) U.S. Cl.
CPC ............... *F24F 11/46* (2018.01); *F24F 8/10* (2021.01); *F24F 8/22* (2021.01); *F24F 8/95* (2021.01); *F24F 11/63* (2018.01)

(58) Field of Classification Search
None
See application file for complete search history.

(56) References Cited

U.S. PATENT DOCUMENTS

| 5,497,452 A | 3/1996 | Shimizu et al. |
| 6,988,671 B2 | 1/2006 | Deluca |

(Continued)

FOREIGN PATENT DOCUMENTS

| CN | 2644960 Y | 9/2004 |
| CN | 1916514 A | 2/2007 |

(Continued)

OTHER PUBLICATIONS

Noakes, C.J. and Sleigh, P.A. (2008) Applying the Wells-Riley equation to the risk of airborne infection in hospital environments: The importance of stochastic and proximity effects. In: Indoor Air 2008, White Rose. URL:http://eprints.whiterose.ac.uk/7702/ (Year: 2008).*

(Continued)

*Primary Examiner* — Thomas C Lee
*Assistant Examiner* — Anzuman Sharmin
(74) *Attorney, Agent, or Firm* — Foley & Lardner LLP

(57) ABSTRACT

An infection control tool for a building HVAC system includes processing circuitry configured to receive one or more inputs defining a HVAC system configuration for each of a baseline scenario and one or more other scenarios. The processing circuitry is also configured to estimate infection risk and at least one of energy consumption or operating cost for each of the one or more other scenarios relative to the baseline scenario. The processing circuitry is also configured to operate a display to provide the infection risk and at least one of the energy consumption or operating cost to a user.

20 Claims, 24 Drawing Sheets

Related U.S. Application Data which is a continuation of application No. 16/927,766, filed on Jul. 13, 2020, now Pat. No. 11,131,473.

(60) Provisional application No. 62/873,631, filed on Jul. 12, 2019, provisional application No. 63/044,906, filed on Jun. 26, 2020, provisional application No. 63/071,910, filed on Aug. 28, 2020.

(51) Int. Cl.
*F24F 8/22* (2021.01)
*F24F 8/95* (2021.01)
*F24F 11/63* (2018.01)

(56) References Cited

U.S. PATENT DOCUMENTS

| | | | |
|---|---|---|---|
| 7,025,281 B2 | 4/2006 | Deluca | |
| 7,099,895 B2 | 8/2006 | Dempsey | |
| 7,150,408 B2 | 12/2006 | Deluca | |
| 7,222,494 B2 | 5/2007 | Peterson et al. | |
| 7,311,752 B2 | 12/2007 | Tepper et al. | |
| 7,394,370 B2 | 7/2008 | Chan | |
| 7,580,775 B2 | 8/2009 | Kulyk et al. | |
| 7,788,189 B2 | 8/2010 | Budike, Jr. | |
| 7,817,046 B2 | 10/2010 | Coveley et al. | |
| 7,894,946 B2 | 2/2011 | Kulyk et al. | |
| 7,941,096 B2 | 5/2011 | Perkins et al. | |
| 8,049,614 B2 | 11/2011 | Kahn et al. | |
| 8,405,503 B2 | 3/2013 | Wong | |
| 8,473,080 B2 | 6/2013 | Seem et al. | |
| 8,527,108 B2 | 9/2013 | Kulyk et al. | |
| 8,527,109 B2 | 9/2013 | Kulyk et al. | |
| 8,862,448 B2 | 10/2014 | Holmes et al. | |
| 8,867,993 B1 | 10/2014 | Perkins et al. | |
| 8,918,223 B2 | 12/2014 | Kulyk et al. | |
| 8,984,464 B1 | 3/2015 | Tabula | |
| 9,002,532 B2 | 4/2015 | Asmus | |
| 9,075,909 B2 | 7/2015 | Almogy et al. | |
| 9,110,647 B2 | 8/2015 | Kulyk et al. | |
| 9,235,657 B1 | 1/2016 | Wenzel et al. | |
| 9,383,736 B2 | 7/2016 | Honda et al. | |
| 9,429,923 B2 | 8/2016 | Ward et al. | |
| 9,436,179 B1 | 9/2016 | Turney et al. | |
| 9,465,392 B2 | 10/2016 | Bradley et al. | |
| 9,612,601 B2 | 4/2017 | Beyhaghi et al. | |
| 9,618,224 B2 | 4/2017 | Emmons et al. | |
| 9,696,054 B2 | 7/2017 | Asmus et al. | |
| 9,703,339 B2 | 7/2017 | Kulyk et al. | |
| 9,741,233 B2 | 8/2017 | Laufer et al. | |
| 9,778,639 B2 | 10/2017 | Boettcher et al. | |
| 9,810,441 B2 | 11/2017 | Dean-Hendricks et al. | |
| 9,915,438 B2 | 3/2018 | Cheatham et al. | |
| 9,982,903 B1 | 5/2018 | Ridder et al. | |
| 10,007,259 B2 | 6/2018 | Turney et al. | |
| 10,068,116 B2 | 9/2018 | Good et al. | |
| 10,071,177 B1 | 9/2018 | Kellogg | |
| 10,088,814 B2 | 10/2018 | Wenzel et al. | |
| 10,101,730 B2 | 10/2018 | Wenzel et al. | |
| 10,101,731 B2 | 10/2018 | Asmus et al. | |
| 10,139,877 B2 | 11/2018 | Kulyk et al. | |
| 10,175,681 B2 | 1/2019 | Wenzel et al. | |
| 10,190,789 B2 | 1/2019 | Mueller et al. | |
| 10,198,779 B2 | 2/2019 | Pittman et al. | |
| 10,251,610 B2 | 4/2019 | Parthasarathy et al. | |
| 10,302,318 B1 | 5/2019 | Chambers | |
| 10,359,748 B2 | 7/2019 | Elbsat et al. | |
| 10,418,833 B2 | 9/2019 | Wenzel et al. | |
| 10,528,020 B2 | 1/2020 | Drees | |
| 10,678,227 B2 | 6/2020 | Przybylski et al. | |
| 10,706,375 B2 | 7/2020 | Wenzel et al. | |
| 10,718,542 B2 | 7/2020 | Alanqar et al. | |
| 10,884,398 B2 | 1/2021 | Elbsat et al. | |
| 10,928,784 B2 | 2/2021 | Craig et al. | |
| 11,068,821 B2 | 7/2021 | Wenzel et al. | |
| 11,101,651 B2 * | 8/2021 | Pavlak | G05B 13/045 |
| 11,131,473 B2 | 9/2021 | Risbeck et al. | |
| 11,137,163 B2 | 10/2021 | Nasis | |
| 11,164,126 B2 | 11/2021 | Elbsat et al. | |
| 11,181,289 B2 | 11/2021 | Federspiel et al. | |
| 11,182,714 B2 | 11/2021 | Wenzel et al. | |
| 11,269,306 B2 | 3/2022 | Risbeck et al. | |
| 11,274,842 B2 | 3/2022 | Gamroth et al. | |
| 11,436,386 B2 | 9/2022 | Motahar | |
| 11,513,486 B2 | 11/2022 | Kupa et al. | |
| 11,668,481 B2 | 6/2023 | Granger et al. | |
| 2002/0165671 A1 | 11/2002 | Middya | |
| 2003/0055798 A1 | 3/2003 | Hittle et al. | |
| 2006/0271210 A1 | 11/2006 | Subbu et al. | |
| 2007/0101688 A1 | 5/2007 | Wootton et al. | |
| 2007/0150333 A1 | 6/2007 | Hurst et al. | |
| 2007/0202798 A1 | 8/2007 | Billiotte et al. | |
| 2007/0219645 A1 | 9/2007 | Thomas et al. | |
| 2008/0206767 A1 | 8/2008 | Kreiswirth et al. | |
| 2008/0243273 A1 | 10/2008 | Robert et al. | |
| 2009/0065596 A1 | 3/2009 | Seem et al. | |
| 2009/0078120 A1 | 3/2009 | Kummer et al. | |
| 2009/0117798 A1 | 5/2009 | Takashima et al. | |
| 2009/0126382 A1 | 5/2009 | Rubino et al. | |
| 2009/0265106 A1 | 10/2009 | Bearman et al. | |
| 2009/0292465 A1 | 11/2009 | Kaldewey et al. | |
| 2010/0047115 A1 | 2/2010 | Krichtafovitch et al. | |
| 2010/0175556 A1 | 7/2010 | Kummer et al. | |
| 2010/0187443 A1 | 7/2010 | Leben | |
| 2010/0198611 A1 | 8/2010 | Ruoff et al. | |
| 2011/0093249 A1 | 4/2011 | Holmes et al. | |
| 2011/0172981 A1 | 7/2011 | Al-Hashimi et al. | |
| 2011/0231320 A1 | 9/2011 | Irving | |
| 2012/0112883 A1 | 5/2012 | Wallace et al. | |
| 2012/0130547 A1 | 5/2012 | Fadell et al. | |
| 2012/0199003 A1 | 8/2012 | Melikov et al. | |
| 2013/0166268 A1 | 6/2013 | Leonard et al. | |
| 2014/0039689 A1 | 2/2014 | Honda et al. | |
| 2014/0167917 A2 | 6/2014 | Wallace et al. | |
| 2014/0236869 A1 | 8/2014 | Fujimaki et al. | |
| 2014/0260692 A1 | 9/2014 | Sharp | |
| 2014/0283682 A1 | 9/2014 | Hamann et al. | |
| 2014/0324404 A1 | 10/2014 | De La Torre-Bueno | |
| 2014/0356229 A1 | 12/2014 | Farren | |
| 2015/0028114 A1 | 1/2015 | Rosen | |
| 2015/0053366 A1 | 2/2015 | Melsheimer | |
| 2015/0097688 A1 | 4/2015 | Bruck et al. | |
| 2015/0109442 A1 | 4/2015 | Derenne et al. | |
| 2015/0149257 A1 | 5/2015 | Bielat et al. | |
| 2015/0190538 A1 | 7/2015 | Olvera et al. | |
| 2015/0227848 A1 | 8/2015 | Amid et al. | |
| 2015/0278968 A1 | 10/2015 | Steven et al. | |
| 2015/0316901 A1 | 11/2015 | Wenzel et al. | |
| 2015/0316907 A1 | 11/2015 | Elbsat et al. | |
| 2015/0331972 A1 | 11/2015 | Mcclure et al. | |
| 2015/0354874 A1 | 12/2015 | Cur et al. | |
| 2016/0066068 A1 | 3/2016 | Schultz et al. | |
| 2016/0091904 A1 | 3/2016 | Horesh et al. | |
| 2016/0109149 A1 | 4/2016 | Heller | |
| 2016/0116181 A1 | 4/2016 | Aultman et al. | |
| 2016/0210337 A1 | 7/2016 | Constandt | |
| 2016/0306934 A1 | 10/2016 | Sperry et al. | |
| 2016/0313751 A1 | 10/2016 | Risbeck et al. | |
| 2016/0377306 A1 | 12/2016 | Drees et al. | |
| 2017/0003676 A1 | 1/2017 | Yoshida et al. | |
| 2017/0011150 A1 | 1/2017 | Sons et al. | |
| 2017/0016644 A1 | 1/2017 | Nagarathinam et al. | |
| 2017/0031962 A1 | 2/2017 | Turney et al. | |
| 2017/0039339 A1 | 2/2017 | Bitran et al. | |
| 2017/0082305 A1 | 3/2017 | Law | |
| 2017/0097163 A1 | 4/2017 | Law et al. | |
| 2017/0097616 A1 | 4/2017 | Cozad et al. | |
| 2017/0102162 A1 | 4/2017 | Drees et al. | |
| 2017/0103483 A1 | 4/2017 | Drees et al. | |
| 2017/0104336 A1 | 4/2017 | Elbsat et al. | |
| 2017/0104342 A1 | 4/2017 | Elbsat et al. | |
| 2017/0104343 A1 | 4/2017 | Elbsat et al. | |
| 2017/0104345 A1 | 4/2017 | Wenzel et al. | |
| 2017/0123440 A1 | 5/2017 | Mangsuli et al. | |

(56) References Cited

U.S. PATENT DOCUMENTS

| | | |
|---|---|---|
| 2017/0147722 A1 | 5/2017 | Greenwood |
| 2017/0176030 A1 | 6/2017 | Emmons et al. |
| 2017/0179716 A1 | 6/2017 | Vitullo et al. |
| 2017/0193792 A1 | 7/2017 | Bermudez Rodriguez et al. |
| 2017/0206334 A1 | 7/2017 | Huang |
| 2017/0211837 A1 | 7/2017 | Gupta et al. |
| 2017/0212488 A1 | 7/2017 | Kummer et al. |
| 2017/0241658 A1 | 8/2017 | Salsbury et al. |
| 2017/0246331 A1 | 8/2017 | Lloyd |
| 2017/0300657 A1* | 10/2017 | Barrett ................... G16H 50/50 |
| 2017/0312379 A1 | 11/2017 | Stibich et al. |
| 2017/0350611 A1 | 12/2017 | Su et al. |
| 2017/0351832 A1 | 12/2017 | Cahan et al. |
| 2017/0352119 A1 | 12/2017 | Pittman et al. |
| 2018/0004173 A1 | 1/2018 | Patel et al. |
| 2018/0011459 A1 | 1/2018 | Boettcher et al. |
| 2018/0052970 A1 | 2/2018 | Boss et al. |
| 2018/0075549 A1 | 3/2018 | Turney et al. |
| 2018/0087791 A1 | 3/2018 | Monkkonen et al. |
| 2018/0110416 A1 | 4/2018 | Masuda et al. |
| 2018/0117209 A1 | 5/2018 | Clack et al. |
| 2018/0150601 A1 | 5/2018 | Astigarraga |
| 2018/0157535 A1 | 6/2018 | Dushok |
| 2018/0163987 A1* | 6/2018 | Rackes ................ F24F 11/0001 |
| 2018/0185533 A1 | 7/2018 | Lalicki |
| 2018/0196456 A1 | 7/2018 | Elbsat |
| 2018/0197253 A1 | 7/2018 | Elbsat et al. |
| 2018/0204162 A1 | 7/2018 | Endel et al. |
| 2018/0209674 A1 | 7/2018 | Ridder et al. |
| 2018/0209675 A1 | 7/2018 | Ridder |
| 2018/0254632 A1 | 9/2018 | Elbsat et al. |
| 2018/0259918 A1 | 9/2018 | Asmus et al. |
| 2018/0285800 A1 | 10/2018 | Wenzel et al. |
| 2018/0299151 A1 | 10/2018 | Ajax et al. |
| 2018/0306459 A1 | 10/2018 | Turney |
| 2018/0313563 A1 | 11/2018 | Turney et al. |
| 2018/0314220 A1 | 11/2018 | Kumar et al. |
| 2018/0318746 A1 | 11/2018 | Thomas |
| 2018/0341255 A1 | 11/2018 | Turney et al. |
| 2018/0356770 A1 | 12/2018 | Elbsat et al. |
| 2018/0356782 A1 | 12/2018 | Elbsat et al. |
| 2018/0357577 A1 | 12/2018 | Elbsat et al. |
| 2018/0372355 A1 | 12/2018 | Mosamkar et al. |
| 2019/0011145 A1 | 1/2019 | Willmott et al. |
| 2019/0020203 A1 | 1/2019 | Lang et al. |
| 2019/0023099 A1 | 1/2019 | Li et al. |
| 2019/0025774 A1 | 1/2019 | Wenzel et al. |
| 2019/0032942 A1 | 1/2019 | Willmott et al. |
| 2019/0032943 A1 | 1/2019 | Willmott et al. |
| 2019/0032944 A1 | 1/2019 | Wenzel et al. |
| 2019/0032945 A1 | 1/2019 | Willmott et al. |
| 2019/0032947 A1 | 1/2019 | Willmott et al. |
| 2019/0032949 A1 | 1/2019 | Willmott et al. |
| 2019/0056126 A1 | 2/2019 | Law et al. |
| 2019/0066236 A1 | 2/2019 | Wenzel |
| 2019/0096233 A1 | 3/2019 | Bruck et al. |
| 2019/0107825 A1 | 4/2019 | Wenzel et al. |
| 2019/0108746 A1 | 4/2019 | Chang et al. |
| 2019/0148023 A1 | 5/2019 | Sadilek et al. |
| 2019/0163213 A1 | 5/2019 | Ostrye et al. |
| 2019/0163216 A1 | 5/2019 | Ostrye |
| 2019/0209806 A1 | 7/2019 | Allen et al. |
| 2019/0213695 A1 | 7/2019 | Elbsat et al. |
| 2019/0216957 A1 | 7/2019 | Hawkins et al. |
| 2019/0219293 A1 | 7/2019 | Wenzel et al. |
| 2019/0245368 A1 | 8/2019 | Baumgartner et al. |
| 2019/0249897 A1 | 8/2019 | Alcala Perez et al. |
| 2019/0257544 A1 | 8/2019 | Alanqar et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0321504 A1 | 10/2019 | Dayton |
| 2019/0325368 A1 | 10/2019 | Turney et al. |
| 2019/0328920 A1 | 10/2019 | Stibich et al. |
| 2019/0331358 A1 | 10/2019 | Ritmanich et al. |
| 2019/0338974 A1 | 11/2019 | Turney et al. |
| 2019/0339661 A1 | 11/2019 | Pancholi et al. |
| 2019/0347622 A1 | 11/2019 | Elbsat et al. |
| 2020/0009280 A1 | 1/2020 | Kupa |
| 2020/0026249 A1 | 1/2020 | Przybylski et al. |
| 2020/0090089 A1 | 3/2020 | Aston et al. |
| 2020/0090289 A1 | 3/2020 | Elbsat et al. |
| 2020/0096958 A1 | 3/2020 | Kelly et al. |
| 2020/0096985 A1 | 3/2020 | Wenzel et al. |
| 2020/0103127 A1 | 4/2020 | Chen et al. |
| 2020/0124307 A1 | 4/2020 | Ota et al. |
| 2020/0125045 A1 | 4/2020 | Risbeck et al. |
| 2020/0141604 A1* | 5/2020 | Chen ....................... F24F 11/47 |
| 2020/0141734 A1 | 5/2020 | Casarez et al. |
| 2020/0151836 A1* | 5/2020 | Lingras ................ G06Q 50/163 |
| 2020/0176124 A1 | 6/2020 | Chatterjea et al. |
| 2020/0176125 A1 | 6/2020 | Chatterjea et al. |
| 2020/0193345 A1 | 6/2020 | Elbsat et al. |
| 2020/0200416 A1* | 6/2020 | Granger ................. G16H 40/67 |
| 2020/0218208 A1 | 7/2020 | Alanqar et al. |
| 2020/0227159 A1 | 7/2020 | Boisvert et al. |
| 2020/0292186 A1* | 9/2020 | Ishibashi ................... F24F 7/06 |
| 2020/0301408 A1 | 9/2020 | Elbsat et al. |
| 2020/0334967 A1 | 10/2020 | Sharma et al. |
| 2020/0348038 A1 | 11/2020 | Risbeck et al. |
| 2020/0355391 A1 | 11/2020 | Wenzel et al. |
| 2020/0356087 A1 | 11/2020 | Elbsat et al. |
| 2020/0365229 A1* | 11/2020 | Fields ..................... G16H 10/40 |
| 2021/0010701 A1 | 1/2021 | Nesler et al. |
| 2021/0011443 A1 | 1/2021 | Mcnamara et al. |
| 2021/0011444 A1 | 1/2021 | Risbeck et al. |
| 2021/0018211 A1 | 1/2021 | Ellis et al. |
| 2021/0043330 A1 | 2/2021 | Ikeshima |
| 2021/0072742 A1 | 3/2021 | Wu et al. |
| 2021/0173366 A1 | 6/2021 | Turney et al. |
| 2021/0193309 A1 | 6/2021 | Boisvert et al. |
| 2021/0313075 A1 | 10/2021 | Mc Namara et al. |
| 2021/0318010 A1* | 10/2021 | Federspiel ............... F24F 11/80 |
| 2021/0322613 A1 | 10/2021 | Lacaze et al. |
| 2021/0364181 A1 | 11/2021 | Risbeck et al. |
| 2021/0390807 A1 | 12/2021 | Chaurasia et al. |
| 2021/0390812 A1 | 12/2021 | Chaurasia et al. |
| 2021/0391089 A1 | 12/2021 | Eswara et al. |
| 2021/0393834 A1 | 12/2021 | Wellig |
| 2021/0398659 A1 | 12/2021 | Sharma et al. |
| 2021/0398690 A1 | 12/2021 | Gibson et al. |
| 2021/0398691 A1 | 12/2021 | Dhamija et al. |
| 2022/0011731 A1 | 1/2022 | Risbeck et al. |
| 2022/0035326 A1 | 2/2022 | Peters et al. |
| 2022/0054687 A1 | 2/2022 | Forzani et al. |
| 2022/0060856 A1 | 2/2022 | Wellig et al. |
| 2022/0062463 A1 | 3/2022 | Ramer et al. |
| 2022/0065479 A1 | 3/2022 | Douglas et al. |
| 2022/0092500 A1 | 3/2022 | Drees et al. |
| 2022/0172830 A1 | 6/2022 | Brooks et al. |
| 2022/0203287 A1 | 6/2022 | Wenger et al. |
| 2022/0203288 A1 | 6/2022 | Wenger et al. |
| 2022/0205962 A1 | 6/2022 | Vanderkoy |
| 2022/0207215 A1 | 6/2022 | Liu et al. |
| 2022/0221184 A1 | 7/2022 | Gupta et al. |
| 2022/0228756 A1 | 7/2022 | Gupta et al. |
| 2022/0254483 A1 | 8/2022 | Boisvert et al. |
| 2022/0277851 A1 | 9/2022 | Wellig |
| 2022/0282886 A1 | 9/2022 | Hriljac et al. |
| 2022/0293261 A1 | 9/2022 | Mcbrady et al. |
| 2022/0305438 A1 | 9/2022 | Wenger et al. |
| 2022/0305881 A1 | 9/2022 | Neu et al. |
| 2023/0120290 A1* | 4/2023 | Baarman ................ G16H 10/65 15/3 |
| 2023/0248869 A1 | 8/2023 | Bell |
| 2023/0250988 A1 | 8/2023 | Risbeck et al. |
| 2023/0324864 A1 | 10/2023 | Bursch et al. |
| 2024/0165286 A1 | 5/2024 | Bonutti et al. |
| 2024/0321438 A1* | 9/2024 | Byrne ..................... G16H 10/65 |

FOREIGN PATENT DOCUMENTS

| | | |
|---|---|---|
| CN | 101194129 A | 6/2008 |
| CN | 201173923 Y | 12/2008 |

(56) References Cited

FOREIGN PATENT DOCUMENTS

| | | |
|---|---|---|
| CN | 101387428 A | 3/2009 |
| CN | 101692025 A | 4/2010 |
| CN | 201517972 U | 6/2010 |
| CN | 201558243 U | 8/2010 |
| CN | 101861552 A | 10/2010 |
| CN | 202568950 U | 12/2012 |
| CN | 203727247 U | 7/2014 |
| CN | 105805888 A | 7/2016 |
| CN | 106415139 A | 2/2017 |
| CN | 106975279 A | 7/2017 |
| CN | 107250928 A | 10/2017 |
| CN | 107252594 A | 10/2017 |
| CN | 107477782 A | 12/2017 |
| CN | 107613895 A | 1/2018 |
| CN | 207035361 U | 2/2018 |
| CN | 107787469 A | 3/2018 |
| CN | 107917484 A | 4/2018 |
| CN | 108507057 A | 9/2018 |
| CN | 108779925 A | 11/2018 |
| CN | 108980988 A | 12/2018 |
| CN | 109196286 A | 1/2019 |
| CN | 109405151 A | 3/2019 |
| CN | 110529988 A | 12/2019 |
| CN | 110671798 A | 1/2020 |
| CN | 110822616 A | 2/2020 |
| CN | 111370135 A * | 7/2020 |
| EP | 1 156 286 A2 | 11/2001 |
| FR | 3031800 A1 | 7/2016 |
| JP | 2010-128976 A | 6/2010 |
| JP | 2012-533720 A | 12/2012 |
| JP | 2015-152175 A | 8/2015 |
| JP | 2016-138705 A | 8/2016 |
| JP | 06-455326 B2 | 1/2019 |
| KR | 20160137767 A | 12/2016 |
| KR | 20170096092 A | 8/2017 |
| KR | 20170115913 A | 10/2017 |
| KR | 101865143 B1 | 6/2018 |
| KR | 20200047457 A | 5/2020 |
| WO | WO-2009/157847 A1 | 12/2009 |
| WO | WO-2012/161804 A1 | 11/2012 |
| WO | WO-2013/130956 A1 | 9/2013 |
| WO | WO-2016/047103 A1 | 3/2016 |
| WO | WO-2016/105347 A1 | 6/2016 |
| WO | WO-2017/109206 A1 | 6/2017 |
| WO | WO-2017/203031 A1 | 11/2017 |
| WO | WO-2018/160412 A1 | 9/2018 |
| WO | WO-2018/226564 A1 | 12/2018 |
| WO | WO-2019/050154 A1 | 3/2019 |
| WO | WO-2019/051893 A1 | 3/2019 |
| WO | WO-2019/157514 A2 | 8/2019 |
| WO | WO-2021/258116 A1 | 12/2021 |
| WO | WO-2022/098887 A1 | 5/2022 |

OTHER PUBLICATIONS

Applying the Wells-Riley equation to the risk of airborne infection in hospital environments: The importance of stochastic and proximity effects. In: Indoor Air 2008: The 11th International Conference on Indoor Air Quality and CL Indoor Air 2008, Aug. 17-22, 2008, Copenhagen, Denmark., Copenhagen) (Year: 2008).*
Chinese Office Action on CN Appl. No. 202080061895.3 dated Sep. 25, 2023 (12 pages with English machine translation).
International Search Report and Written Opinion on PCT Appl. No. PCT/US2023/020060 dated Sep. 15, 2023 (20 pages).
Chinese Office Action on CN Appl. No. 202080061895.3 dated Jan. 20, 2023 (6 pages).
PCT Invitation to Pay Additional Fees and Where Applicable, Protest Fee for Appl. Ser. No. PCT/US2023/020060 dated Jul. 18, 2023 (14 pages).
Yang et al., "Multi-Objective Particle Swarm Optimization for decision-making in building automation," Power and Energy Society General Meeting, Jul. 24, 2011, IEEE (pp. 1-5).
International Search Report and Written Opinion on PCT Appl. No. PCT/US2022/040332 dated Nov. 22, 2022 (18 pages).
Noakes et al., "Appraising healthcare ventilation design from combined infection control and energy perspective," HVAC & R Research, Aug. 2012, (20 pages).
Azimi et al., "HVAC filtration for controlling infectious airborne disease transmission in indoor environments: Predicting risk reductions and operational costs," Building and Environment, May 2013, vol. 70 (pp. 150-160).
Beggs et al., "Potential for airborne transmission of infection in the waiting areas of healthcare premises: stochastic analysis using a Monte Carlo model," BMC Infectious Diseases, Aug. 2010, vol. 10 (11 pages).
Ben-David et al., "Interplay of ventilation and filtration: Differential analysis of cost function combining energy use and indoor exposure to PM2.5 and ozone," Building and Environment, Aug. 2017, vol. 128 (pp. 320-335).
Gao et al., "Potential impact of a ventilation intervention for influenza in the context of a dense indoor contact network in Hong Kong," Science of the Total Environment, Apr. 2016, vols. 569-570 (pp. 373-381).
Chinese Office Action on CN Appl. No. 202080057416.0 dated Dec. 30, 2022 (12 pages).
Chinese Office Action on CN Appl. No. 202080057416.0 dated Aug. 30, 2023 (37 pages with English language translation).
European Office Action on EP Appl. No. 20750965.4 dated Mar. 31, 2023 (5 pages).
Aliabadi et al., "Preventing Airborne Disease Transmission: Review of Methods for Ventilation Design in Health Care Facilities," SAGE-Hindawi Access to Research Advances in Preventive Medicine, Feb. 2011, vol. 2011, 21 pages.
Azimi et al., "HVAC filtration for controlling infectious airborne disease transmission in indoor environments: Predicting risk reductions and operational costs," Building and Environment, May 13, 2013, 70, pp. 150-160.
Buaonanno et al., "Estimation of Airborne Viral Emission: Quanta Emission Rate of SARS-CoV-2 for Infection Risk Assessment," Environment International, 2020, 141, 105794, 9 pages.
CDC—Centers for Disease Control and Prevention, "How Flu Spreads," URL: https://www.cdc.gov/flu/about/disease/spread.htm, Aug. 27, 2018, 1 page.
CDC—Centers for Disease Control and Prevention, "Interim Clinical Guidance for Management of Patients with Confirmed Coronavirus Disease (COVID_19)," URL: https://www.cdc.gov/coronavirus/2019-ncov/hcp/clinical-guidance-management-patients.html, Feb. 2021, 14 pages.
Ching, "An empirical drag coefficient model for simulating the dispersion and deposition of bioaerosol particles in ventilated environments," The Hong Kong Polytechnic University Department of Building Services Engineering, Jun. 2016, 345 pages.
CIRES—Cooperative Institute for Research in Environmental Sciences, "Covid-19 Airborne Transmission Tool Available: New model estimates COVID-19 transmission in classrooms, buses, protests, more," URL: https://cires.colorado.edu/news/covid-19-airborne-transmission-tool-available, Jun. 25, 2020, 7 pages.
Copeland, "The Impact of Patient Room Design on Airborne Hospital-Acquired Infections (HAI)," Thesis, Kent State University, Degree of Masters of Science in Architecture and Environmental Design, May 2016, 61 pages.
EPA—U.S. Environmental Protection Agency, "Exposure Factors Handbook," URL: https://www.epa.gov/expobox/about-exposure-factors-handbook, 2011, 6 pages.
EPA—U.S. Environmental Protection Agency, "Greenhouse Gases Equivalences Calculator-Calculations and References", URL: https://www.epa.gov/energy/greenhouse-gases-equivalencies-calculator-calculations-and-references, retrieved from the internet Sep. 30, 3031, 32 pages.
Fears et al., "Comparative Dynamic Aerosol Efficiencies of Three Emergent Coronaviruses and the Unusual Persistence of Sars-Cov-2 in Aerosol Suspensions," URL: https://www.ncbi.nlm.nih.gov/pmc/articles/PMC7217084/, Apr. 18, 2020, 8 pages.
International Search Report and Written Opinion on PCT/US2020/041770, dated Nov. 3, 2020, 13 pages.

(56) References Cited

OTHER PUBLICATIONS

International Search Report and Written Opinion on PCT/US2020/041792, dated Sep. 30, 15 pages.

International Search Report and Written Opinion on PCT/US2020/041845, dated Jan. 13, 2021, 20 pages.

Joe et al., "Methodology for Modeling the Microbial Contamination of Air Filters," PLoS One 9(2) e88514, URL: https://doi.org/10.1371/journal.pone.0088514, Feb. 11, 2014, 9 pages.

Johnson et al., "Modality of human expired aerosol size distributions," Journal of Aerosol Science, 2011, 42(12), pp. 839-851.

Kanaan et al., "New airborne pathogen transport model for upper-room UVGI spaces conditioned by chilled ceiling and mixed displacement ventilation: Enhancing air quality and energy performance," Energy Conversion and Management, Apr. 12, 2014, 85, pp. 50-61.

Kowalski, W., "Ultraviolet germicidal irradiation handbook: UVGI for air and surface disinfection," Springer Science & Business Media, 2010, 504 pages.

Kumar, "A Simulation Framework to Characterize the Effect of Ventilation Control on Airborne Infectious Disease Transmission in Schools," Thesis, Graduate School of The University of Texas at Austin, May 2019, 53 pages.

Liao et al., "A Probabilistic Transmission Dynamic Model to Assess Indoor Airborne Infection Risks," Risk Analysis, 2005, vol. 25, No. 5, pp. 1097-1107.

Marr et al., "SARS-CoV-2 in Indoor Air: Principles and Scenarios," US EPA Indoor Air Quality Science Webinar, YouTube URL: https://www.youtube.com/watch?v=fSQ0ah_OArU, Jul. 21, 2020, 113 pages.

National Geographic, "Measure the risk of airborne COVID-19 in your office, classroom, or bus ride," URL: https://www.nationalgeographic.com/science/article/how-to-measure-risk-airborne-coronavirus-your-office-classroom-bus-ride-cvd, Aug. 11, 2020, 12 pages.

Noakes et al., "Applying the Wells-Riley equation to the risk of airborne infection in hospital environments: The importance of stochastic and proximity effects," Indoor Air 2008, The 11th Intl Conference on Indoor Air Quality and CI, Aug. 17-22, 2008, Copenhagen, Denmark, 9 pages.

Noakes et al., "Mathematical models for assessing the role of airflow on the risk of airborne infection in hospital wards," Journal of the Royal Society Interface, 2009, 6, S791-S800, 10 pages.

Noakes et al., "Modelling the transmission of airborne infections in enclosed spaces," Epidemiol. Infect, 2006, vol. 134, pp. 1082-1091.

Stephens, "HVAC filtration and the Wells-Riley approach to assessing risks of infectious airborne diseases," The National Air Filtration Association (NAFA) Foundation, Mar. 1, 2012, 47 pages.

Sze et al., "Review and Comparison Between the Wells-Riley and Dose-Response Approaches to Risk Assessment of Infectious Respiratory Diseases," Indoor Air, 2010, 20, pp. 2-16.

Van Doremalen et al., "Aerosol and Surface Stability of SARS-COV-2 as Compared with SARS-CoV-1," URL: https://www.nejm.org/doi/full/10.1056/nejmc2004973, Mar. 17, 2020, 5 pages.

Afram et al., "Theory and Application of HVAC Control Systems—A review of Model Predictive Control (MPC)," Building and Environment, Feb. 2014, vol. 72 (pp. 343-355).

Ahn et al., "Optimal Control Development for Chilled Water Plants Using a Quadratic Representation," Energy and Buildings, Apr. 2001, vol. 33, No. 4 (pp. 371-378).

Alvarado et al., "A Methodology to Monitor Airborne PM10 Dust Particles Using a Small Unmanned Aerial Vehicle," Sensors, 2017, vol. 17 (25 pages).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 2, 2023 (4 pages).

EPO Office Action on EP Appl. Ser. No. 16165681.4 dated Apr. 6, 2021 (7 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

Hackner, J.R., "HVAC system dynamics and energy use in existing buildings," Doctoral Dissertation, University of Madison, Wisconsin, 1984 (174 pages).

Haves et al., "Model Predictive Control of HVAC Systems: Implementation and Testing at the University of California, Merced," Technical Report, U.S. Department of Energy Office of Scientific and Technical Information, Jun. 29, 2010 (140 pages).

Huang et al., "A New Model Predictive Control Scheme for Energy and Cost Savings in Commercial Buildings: An Airport Terminal Building Case Study," Building and Environment, Jul. 2015, vol. 89 (pp. 203-216).

International Search Report and Written Opinion on PCT Appl. Ser. No. PCT/US2023/012719 dated May 22, 2023 (20 pages).

Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).

Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

Third Party Observation Report on EP Appl. Ser. No. 16165681.4 dated Jan. 15, 2020 (8 pages).

(56) References Cited

OTHER PUBLICATIONS

Third Party Observation Report on EP Appl. Ser. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

Cai et al., "Nationwide assessment of energy costs and policies to limit airborne infection risks in U.S. schools," Journal of Building Engineering, Jul. 2021, vol. 45 (pp. 1-12).

European Office Action on EP Appl. No. 20751421.7 dated Jul. 16, 2024 (5 pages).

Faulkner et al., "Tradeoffs among indoor air quality, financial costs, and CO2 emissions for HVAC operation strategies to mitigate indoor virus in U.S. office buildings," Building and Environment, Mar. 2022, vol. 221 (pp. 1-15).

Lee et al., "Life-Cycle Cost Simulation of In-Duct Ultraviolet Germicidal Irradiation Systems," Eleventh International IBPSA Conference, Glasgow, Scotland, Jul. 27-30, 2009 (pp. 1159-1166).

Chang et al., "A cost-effectiveness assessment of the operational parameters of central HVAC systems during pandemics," Building Simulation, Nov. 2022, vol. 16 (pp. 667-682).

Noakes et al., "Modeling infection risk and energy use of upper-room Ultraviolet Germicidal Irradiation systems in multi-room environments," Jan. 2015, Science and Technology for the Built Environment, vol. 21, No. 1 (pp. 99-111).

Villafruela et al., "Comparison of air change efficiency, contaminant removal effectiveness and infection risk as IAQ indices in isolation rooms," Energy and Buildings, Mar. 2012, vol. 57 (pp. 210-219).

Xu et al., "Simulation-based trade-off modeling for indoor infection risk of airborne diseases, energy consumption, and thermal comfort," Journal of Building Engineering, Jan. 2023, vol. 76, No. 107137 (pp. 1-16).

Yan et al., "Evaluating SARS-CoV-2 airborne quanta transmission and exposure risk in a mechanically ventilated multi zone office building," Building and Environment, Feb. 2022, vol. 219, No. 109184 (pp. 1-15).

European Office Action on EP Application No. 20750965.4 dated Sep. 9, 2025 (5 pages).

European Office Action on EP Application No. 20751421.7 dated Sep. 3, 2025 (8 pages).

\* cited by examiner

| Equipment | Baseline | 1 | 2 | 3 | 4 | 5 | 6 |
|---|---|---|---|---|---|---|---|
| Total number of people in place | 50 | 50 | 50 | 50 | 50 | 50 | 50 |
| Probability of someone being sick | 1.000% | 1.000% | 1.000% | 1.000% | 1.000% | 1.000% | 1.000% |
| Number Sick | 0.5 | 0.5 | 0.5 | 0.5 | 0.5 | 0.5 | 0.5 |
| Exposure time (hrs/day) | 1.5 | 1.5 | 1.5 | 1.5 | 1.5 | 1.5 | 1.5 |
| Mask | | | | | | | |

FIG. 14

| Equipment Setup | Baseline | Option 1 | Option 2 | Option 3 | Option 4 | Option 5 | Option 6 |
|---|---|---|---|---|---|---|---|
| Average Airflow (% of design) | 60% | 60% | 60% | 60% | 60% | 60% | 60% |
| Supply Airflow (CFM) | 900 | 900 | 900 | 900 | 900 | 900 | 900 |
| CFM/ft² | 0.692307692 | 0.69231 | 0.69230769 | 0.69230769 | 0.69230769 | 0.6923077 | 0.6923077 |
| Ventilation Rate (%OD Air) | 50% | 50% | 50% | 50% | 50% | 50% | 50% |
| Ventilation Airflow (CFM) | 450 | 450 | 450 | 450 | 450 | 450 | 450 |
| Percentage of ASHRAE 62.1 | 42% | 42% | 42% | 42% | 42% | 42% | 42% |
| Filter Rating | MERV 8 | MERV 11 | MERV 13 | MERV 13 | MERV 13 | MERV 13 | MERV 13 |
| UVC Kill Tunnel Effectiveness (0% = off) | 0% | 0% | 0% | 95% | 95% | 95% | 95% |
| UVC Troffer Percentage 100% = 1/64 ft² | 0% | 0% | 0% | 0% | 50% | 50% | 0% |
| MACH 10 Fan Filter | 0% | 0% | 0% | 0% | 0% | 100% | 0% |

FIG. 15

|  | Baseline | Option 1 | Option 2 | Option 3 | Option 4 | Option 5 | Option 6 |
|---|---|---|---|---|---|---|---|
| Infection Risk Results | 12.58617999 | 6.40065 | 6.32055059 | 6.27070716 | 4.51124028 | 3.3147189 | 6.2707072 |
| Infection Risk |  |  |  |  |  |  |  |
| Average | 13% | 0.06401 | 0.6320551 | 0.6270707 | 0.0451124 | .0331472 | 0.0627071 |
| Sigma | 0.32537571 | 0.01709 | 0.01686303 | 0.01672543 | 0.01199206 | 0.0088102 | 0.0167254 |
| 95% CI | 0.063773638 | 0.03349 | 0.03305154 | 0.03278185 | 0.02350444 | 0.0172682 | 0.0327818 |
| Ratio |  |  |  |  |  |  |  |
| Average | 1 | 0.50737 | 0.50103855 | 0.49709622 | 0.35773745 | 0.2629146 | 0.4970962 |
|  |  | 0.00473 | 0.00457006 | 0.00473401 | 0.00712628 | 0.0078642 | 0.004734 |
| 95% CI | 0 | 0.00927 | 0.00895731 | 0.00927866 | 0.01396731 | 0.0154139 | 0.0092787 |
| Costs |  |  |  |  |  |  |  |
| Ventilation |  | $ - | $ - | $ (128.79) | $ (128.79) | $ (128.79) | $ (128.79) |
| Filter (Energy & Material) | 0 | 7.83731 | 25.5802347 | 25.5802347 | 25.5802347 | 25.580235 | 25.580235 |
| UVC Kill Tunnel | 0 | 0 | 0 | 194.2344 | 194.2344 | 194.2344 | 194.2344 |
| UVC Troffer | $0.00 | $0.00 | $0.00 | $0.00 | $164.70 | $164.70 | $0.00 |
| Mach 10 | $0.00 | $0.00 | $0.00 | $0.00 | $0.00 | $265.99 | $0.00 |
| Total |  | $ 7.84 | $ 25.58 | $ 91.02 | $ 255.72 | $ 521.71 | $ 91.02 |

| Building | |
|---|---|
| US City | Chicago |
| Balance Point | 65 |
| Occupancy category (per ASHRAE 62.1) | Health Club Weight Room |
| Area (ft²) | 1300 |
| Ceiling Height (ft) | 10 |
| Volume | 13000 |

| Occupancy | |
|---|---|
| Total number of people in space | 25 |
| ASHRAE 62.1 default occupancy | 13 |
| Occupant Density (ft²/person) | 52 |
| Probability of someone being sick | 1% |
| Number sick | 0.25 |
| Occupied start time | 8:00 PM |
| Occupied end time | 5:00 PM |
| Occupied Days/Week | 5 |
| Exposure time (hrs/day) | 7 |

| Equipment Setup | |
|---|---|
| Supply Airflow | |
| Design Airflow Rate | 1500 |
| Average Airflow % of Design | 900 |
| Supply Airflow ACH | 4.2 |
| ASHRAE 62.1 | |
| Rp | 20.0 |
| Ra | 0.1 |
| Vent floor (CFM) | 78.0 |
| Cooling COP | 3 |
| Gas Heating efficiency | 0.9 |
| Supply fan mechanical efficiency | 0.7 |
| Supply fan electrical efficiency | 0.65 |

| Energy Costs | |
|---|---|
| Electricity ($/kwh) | $0.12 |
| Natural Gas ($/MMBTU) | $8 |

| Other Fixed Parameters | |
|---|---|
| Wells Riley | |
| Quanta Generation Rate | 122.5 |
| Pulmonary Vent Rate (m³/hr) | 3.00 |
| Ventilation Costs | |
| Heating Degree Day | 1492 |
| Cooling Degree Day | 439 |
| 1 ACH Cost | $103.35 |

| Filter Data | |
|---|---|
| Design | |
| Design Airflow (CFM) | 1500 |
| (m³/s) | 0.707921165 |
| Filter Area (ft²) | 4 |
| Face Velocity (fpm) | 375 |
| | |
| Number of filters | 1 |
| Filter life (month) | 3 |
| Franction of day occupied | 0.375 |
| Weeks | 52 |
| Days per week | 5 |
| Time (hours) | 2340 |

┌──────────────────────────────────────────────────────────────────────────┐ ╱ 2002
│ Obtain user input data for a baseline calculation and different infection │
│                            control options                                │
└──────────────────────────────────────────────────────────────────────────┘
                                       ↓
┌──────────────────────────────────────────────────────────────────────────┐ ╱ 2004
│ Use a random seed technique to generate data sets for a quanta of a       │
│ disease, a pulmonary vent rate, and a deposition parameter                │
└──────────────────────────────────────────────────────────────────────────┘
                                       ↓
┌──────────────────────────────────────────────────────────────────────────┐ ╱ 2006
│  Repeat step 2004 for each of the baseline calculation and the different  │
│                       infection control options                           │
└──────────────────────────────────────────────────────────────────────────┘
                                       ↓
┌──────────────────────────────────────────────────────────────────────────┐ ╱ 2008
│ Determine an average infection probability for each of the baseline       │
│ calculation and the different infection control options using the data sets│
└──────────────────────────────────────────────────────────────────────────┘
                                       ↓
┌──────────────────────────────────────────────────────────────────────────┐ ╱ 2010
│ Determine a ratio between the average infection probability of the        │
│ baseline and each of the different infection control options              │
└──────────────────────────────────────────────────────────────────────────┘
                                       ↓
┌──────────────────────────────────────────────────────────────────────────┐ ╱ 2012
│ Operate a display to provide the ratios of each of the baseline           │
│ calculation and the different infection control options to a user         │
└──────────────────────────────────────────────────────────────────────────┘
                                       ↓
┌──────────────────────────────────────────────────────────────────────────┐ ╱ 2014
│ Estimate an incremental cost relative to a baseline cost for each of the  │
│ different infection control options                                       │
└──────────────────────────────────────────────────────────────────────────┘
                                       ↓
┌──────────────────────────────────────────────────────────────────────────┐ ╱ 2016
│ Operate a display to provide the incremental costs for each of the        │
│ different infection control options                                       │
└──────────────────────────────────────────────────────────────────────────┘
                                       ↓
┌──────────────────────────────────────────────────────────────────────────┐ ╱ 2018
│ Reperform steps 2002-2016 to update the displayed ratios and the displayed│
│ incremental costs to the user in real-time in response to changes in the  │
│                              user input data                              │
└──────────────────────────────────────────────────────────────────────────┘
```

| Koch filter data | DP @ 375 fpm | Final DP (3X initial) | Average DP | 24" x 24" cost | Media Area | Filter Efficiency Average | Sigma |
|---|---|---|---|---|---|---|---|
| MERV 8 | 0.12 | 0.12 | 0.24 | 5.83 | 17 | 0.422 | 0.046162 |
| MERV 11 | 0.17 | 0.17 | 0.51 | 7.2 | 18.4 | 0.682 | 0.079691 |
| MERV 13 | 0.19 | 0.57 | 0.57 | 11.4 | 17.5 | 0.859 | 0.027885 |

| Koch filter data | Energy @ design airflow | Additional Energy | Additional Energy Cost @ design Airflow | Filter Cost | Additional Filter Cost |
|---|---|---|---|---|---|
| MERV 8 | 93.27755872 | 0 | $0.00 | 23.32 | 0 |
| MERV 11 | 132.1432096 | 38.86564988 | $10.91 | 28.8 | 5.48 |
| MERV 13 | 147.6894696 | 54.41190984 | $15.28 | 45.6 | 22.28 |

Table 2300:

| Volume (ft³) | | | Offset | 0 | | | |
|---|---|---|---|---|---|---|---|
| 13000 | | | | Ventilation Rate | Filter Rating | Filter Airflow | Baseline P |
| | EPA Paper | | | 450 | MERV 8 | 450 | Average |
| Mean | Mean | Mean | N Infector | Supply Airflow | Avg Efficiency | Filter ACH | 0.150697 |
| 122.5 | 3 | 1.65 | 0.5 | 900 | 0.4220 | 2.076923077 | Sigma |
| Sigma | Sigma | Sigma | Exposure | Baseline ACH | Std Deviation | Troffer ACH | 0.037729 |
| 31.8877551 | 0.12797619 | 0.331632653 | 1.5 | 2.076923077 | 0.0462 | 0 | |
| | | | | | UV Efficiency | Mach ACH | |
| | | | | | 0% | 0 | |

Table 2308 (columns 2302, 2304, 2306):

| Quanta (q) | Pulmonary Vent Rate | Deposition | Rand | N Infector | Exposure | Vent ACH | Eta_filter | K_filter | K_troffer | Baseline P |
|---|---|---|---|---|---|---|---|---|---|---|
| 139.140856 | 3.357911484 | 2.183658699 | 0.020133027 | 0.5 | 1.5 | 2.076923077 | 0.327321881 | 0.679822368 | 0 | 0.175253 |
| 135.883573 | 2.898491392 | 1.516071081 | 0.033009982 | 0.5 | 1.5 | 2.076923077 | 0.337141452 | 0.700216863 | 0 | 0.170481 |
| 188.119008 | 3.146455354 | 1.314493457 | 0.467916744 | 0.5 | 1.5 | 2.076923077 | 0.418283627 | 0.868742917 | 0 | 0.246537 |
| 86.3717653 | 2.904806362 | 1.458102286 | 0.471961743 | 0.5 | 1.5 | 2.076923077 | 0.41875301 | 0.86971779 | 0 | 0.109568 |
| 121.897278 | 3.016659701 | 1.455171997 | 0.777453574 | 0.5 | 1.5 | 2.076923077 | 0.457250083 | 0.94967325 | 0 | 0.15394 |
| 141.49647 | 3.104025873 | 1.401511893 | 0.740665468 | 0.5 | 1.5 | 2.076923077 | 0.451792701 | 0.938338687 | 0 | 0.183395 |
| 114.598975 | 2.790854598 | 1.312411564 | 0.034432323 | 0.5 | 1.5 | 2.076923077 | 0.338017664 | 0.702036887 | 0 | 0.14723 |
| 106.8361 | 2.796364668 | 1.69272408 | 0.045807978 | 0.5 | 1.5 | 2.076923077 | 0.344128197 | 0.714727795 | 0 | 0.126924 |
| 134.649063 | 3.069905014 | 1.68917242 | 0.477372393 | 0.5 | 1.5 | 2.076923077 | 0.419380348 | 0.871020722 | 0 | 0.166078 |
| 116.797706 | 2.913102566 | 1.813707988 | 0.893425553 | 0.5 | 1.5 | 2.076923077 | 0.479469193 | 0.995820632 | 0 | 0.13226 |
| 105.168985 | 3.102018482 | 1.143382466 | 0.136533521 | 0.5 | 1.5 | 2.076923077 | 0.371405513 | 0.77138068 | 0 | 0.153388 |

FIG. 24 (2400)

| Area | Floor area | ft² | 1300 |
|---|---|---|---|
| Height | Ceiling height | ft | 10 |
| V | Space volume (ft³) | ft³ | 13000 |
| Lambda_vent | Additional ventilation | ACH | 1 |
| Cp_air | Specific heat of air | BTU/lb f | 0.24 |
| Rho_air | Density of air | lb/ft³ | 0.075 |
| Eta_heating | Heating efficiency | | 0.9 |
| Eta_cooling | Cooling efficiency | | 3 |
| alpha | | | 0.000024 |
| beta | | | 0.007031937 |
| Ecost | Cost of electricity | $/kwh | $0.12 |
| GasCost | Cost of natural gas | $/MMBtu | $8 |

FIG. 25 (2500)

| | CHICAGO O'HARE INTL ARPT | CHARLOTTE DOUGLAS INTL ARPT | HOUSTON BUSH INTERCONTINENTAL | PHOENIX SKY HARBOR INTL ARPT |
|---|---|---|---|---|
| HDD | 1491.65 | 727.85 | 292.1225 | 242.22 |
| CDD | 438.8975 | 694.2275 | 1149.7775 | 1595.4075 |
| Hcost | $74.46 | $36.33 | $14.58 | $12.09 |
| Ccost | $28.89 | $45.69 | $75.68 | $105.01 |
| Total Cost | $103.35 | $82.03 | $90.26 | $117.10 |

| Date (MM/DD/YYYY) | Time (HH:MM) | ETA (W/m²) | ETRN (W/m²) | GHI (W/m²) | GHI Source | GHI uncert (%) | DNI (W/m²) | DNI Source | DNI uncert (%) | DHI (W/m²) | DHI Source | DHI uncert (%) |
|---|---|---|---|---|---|---|---|---|---|---|---|---|
| 1/1/1986 | 1:00 | 0 | 0 | 0 | 1 | 0 | 0 | 1 | 0 | 0 | 1 | 0 |
| 1/1/1986 | 2:00 | 0 | 0 | 0 | 1 | 0 | 0 | 1 | 0 | 0 | 1 | 0 |
| 1/1/1986 | 3:00 | 0 | 0 | 0 | 1 | 0 | 0 | 1 | 0 | 0 | 1 | 0 |
| 1/1/1986 | 4:00 | 0 | 0 | 0 | 1 | 0 | 0 | 1 | 0 | 0 | 1 | 0 |
| 1/1/1986 | 5:00 | 0 | 0 | 0 | 1 | 0 | 0 | 1 | 0 | 0 | 1 | 0 |
| 1/1/1986 | 6:00 | 0 | 0 | 0 | 1 | 0 | 0 | 1 | 0 | 0 | 1 | 0 |
| 1/1/1986 | 7:00 | 0 | 0 | 0 | 1 | 0 | 0 | 1 | 0 | 0 | 1 | 0 |
| 1/1/1986 | 8:00 | 43 | 908 | 12 | 1 | 13 | 22 | 1 | 13 | 10 | 1 | 13 |
| 1/1/1986 | 9:00 | 236 | 1415 | 115 | 1 | 13 | 397 | 1 | 9 | 47 | 1 | 13 |
| 1/1/1986 | 10:00 | 410 | 1415 | 244 | 1 | 9 | 587 | 1 | 13 | 71 | 1 | 13 |
| 1/1/1986 | 11:00 | 531 | 1415 | 341 | 1 | 9 | 688 | 1 | 9 | 80 | 1 | 13 |
| 1/1/1986 | 12:00 | 591 | 1415 | 364 | 1 | 9 | 521 | 1 | 13 | 144 | 1 | 13 |
| 1/1/1986 | 13:00 | 586 | 1415 | 231 | 1 | 9 | 151 | 1 | 13 | 168 | 1 | 13 |
| 1/1/1986 | 14:00 | 516 | 1415 | 180 | 1 | 9 | 54 | 1 | 13 | 161 | 1 | 13 |

INFECTION CONTROL TOOL FOR HVAC SYSTEM

CROSS-REFERENCE TO RELATED PATENT APPLICATION

This application: (i) is a continuation-in-part of U.S. application Ser. No. 17/393,138, filed Aug. 3, 2021, which is a continuation of U.S. application Ser. No. 16/927,766, filed Jul. 13, 2020, which claims the benefit of and priority to U.S. Provisional Patent Application No. 62/873,631, filed Jul. 12, 2019, and U.S. Provisional Patent Application No. 63/044,906, filed Jun. 26, 2020; and (ii) also claims the benefit of and priority to U.S. Provisional Application No. 63/071,910, filed Aug. 28, 2020, the entire disclosure of which is incorporated by reference herein.

BACKGROUND

The present disclosure relates generally to systems and methods for predicting and controlling infection risk in a building. The present disclosure relates more particularly to an infection control tool for predicting and controlling infection risk, occupant comfort, energy consumption/cost, and other factors as a function of design and control decisions for building HVAC equipment.

Maintaining occupant comfort and disinfection in a building requires building equipment (e.g., HVAC equipment) to be operated to change environmental conditions in the building. In some systems, occupants are required to make any desired changes to the environmental conditions themselves if they are not comfortable. When operating building equipment to change specific environmental conditions, other environmental conditions may be affected as a result. Maintaining occupant comfort and disinfection can be expensive if not performed correctly. Thus, systems and methods are needed to maintain occupant comfort and provide sufficient disinfection for multiple environmental conditions while reducing expenses related to maintaining occupant comfort and disinfection.

SUMMARY

One implementation of the present disclosure is an infection control tool for a building HVAC system, according to some embodiments. In some embodiments, the infection control tool includes processing circuitry configured to receive one or more inputs defining a HVAC system configuration for each of a baseline scenario and one or more other scenarios. In some embodiments, the processing circuitry is configured to estimate infection risk and at least one of energy consumption or operating cost for each of the one or more other scenarios relative to the baseline scenario. In some embodiments, the processing circuitry is configured to operate a display to provide the infection risk and at least one of the energy consumption or operating cost to a user.

In some embodiments, the baseline scenario is a scenario when no additional measures are taken at the building HVAC system to control a spread of an infectious disease within a building. In some embodiments, the one or more other scenarios include different infection control techniques to control a spread of an infectious disease within a building. In some embodiments, the different infection control techniques include at least one of a filtration technique, an ultraviolet technique to sterilize air provided to the building, or an outdoor air technique including drawing outdoor air to replace air within the building. In some embodiments, the processing circuitry is configured to estimate the infection risk using a Wells-Riley equation.

In some embodiments, the one or more inputs define the different infection control techniques. In some embodiments, the filtration technique is performed by a filtration device, wherein the filtration device is positioned either at an air handler of the building HVAC system, or locally within a space of the building so that the filtration device operates independently of the building HVAC system.

In some embodiments, the ultraviolet technique is performed by UV lights. In some embodiments, the UV lights are positioned either at an air handler of the building HVAC system, or locally within a space of the building so that the UV lights operate independently of the building HVAC system.

In some embodiments, the processing circuitry is further configured to automatically update the infection risk and at least one of the energy consumption or operating cost in response to the user adjusting the one or more inputs, and operate the display to provide the updated infection risk and at least one of the updated energy consumption or the updated operating cost.

In some embodiments, the processing circuitry is configured to estimate the infection risk of the one or more other scenarios relative to the baseline scenario by estimating an infection probability for the baseline scenario based on the one or more inputs and using a random seed technique, estimating an infection probability for each of the one or more other scenarios based on the one or more inputs and using the random seed technique, and comparing the infection probability for the baseline scenario to the infection probability for each of the one or more other scenarios to determine a ratio for each of the one or more other scenarios.

Another implementation of the present disclosure is a method for controlling infection in a building, according to some embodiments. In some embodiments, the method includes receiving one or more inputs defining a HVAC system configuration for each of a baseline scenario and one or more other scenarios. In some embodiments, the method includes estimating infection risk and at least one of energy consumption or operating cost for each of the one or more other scenarios relative to the baseline scenario. In some embodiments, the method includes operating a display to provide the infection risk and at least one of the energy consumption or operating cost to a user.

In some embodiments, the baseline scenario is a scenario when no additional measures are taken at the building HVAC system to control a spread of an infectious disease within the building. In some embodiments, the one or more other scenarios include different infection control techniques to control a spread of an infectious disease within the building.

In some embodiments, the different infection control techniques include at least one of a filtration technique, an ultraviolet technique to sterilize air provided to the building, or an outdoor air technique including drawing outdoor air to replace air within the building.

In some embodiments, the filtration technique is performed by a filtration device. In some embodiments, the filtration device is positioned either at an air handler of the building HVAC system, or locally within a space of the building so that the filtration device operates independently of the building HVAC system. In some embodiments, the ultraviolet technique is performed by UV lights, wherein the UV lights are positioned either at an air handler of the building HVAC system, or locally within a space of the building so that the UV lights operate independently of the building HVAC system.

In some embodiments, the method includes automatically updating the infection risk and at least one of the energy consumption or operating cost in response to the user adjusting the one or more inputs, and operating the display to provide the updated infection risk and at least one of the updated energy consumption or the updated operating cost.

In some embodiments, estimating the infection risk of the one or more other scenarios relative to the baseline scenario includes estimating an infection probability for the baseline scenario based on the one or more inputs and using a random seed technique, estimating an infection probability for each of the one or more other scenarios based on the one or more inputs and using the random seed technique, and comparing the infection probability for the baseline scenario to the infection probability for each of the one or more other scenarios to determine a ratio for each of the one or more other scenarios.

Another implementation of the present disclosure is an infection control tool for a building HVAC system, according to some embodiments. In some embodiments, the infection control tool includes processing circuitry configured to receive one or more user inputs defining a HVAC system configuration for each of a baseline scenario and one or more other scenarios. In some embodiments, the baseline scenario is a scenario when no additional measures are taken at the building HVAC system to control a spread of an infectious disease and the one or more other scenarios are scenarios where different infection control techniques are implemented. In some embodiments, the processing circuitry is configured to estimate infection risk and at least one of energy consumption or operating cost for each of the one or more other scenarios relative to the baseline scenario for a future time horizon. In some embodiments, the processing circuitry is configured to operate a display to provide the infection risk and at least one of the energy consumption or operating cost to a user.

In some embodiments, estimating the infection risk includes using a random seed technique to generate data sets for each of an infectious quanta of a disease, a pulmonary vent rate, and a deposition parameter. In some embodiments, estimating the infection risk also includes determining an average infection probability as the infection risk for each of the baseline scenario and the one or more other scenarios for the data sets. In some embodiments, the deposition parameter includes a deposition rate of airborne infectious particles onto a surface.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 14 is a user interface for receiving user inputs regarding an occupancy of a building for a baseline scenario and other scenarios, according to some embodiments.

FIG. 15 is a user interface for receiving user inputs regarding an equipment setup of a building for a baseline scenario and other scenarios, according to some embodiments.

FIG. 16 is a user interface showing infection risk results and various incremental costs for a baseline scenario and other scenarios, according to some embodiments.

FIG. 17 is a user interface showing building, occupancy, equipment setup, and energy cost fields that can be populated by a user, according to some embodiments.

FIG. 18 is a user interface showing Wells-Riley and ventilation cost parameters, according to some embodiments.

FIG. 19 is a user interface showing filter data, according to some embodiments.

FIG. 20 is a flow diagram of a process for determining operating costs and infection risks for a baseline scenario and different infection control scenarios, according to some embodiments.

FIG. 21 is a table showing filter information for different rated filters, according to some embodiments.

FIG. 22 is a table showing filter information for different rated filters, according to some embodiments.

FIG. 23 is a table illustrating a random seed technique used to generate infection risk ratings, according to some embodiments.

FIG. 24 is a table showing different parameters that are used to calculate heating and cooling costs, according to some embodiments.

FIG. 25 is a table showing heating degree days, cooling degree days, heating cost, cooling cost, and total cost for various locations, according to some embodiments.

FIG. 26 is a table showing historical data for a location that is used to calculate the heating degree days and cooling degree days for the location, according to some embodiments.

DETAILED DESCRIPTION

Overview

Figure 1:
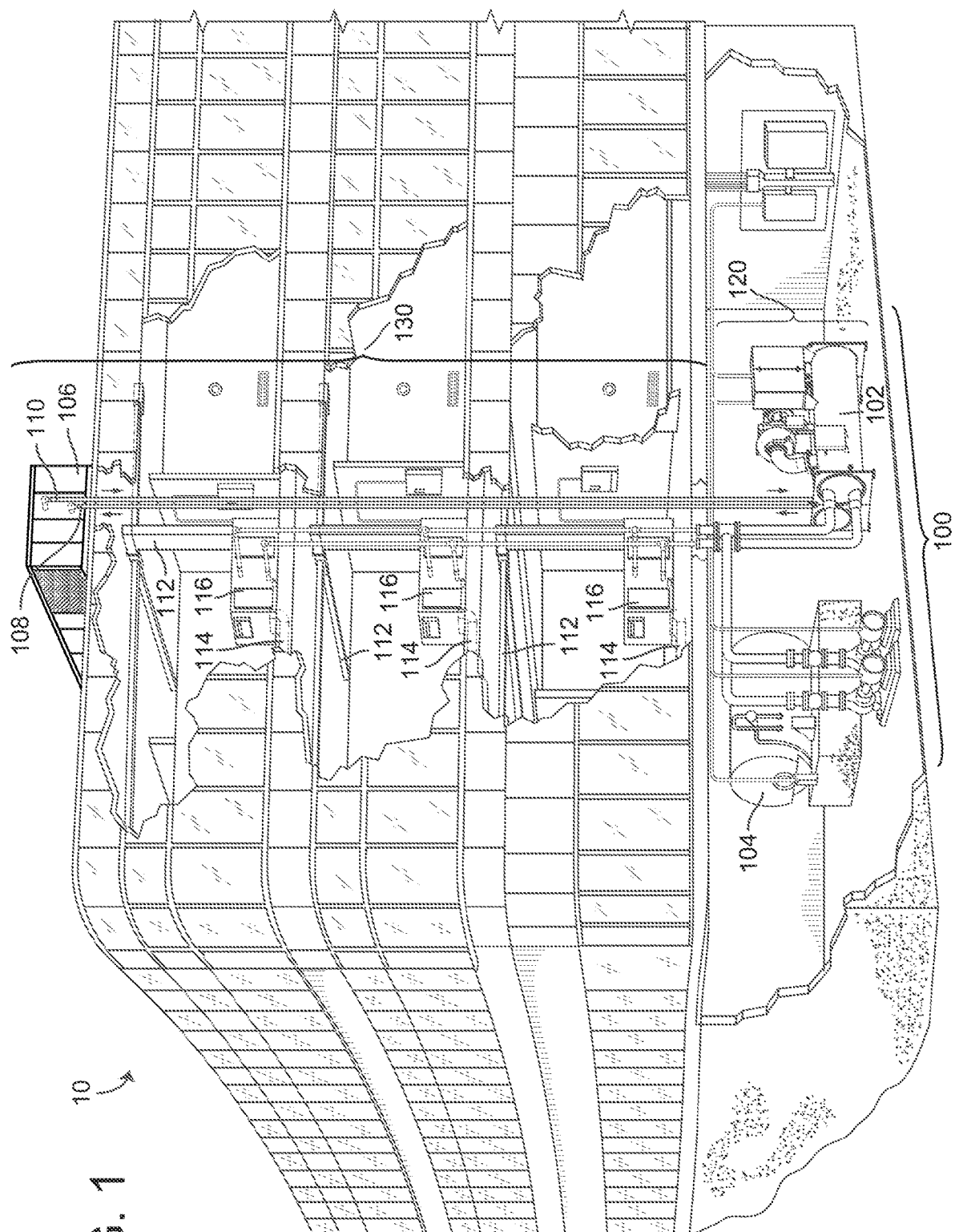
FIG. 1 is a drawing of a building equipped with a HVAC system, according to some embodiments.

Referring generally to the FIGURES, systems and methods for minimizing energy consumption of an HVAC system while maintaining a desired level of disinfection are shown. The system may include an AHU that serves multiple zones, a controller, one or more UV lights that disinfect air before it is provided from the AHU to the zones, and/or a filter that is configured to filter air to provide additional disinfection for the air before it is provided to the zones. In some embodiments, the system also includes one or more zone sensors (e.g., temperature and/or humidity sensors, etc.) and one or more ambient or outdoor sensors (e.g., outdoor temperature and/or outdoor humidity sensors, etc.).

The controller uses a model-based design and optimization framework to integrate building disinfection control with existing temperature regulation in building HVAC systems. The controller uses the Wells-Riley equation to transform a required upper limit of infection probability into constraints on indoor concentration of infectious particles, according to some embodiments. In some embodiments, the controller uses a dynamic model for infectious agent concentration to impose these constraints on an optimization problem similar to temperature and humidity constraints. By modeling effects of various types of optional infection control equipment (e.g., UV lights and/or filters), the controller may utilize a combination of fresh-air ventilation and direct filtration/disinfection to achieve desired infection constraints. In some embodiments, the controller can use this composite model for optimal design (e.g., in an off-line implementation of the controller) to determine which additional disinfection strategies are desirable, cost effective, or necessary. The controller can also be used for on-line control to determine control decisions for various controllable equipment (e.g., dampers of the AHU) in real-time to minimize energy consumption or energy costs of the HVAC system while meeting temperature, humidity, and infectious quanta concentration constraints.

The systems and methods described herein treat infection control as an integral part of building HVAC operation rather than a short term or independent control objective, according to some embodiments. While it may be possible to achieve disinfection by the addition of UV lights and filters running at full capacity, such a strategy may be costly and consume excessive amounts of energy. However, the systems and methods described herein couple both objectives (disinfection control and minimal energy consumption) to assess optimal design and operational decisions on a case-by-case basis also taking into account climate, energy and disinfection goals of particular buildings.

The controller can be implemented in an off-line mode as a design tool. With the emergence of various strategies for building disinfection, building designers and operators now have a wide array of options for retrofitting a building to reduce the spread of infectious diseases to building occupants. This is typically accomplished by lowering the concentration of infectious particles in the air space, which can be accomplished by killing the microbes via UV radiation, trapping them via filtration, or simply forcing them out of the building via fresh-air ventilation. While any one of these strategies individually can provide desired levels of disinfection, it may do so at unnecessarily high cost or with negative consequences for thermal comfort of building occupants. Thus, to help evaluate the tradeoff and potential synergies between the various disinfection options, the model-based design tool can estimate annualized capital and energy costs for a given set of disinfection equipment. For a given AHU, this includes dynamic models for temperature, humidity, and infectious particle concentration, and it employs the Wells-Riley infection equation to enforce constraints on maximum occupant infection probability. By being able to quickly simulate a variety of simulation instances, the controller (when operating as the design tool in the off-line mode) can present building designers with the tradeoff between cost and disinfection, allowing them to make informed decisions about retrofit.

A key feature of the design tool is that it shows to what extent the inherent flexibility of the existing HVAC system can be used to provide disinfection. In particular, in months when infectivity is of biggest concern, a presence of free cooling from fresh outdoor air means that the energy landscape is relatively flat regardless of how the controller determines to operate the HVAC system. Thus, the controller could potentially increase fresh-air intake significantly to provide sufficient disinfection without UV or advanced filtration while incurring only a small energy penalty. The design tool can provide estimates to customers to allow them to make informed decisions about what additional disinfection equipment (if any) to install and then provide the modified control systems needed to implement the desired infection control.

The controller can also be implemented in an on-line mode as a real-time controller. Although equipment like UV lamps and advanced filtration can be installed in buildings to mitigate the spread of infectious diseases, it is often unclear how to best operate that equipment to achieve desired disinfection goals in a cost-effective manner. A common strategy is to take the robust approach of opting for the highest-efficiency filters and running UV lamps constantly.

While this strategy will indeed reduce infection probability to its lowest possible value, it is likely to do so at exorbitant cost due to the constant energy penalties of both strategies. Building managers may potentially choose to completely disable filters and UV lamps to conserve energy consumption. Thus, the building may end up in a worst-of-both-words situation where the building manager has paid for disinfection equipment but the zones are no longer receiving any disinfection. To remove this burden from building operators, the controller can automate infection control by integrating disinfection control (e.g., based on the Wells-Riley equation) in a model based control scheme. In this way, the controller can simultaneously achieve thermal comfort and provide adequate disinfection at the lowest possible cost given currently available equipment.

Advantageously, the control strategy can optimize in real time the energy and disinfection tradeoffs of all possible control variables. Specifically, the controller may choose to raise fresh-air intake fraction even though it incurs a slight energy penalty because it allows a significant reduction of infectious particle concentrations while still maintaining comfortable temperatures. Thus, in some climates it may be possible to provide disinfection without additional equipment, but this strategy is only possible if the existing control infrastructure can be guided or constrained so as to provide desired disinfection. Alternatively, in buildings that have chosen to add UV lamps and/or filtration, the controller can find the optimal combination of techniques to achieve desired control objectives at the lowest possible cost. In addition, because the constraint on infection probability is configurable, the controller can empower building operators to make their own choices regarding disinfection and energy use (e.g. opting for a loose constraint in the summer when disease is rare and energy use is intensive, while transitioning to a tight constraint in winter when disease is prevalent and energy less of a concern). Advantageously, the controller can provide integrated comfort, disinfection, and energy management to customers to achieve better outcomes in all three areas compared to other narrow and individual solutions.

In some embodiments, the models used to predict temperature, humidity, and/or infectious quanta are dynamic models. The term "dynamic model" and variants thereof (e.g., dynamic temperature model, dynamic humidity model, dynamic infectious quanta model, etc.) are used throughout the present disclosure to refer to any type of model that predicts the value of a quantity (e.g., temperature, humidity, infectious quanta) at various points in time as a function of zero or more input variables. A dynamic model may be "dynamic" as a result of the input variables changing over time even if the model itself does not change. For example, a steady-state model that uses ambient temperature or any other variable that changes over time as an input may be considered a dynamic model. Dynamic models may also include models that vary over time. For example, models that are retrained periodically, configured to adapt to changing conditions over time, and/or configured to use different relationships between input variables and predicted outputs (e.g., a first set of relationships for winter months and a second set of relationships for summer months) may also be considered dynamic models. Dynamic models may also include ordinary differential equation (ODE) models or other types of models having input variables that change over time and/or input variables that represent the rate of change of a variable.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 2.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Airside System

Figure 2:
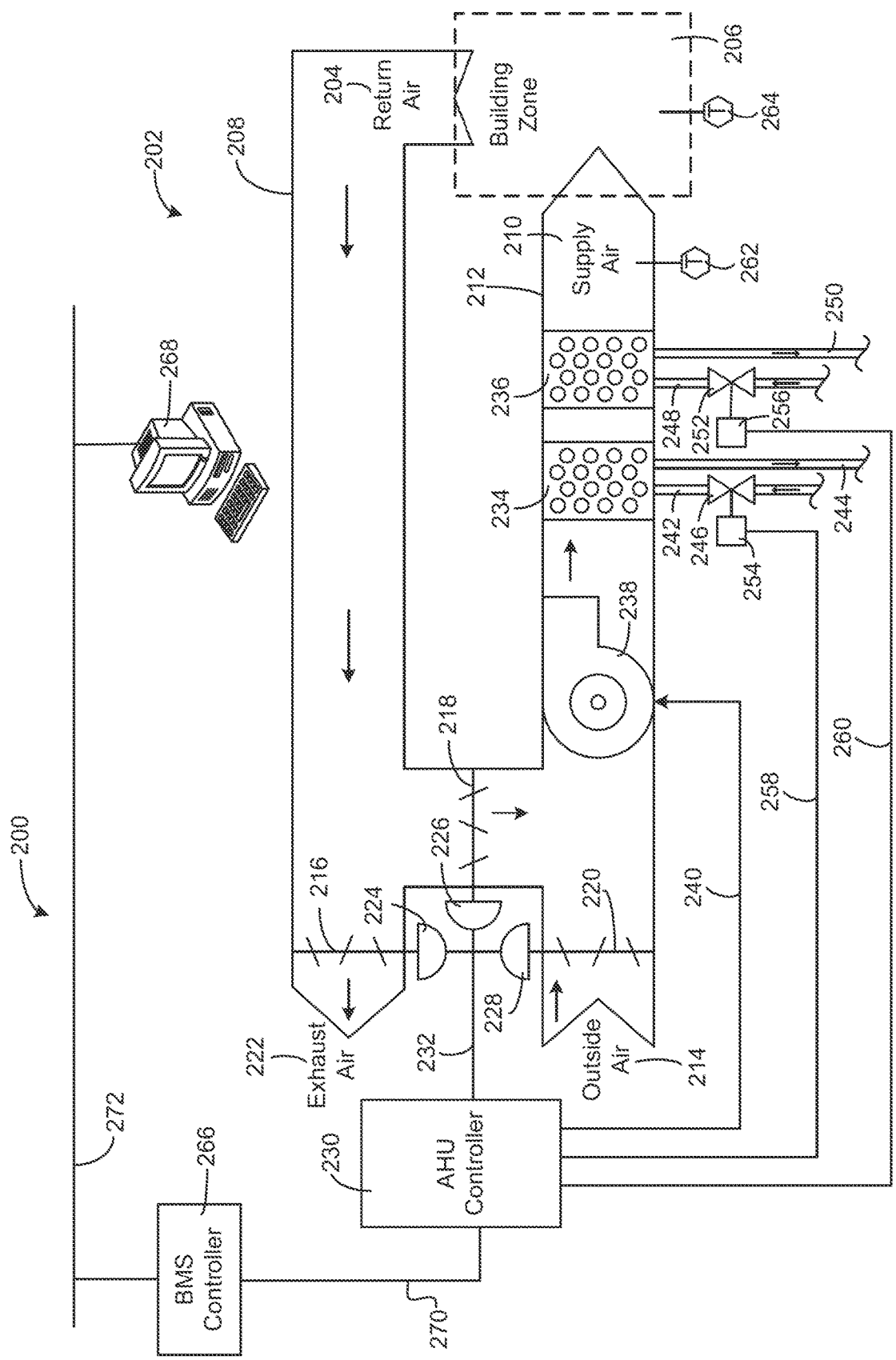
FIG. 2 is a block diagram of an airside system which can be implemented in the building of FIG. 1, according to some embodiments.

Referring now to FIG. 2, a block diagram of an airside system 200 is shown, according to some embodiments. In various embodiments, airside system 200 may supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. Airside system 200 may operate to heat, cool, humidify, dehumidify, filter, and/or disinfect an airflow provided to building 10 in some embodiments.

Airside system 200 is shown to include an economizer-type air handling unit (AHU) 202. Economizer-type AHUs vary the amount of outside air and return air used by the air handling unit for heating or cooling. For example, AHU 202 may receive return air 204 from building zone 206 via return air duct 208 and may deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 may communicate with an AHU controller 230 via a communications link 232. Actuators 224-228 may receive control signals from AHU controller 230 and may provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 2, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 may communicate with fan 238 via communications link 240 to control a flow rate of supply air 210. In some embodiments, AHU controller 230 controls an amount of heating or cooling applied to supply air 210 by modulating a speed of fan 238. In some embodiments, AHU 202 includes one or more air filters (e.g., filter 308) and/or one or more ultraviolet (UV) lights (e.g., UV lights 306) as described in greater detail with reference to FIG. 3. AHU controller 230 can be configured to control the UV lights and route the airflow through the air filters to disinfect the airflow as described in greater detail below.

Cooling coil 234 may receive a chilled fluid from central plant 200 (e.g., from cold water loop 216) via piping 242 and may return the chilled fluid to central plant 200 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230, by BMS controller 266, etc.) to modulate an amount of cooling applied to supply air 210.

Heating coil 236 may receive a heated fluid from central plant 200 (e.g., from hot water loop 214) via piping 248 and may return the heated fluid to central plant 200 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230, by BMS controller 266, etc.) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 may communicate with AHU controller 230 via communications links 258-260. Actuators 254-256 may receive control signals from AHU controller 230 and may provide feedback signals to controller 230. In some embodiments, AHU controller 230 receives a measurement of the supply air temperature from a temperature sensor 262 positioned in supply air duct 212 (e.g., downstream of cooling coil 334 and/or heating coil 236). AHU controller 230 may also receive a measurement of the temperature of building zone 206 from a temperature sensor 264 located in building zone 206.

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. AHU 230 may control the temperature of supply air 210 and/or building zone 206 by activating or deactivating coils 234-236, adjusting a speed of fan 238, or a combination of both.

Still referring to FIG. 2, airside system 200 is shown to include a building management system (BMS) controller 266 and a client device 268. BMS controller 266 can include one or more computer systems (e.g., servers, supervisory controllers, subsystem controllers, etc.) that serve as system level controllers, application or data servers, head nodes, or master controllers for airside system 200, central plant 200, HVAC system 100, and/or other controllable systems that serve building 10. BMS controller 266 may communicate with multiple downstream building systems or subsystems (e.g., HVAC system 100, a security system, a lighting system, central plant 200, etc.) via a communications link 270 according to like or disparate protocols (e.g., LON, BACnet, etc.). In various embodiments, AHU controller 230 and BMS controller 266 can be separate (as shown in FIG. 2) or integrated. In an integrated implementation, AHU controller 230 can be a software module configured for execution by a processor of BMS controller 266.

In some embodiments, AHU controller 230 receives information from BMS controller 266 (e.g., commands, setpoints, operating boundaries, etc.) and provides information to BMS controller 266 (e.g., temperature measurements, valve or actuator positions, operating statuses, diagnostics, etc.). For example, AHU controller 230 may provide BMS controller 266 with temperature measurements from temperature sensors 262-264, equipment on/off states, equipment operating capacities, and/or any other information that can be used by BMS controller 266 to monitor or control a variable state or condition within building zone 206.

Client device 268 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 268 can be a computer workstation, a client terminal, a remote or local interface, or any other type of user interface device. Client device 268 can be a stationary terminal or a mobile device. For example, client device 268 can be a desktop computer, a computer server with a user interface, a laptop computer, a tablet, a smartphone, a PDA, or any other type of mobile or non-mobile device. Client device 268 may communicate with BMS controller 266 and/or AHU controller 230 via communications link 272.

HVAC System with Building Infection Control Overview

Figure 3:
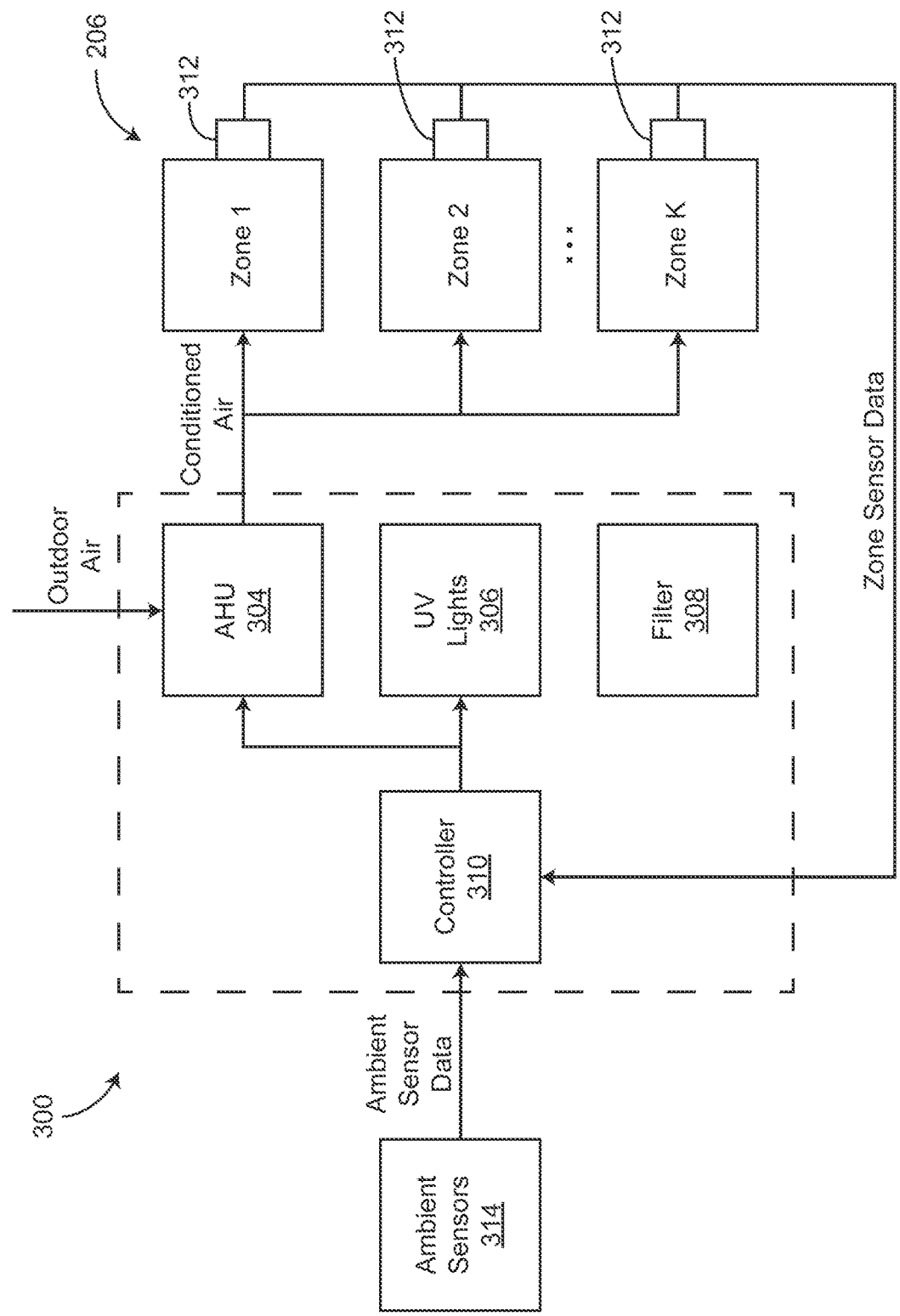
FIG. 3 is a block diagram of an HVAC system including a controller configured to operate an air-handling unit (AHU) of the HVAC system of FIG. 1, according to some embodiments.

Referring particularly to FIG. 3, a HVAC system 300 that is configured to provide disinfection for various zones of a building (e.g., building 10) is shown, according to some embodiments. HVAC system 300 can include an air handling unit (AHU) 304 (e.g., AHU 230, AHU 202, etc.) that can provide conditioned air (e.g., cooled air, supply air 210, etc.) to various building zones 206. The AHU 304 may draw air from the zones 206 in combination with drawing air from outside (e.g., outside air 214) to provide conditioned or clean air to zones 206. The HVAC system 300 includes a controller 310 (e.g., AHU controller 230) that is configured to determine a fraction x of outdoor air to recirculated air that the AHU 304 should use to provide a desired amount of disinfection to building zones 206. In some embodiments, controller 310 can generate control signals for various dampers of AHU 304 so that AHU 304 operates to provide the conditioned air to building zones 206 using the fraction x.

The HVAC system 300 can also include ultraviolet (UV) lights 306 that are configured to provide UV light to the conditioned air before it is provided to building zones 206. The UV lights 306 can provide disinfection as determined by controller 310 and/or based on user operating preferences. For example, the controller 310 can determine control signals for UV lights 306 in combination with the fraction x of outdoor air to provide a desired amount of disinfection and satisfy an infection probability constraint. Although UV lights 306 are referred to throughout the present disclosure, the systems and methods described herein can use any type of disinfection lighting using any frequency, wavelength, or luminosity of light effective for disinfection. It should be understood that UV lights 306 (and any references to UV lights 306 throughout the present disclosure) can be replaced with disinfection lighting of any type without departing from the teachings of the present disclosure.

The HVAC system 300 can also include one or more filters 308 or filtration devices (e.g., air purifiers). In some embodiments, the filters 308 are configured to filter the conditioned air or recirculated air before it is provided to building zones 206 to provide a certain amount of disinfection. In this way, controller 310 can perform an optimization in real-time or as a planning tool to determine control signals for AHU 304 (e.g., the fraction x) and control signals for UV lights 306 (e.g., on/off commands) to provide disinfection for building zones 206 and reduce a probability of infection of individuals that are occupying building zones 206. Controller 310 can also function as a design tool that is configured to determine suggestions for building managers regarding benefits of installing or using filters 308, and/or specific benefits that may arise from using or installing a particular type or size of filter. Controller 310 can thereby facilitate informed design decisions to maintain sterilization of air that is provided to building zones 206 and reduce a likelihood of infection or spreading of infectious matter.

Wells-Riley Airborne Transmission

The systems and methods described herein may use an infection probability constraint in various optimizations (e.g., in on-line or real-time optimizations or in off-line optimizations) to facilitate reducing infection probability among residents or occupants of spaces that the HVAC system serves. The infection probability constraint can be based on a steady-state Wells-Riley equation for a probability of airborne transmission of an infectious agent given by:

$$P := \frac{D}{S} = 1 - \exp\left(-\frac{Ipqt}{Q}\right)$$

where P is a probability that an individual becomes infected (e.g., in a zone, space, room, environment, etc.), D is a number of infected individuals (e.g., in the zone, space, room, environment, etc.), S is a total number of susceptible individuals (e.g., in the zone, space, room, environment, etc.), I is a number of infectious individuals (e.g., in the zone, space, room, environment, etc.), q is a disease quanta generation rate (e.g., with units of l/sec), p is a volumetric breath rate of one individual (e.g., in m³/sec), t is a total exposure time (e.g., in seconds), and Q is an outdoor ventilation rate (e.g., in m³/sec). For example, Q may be a volumetric flow rate of fresh outdoor air that is provided to the building zones 206 by AHU 304.

When the Wells-Riley equation is implemented by controller 310 as described herein, controller 310 may use the Wells-Riley equation (or a dynamic version of the Wells-Riley equation) to determine an actual or current probability of infection P and operate the HVAC system 200 to maintain the actual probability of infection P below (or drive the actual probability of infection below) a constraint or maximum allowable value. The constraint value (e.g., $P_{max}$) may be a constant value, or may be adjustable by a user (e.g., a user-set value). For example, the user may set the constraint value of the probability of infection to a maximum desired probability of infection (e.g., either for on-line implementation of controller 310 to maintain the probability of infection below the maximum desired probability, or for an off-line implementation/simulation performed by controller 310 to determine various design parameters for HVAC system 200 such as filter size), or may select from various predetermined values (e.g., 3-5 different choices of the maximum desired probability of infection).

In some embodiments, the number of infectious individuals I can be determined by controller 310 based on data from the Centers for Disease and Control Prevention or a similar data source. The value of I may be typically set equal to 1 but may vary as a function of occupancy of building zones 206.

The disease quanta generation rate q may be a function of the infectious agent. For example, more infectious diseases may have a higher value of q, while less infectious diseases may have a lower value of q. For example, the value of q for COVID-19 may be 30-300 (e.g., 100).

The value of the volumetric breath rate p may be based on a type of building space 206. For example, the volumetric breath rate p may be higher if the building zone 206 is a gym as opposed to an office setting. In general, an expected level of occupant activity may determine the value of the volumetric breath rate p.

A difference between D (the number of infected individuals) and I (the number of infectious individuals) is that D is a number of individuals who are infected (e.g., infected with a disease), while I is a number of people that are infected and are actively contagious (e.g., individuals that may spread the disease to other individuals or spread infectious particles when they exhale). The disease quanta generation rate indicates a number of infectious droplets that give a 63.2% chance of infecting an individual (e.g., $1-\exp(-1)$). For example, if an individual inhales k infectious particles, the probability that the individual becomes infected (P) is given by $$1 - \exp\left(-\frac{k}{k_0}\right)$$

where k is the number of infectious particles that the individual has inhaled, and $k_0$ is a quantum of particles for a particular disease (e.g., a predefined value for different diseases). The quanta generation rate q is the rate at which quanta are generated (e.g., $K/k_0$) where K is the rate of infectious particles exhaled by an infectious individual. It should be noted that values of the disease quanta generation rate q may be back-calculated from epidemiological data or may be tabulated for well-known diseases.

The Wells-Riley equation (shown above) is derived by assuming steady-state concentrations for infectious particles in the air. Assuming a well-mixed space:

$$V\frac{dN}{dt} = Iq - NQ$$

where V is a total air volume (e.g., in m³), N is a quantum concentration in the air, I is the number of infectious individuals, q is the disease quanta generation rate, and Q is the outdoor ventilation rate. The term Iq is quanta production by infectious individuals (e.g., as the individuals breathe out or exhale), and the term NQ is the quanta removal rate due to ventilation (e.g., due to operation of AHU 304).

Assuming steady-state conditions, the steady state quantum concentration in the air is expressed as:

$$N_{ss} = \frac{Iq}{Q}$$

according to some embodiments.

Therefore, if an individual inhales at an average rate of p (e.g., in m³/sec), over a period of length t the individual inhales a total volume pt or $N_{ss}ptk_0$ infectious particles. Therefore, based on a probability model used to define the quanta, the infectious probability is given by:

$$P = 1 - \exp\left(-\frac{k}{k_0}\right) = 1 - \exp(-N_{SS}pt) = 1 - \exp\left(-\frac{Iqpt}{Q}\right)$$

where P is the probability that an individual becomes infected, k is the number of infectious particles that the individual has inhaled, and $k_0$ is the quantum of particles for the particular disease.

Carbon Dioxide for Infectious Particles Proxy

While the above equations may rely on in-air infectious quanta concentration, measuring in-air infectious quanta concentration may be difficult. However, carbon dioxide (CO2) is a readily-measureable parameter that can be a proxy species, measured by zone sensors 312. In some embodiments, a concentration of CO2 in the zones 206 may be directly related to a concentration of the infectious quanta.

A quantity $\phi$ that defines a ratio of an infected particle concentration in the building air to the infected particle concentration in the exhaled breath of an infectious individual is defined:

$$\phi := \frac{pN}{q}$$

where p is the volumetric breath rate for an individual, N is the quantum concentration in the air, and q is the disease quanta generation rate. Deriving the above equation with respect to time yields:

$$\frac{d\phi}{dt} = \frac{p}{q}\left(\frac{dN}{dt}\right) = \frac{Ip}{V} - \phi\left(\frac{Q}{V}\right)$$

where p is the volumetric breath rate for the individual, q is disease quanta generation rate, N is the quantum concentration in the air, t is time, I is the number of infectious individuals, V is the total air volume, $\phi$ is the ratio, and Q is the outdoor ventilation rate. Since it can be difficult to measure the ratio $\phi$ of the air, CO2 can be used as a proxy species.

Humans release CO2 when exhaling, which is ultimately transferred to the ambient via ventilation of an HVAC system. Therefore, the difference between CO2 particles and infectious particles is that all individuals (and not only the infectious population) release CO2 and that the outdoor air CO2 concentration is non-zero. However, it may be assumed that the ambient CO2 concentration is constant with respect to time, which implies that a new quantity C can be defined as the net indoor CO2 concentration (e.g., the indoor concentration minus the outdoor concentration). With this assumption, the following differential equation can be derived:

$$V\frac{dC}{dt} = Spc - QC$$

where V is the total air volume (e.g. in m³), C is the net indoor CO2 concentration, t is time, S is the total number of susceptible individuals (e.g., in building zone 206, or a modeled space, or all of building zones 206, or building 10), p is the volumetric breath rate for one individual, c is the net concentration of exhaled CO2, and Q is the outdoor ventilation rate. This equation assumes that the only way to remove infectious particles is with fresh air ventilation (e.g., by operating AHU 304 to draw outdoor air and use the outdoor air with recirculated air). A new quantity ψ can be defined that gives the ratio of net CO2 concentration in the building air to net CO2 concentration in the exhaled air:

$$\psi = \frac{C}{c}$$

where ψ is the ratio, C is the net indoor CO2 concentration, and c is the net concentration of exhaled CO2.

Deriving the ratio ψ with respect to time yields:

$$\frac{d\psi}{dt} = \frac{1}{c}\left(\frac{dC}{dt}\right) = \frac{Sp}{V} - \psi\left(\frac{Q}{V}\right)$$

according to some embodiments.

Combining the above equation with the quantity φ, it can be derived that:

$$\frac{d}{dt}\log\left(\frac{\phi}{\psi}\right) = \frac{1}{\phi}\left(\frac{d\phi}{dt}\right) - \frac{1}{\psi}\left(\frac{d\psi}{dt}\right) = \frac{p}{V}\left(\frac{I}{\phi} - \frac{S}{\psi}\right)$$

according to some embodiments. Assuming that the initial condition satisfies:

$$\phi(0) = \frac{1}{S}\psi(0)$$

it can be determined that the right-hand side of the $$\frac{d}{dt}\log\left(\frac{\phi}{\psi}\right)$$

equation becomes zero. This implies that the term log $$\left(\frac{\phi}{\psi}\right)$$

and therefore $$\frac{\phi}{\psi}$$

is a constant. Therefore, φ/ψ is constant for all times t and not merely initial conditions when t=0.

The $$\frac{d}{dt}\log\left(\frac{\phi}{\psi}\right)$$

relationship only holds true when fresh outdoor air is used as the only disinfection mechanism. However, in many cases HVAC system 200 may include one or more filters 308, and UV lights 306 that can be operated to provide disinfection for building zones 206. If additional infection mitigation strategies are used, the ventilation rate may instead by an effective ventilation rate for infectious quanta that is different than that of the CO2. Additionally, the only way for the initial conditions φ(0) and ψ(0) to be in proportion is for both to be zero. This assumption can be reasonable if HVAC system 200 operates over a prolonged time period (such as overnight, when the concentrations have sufficient time to reach equilibrium zero values). However, ventilation is often partially or completely disabled overnight and therefore the two quantities φ and ψ are not related. However, CO2 concentration can be measured to determine common model parameters (e.g., for the overall system volume V) without being used to estimate current infectious particle concentrations. If fresh outdoor air ventilation is the only mechanism for disinfection of zones 206, and the HVAC system 200 is run so that the concentrations reach equilibrium, CO2 concentration can be measured and used to estimate current infectious particle concentrations.

Dynamic Extension and Infection Probability Constraints

Referring still to FIG. 3, it may be desirable to model the infectious quanta concentration N of building zones 206 as a dynamic parameter rather than assuming N is equal to the steady state $N_{SS}$ value. For example, if infectious individuals enter building zones 206, leave building zones 206, etc., the infectious quanta concentration N may change over time. This can also be due to the fact that the effective fresh air ventilation rate (which includes outdoor air intake as well as filtration or UV disinfection that affects the infectious agent concentration in the supply air that is provided by AHU 304 to zones 206) can vary as HVAC system 200 operates.

Therefore, assuming that the infectious quanta concentration N(t) is a time-varying quantity, for a given time period t∈ [0, T], an individual breathes in:

$$k_{[0,T]} = \int_0^T pk_0 N(t)dt$$

where $k_{[0,T]}$ is the number of infectious particles that an individual inhales over the given time period [0,T], p is the volumetric breath rate of one individual, $k_0$ is the quantum of particles for a particular disease, and N(t) is the time-varying quantum concentration of the infectious particle in the air.

Since $$P = 1 - \exp\left(-\frac{k}{k_0}\right),$$

the above equation can be rearranged and substitution yields:

$$-\log(1 - P_{[0,T]}) = \int_0^T pN(t)dt \approx \Delta \sum_t pN_t$$

according to some embodiments.

Assuming an upper boundary $$P_{[0,T]}^{max}$$

on acceptable or desirable infection probability, a constraint is defined as:

$$\frac{\Delta}{T}\sum_t N_t \leq -\frac{1}{pT}\log(1 - P_{[0,T]})$$

according to some embodiments. The constraint can define a fixed upper boundary on an average value of $N_t$ over the given time interval.

Control Formulation

Figure 4:
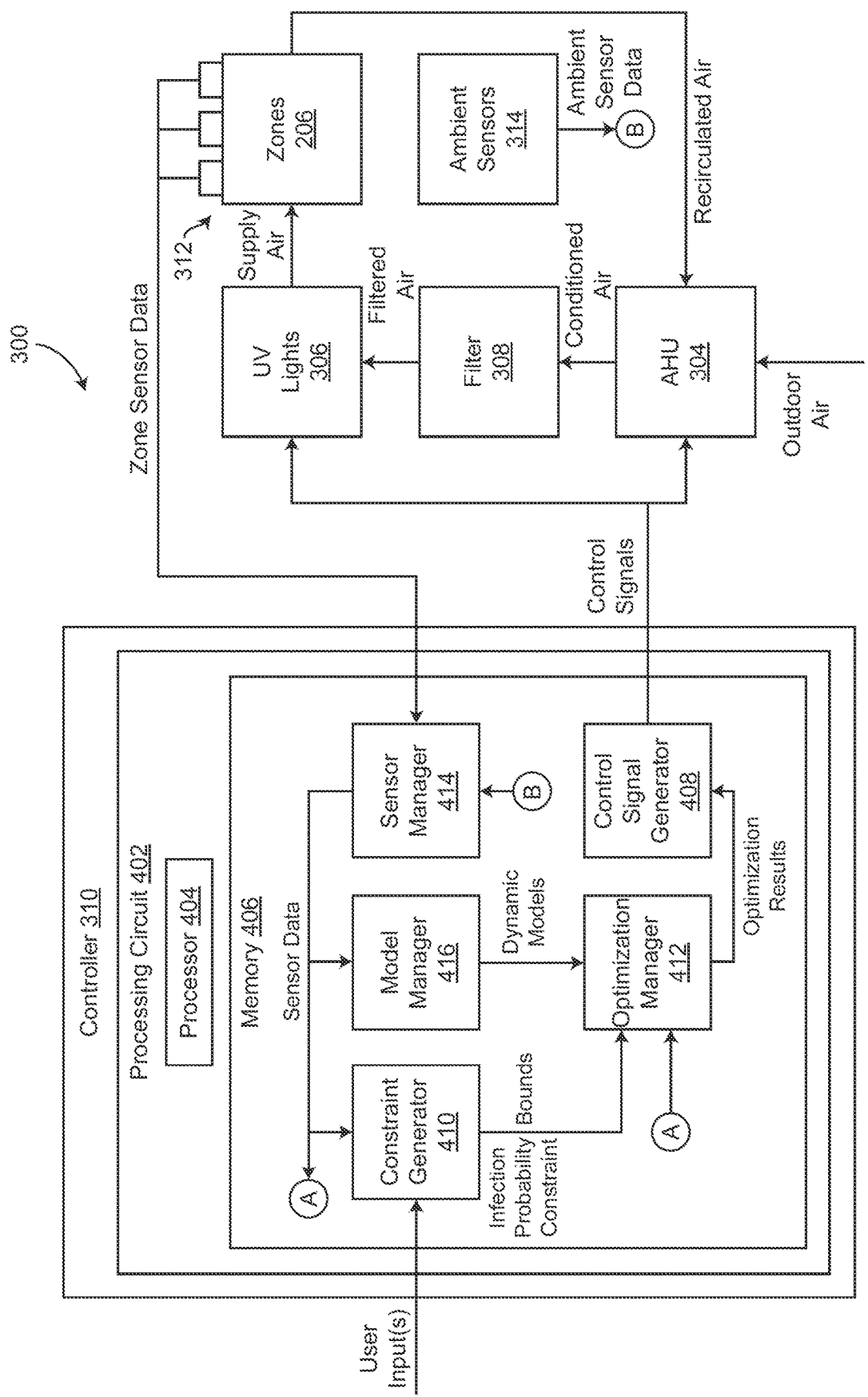
FIG. 4 is a block diagram illustrating the controller of FIG. 3 in greater detail, showing operations performed when the controller is used in an on-line mode or real-time implementation for making control decisions to minimize energy consumption of the HVAC system and provide sufficient disinfection, according to some embodiments.

Referring particularly to FIG. 4, controller 310 is shown in greater detail, according to some embodiments. Controller 310 is configured to generate control signals for any of UV lights 306, filter 308, and/or AHU 304. AHU 304 operates to draw outdoor air and/or recirculated air (e.g., from zones 206) to output conditioned (e.g., cooled) air. The conditioned air may be filtered by passing through filter 308 (e.g., which may include fans to draw the air through the filter 308) to output filtered air. The filtered air and/or the conditioned air can be disinfected through operation of UV lights 306. The AHU 304, filter 308, and UV lights 306 can operate in unison to provide supply air to zones 206.

Controller 310 includes a processing circuit 402 including a processor 404 and memory 406. Processing circuit 402 can be communicably connected with a communications interface of controller 310 such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

In some embodiments, controller 310 is implemented within a single computer (e.g., one server, one housing, etc.). In various other embodiments controller 310 can be distributed across multiple servers or computers (e.g., that can exist in distributed locations).

Memory 406 can include a constraint generator 410, a model manager 416, a sensor manager 414, an optimization manager 412, and a control signal generator 408. Sensor manager 414 can be configured to obtain zone sensor data from zone sensors 312 and/or ambient sensor data from ambient sensors 314 (e.g., environmental conditions, outdoor temperature, outdoor humidity, etc.) and distribute required sensor data to the various components of memory 406 thereof. Constraint generator 410 is configured to generate one or more constraints for an optimization problem (e.g., an infection probability constraint) and provide the constraints to optimization manager 412. Model manager 416 can be configured to generate dynamic models (e.g., individual or zone-by-zone dynamic models, aggregate models, etc.) and provide the dynamic models to optimization manager 412. Optimization manager 412 can be configured to use the constraints provided by constraint generator 410 and the dynamic models provided by model manager 416 to formulate an optimization problem. Optimization manager 412 can also define an objective function for the optimization problem, and minimize or optimize the objective function subject to the one or more constraints and the dynamic models. The objective function may be a function that indicates an amount of energy consumption, energy consumption costs, carbon footprint, or any other optimization goals over a time interval or time horizon (e.g., a future time horizon) as a function of various control decisions. Optimization manager 412 can output optimization results to control signal generator 408. Control signal generator 408 can generate control signals based on the optimization results and provide the control signals to any of AHU 304, filter 308, and/or UV lights 306.

Referring particularly to FIGS. 3 and 4, AHU 304 can be configured to serve multiple building zones 206. For example, AHU 304 can be configured to serve a collection of zones 206 that are numbered k=1, . . . , K. Each zone 206 can have a temperature, referred to as temperature $T_k$ (the temperature of the kth zone 206), a humidity $\omega_k$ (the humidity of the kth zone 206), and an infectious quanta concentration $N_k$ (the infectious quanta concentration of the kth zone 206). Using this notation, the following dynamic models of individual zones 206 can be derived:

$$\rho c V_k\left(\frac{dT_k}{dt}\right) = \rho c f_k(T_0 - T_k) + Q_k(T_k)$$

$$\rho V_k\left(\frac{d\omega_k}{dt}\right) = \rho f(\omega_0 - T_0) + w_k$$

$$V_k\left(\frac{dN_k}{dt}\right) = f_k(N_0 - N_k) + I_k q$$

where $f_k$ is a volumetric flow of air into the kth zone, $\rho$ is a mass density of air (e.g., in kg per cubic meters), c is the heat capacity of air (e.g., in kJ/kg·K), $Q_k(\cdot)$ is heat load on the kth zone 206 (which may depend on the temperature $T_k$), $w_k$ is the moisture gain of the kth zone 206, and $I_k$ is the number of infectious individuals in the kth zone 206. $T_0$ is the temperature of the air provided to the kth zone (e.g., as discharged by a VAV box of AHU 304), $\omega_0$ is the humidity of the air provided to the kth zone 206, and $N_0$ is the infectious quanta concentration of the air provided to the kth zone 206.

The temperature $T_0$ of air output by the AHU 304, the humidity $\omega_0$ of air output by the AHU 304, and the infectious quanta concentration $N_0$ of air output by the AHU 304 is calculated using the equations:

$$T_0 = xT_a + (1-x)\frac{\sum_k f_k T_k}{\sum_k f_k} - \Delta T_c$$

$$\omega_0 = x\omega_a + (1-x)\frac{\sum_k f_k \omega_k}{\sum_k f_k} - \Delta\omega_c$$

$$N_0 = (1-\lambda)(1-x)\frac{\sum_k f_k N_k}{\sum_k f_k}$$

where x is the fresh-air intake fraction of AHU 304, $T_a$ is current ambient temperature, $\omega_a$ is current ambient humidity, $\Delta T_c$ is temperature reductions from the cooling coil of AHU 304, $\Delta\omega_c$ is humidity reduction from the cooling coil of AHU 304, and $\lambda$ is a fractional reduction of infectious quanta due to filtration (e.g., operation of filter 308) and/or UV treatment (e.g., operation of UV lights 306) at AHU 304 (but not due to ventilation which is accounted for in the factor 1−x, according to some embodiments.

In some embodiments, the dynamic models of the individual zones are stored by and used by model manager 416. Model manager 416 can store the individual dynamic models shown above and/or aggregated models (described in greater detail below) and populate the models. The populated models can then be provided by model manager 416 to optimization manager 412 for use in performing an optimization.

In some embodiments, model manager 416 is configured to receive sensor data from sensor manager 414. Sensor manager 414 may receive sensor data from zone sensors 312 and/or ambient sensors 313 and provide appropriate or required sensor data to the various managers, modules, generators, components, etc., of memory 406. For example, sensor manager 414 can obtain values of the current ambient temperature $T_a$, the current ambient humidity $\omega_a$, the temperature reduction $\Delta T_c$ resulting from the cooling coil of AHU 304, and/or the humidity reduction $\Delta\omega_c$ resulting from the cooling coil of AHU 304, and provide these values to model manager 416 for use in determining $T_0$, $\omega_0$, and $N_0$ or for populating the dynamic models of the individual zones 206.

In some embodiments, various parameters or values of the variables of the dynamic models of the individual zones 206 are predefined, predetermined, or stored values, or may be determined (e.g., using a function, an equation, a table, a look-up table, a graph, a chart, etc.) based on sensor data (e.g., current environmental conditions of the ambient or outdoor area, environmental conditions of the zones 206, etc.). For example, the mass density of air p may be a predetermined value or may be determined based on sensor data. In some embodiments, model manager 416 can use stored values, sensor data, etc., to fully populate the dynamic models of the individual zones 206 (except for control or adjustable variables of the dynamic models of the individual zones 206 that are determined by performing the optimization). Once the models are populated so that only the control variables remain undefined or undetermined, model manager 416 can provide the populated models to optimization manager 412.

The number of infectious individuals $I_k$ can be populated based on sensor data (e.g., based on biometric data of occupants or individuals of the building zones 206), or can be estimated based on sensor data. In some embodiments, model manager 416 can use an expected number of occupants and various database regarding a number of infected individuals in an area. For example, model manager 416 can query an online database regarding potential infection spread in the area (e.g., number of positive tests of a particular virus or contagious illness) and estimate if it is likely that an infectious individual is in the building zone 206.

In some embodiments, it can be difficult to obtain zone-by-zone values of the number of infectious individuals $I_k$ in the modeled space (e.g., the zones 206). In some embodiments, model manager 416 is configured to use an overall approximation of the model for $N_k$. Model manager 416 can store and use volume-averaged variables:

$$\overline{N} = \frac{\sum_k V_k N_k}{\overline{V}}$$

$$\overline{f} = \sum_k f_k$$

$$\overline{V} = \sum_k V_k$$

$$\overline{I} = \sum_k I_k$$

according to some embodiments. Specifically, the equations shown above aggregate the variables $\overline{N}$, $\overline{f}$, $\overline{V}$, and $\overline{I}$ across multiple zones 206 by calculating a weighted average based on the volume of zones 206.

The K separate ordinary differential equation models (i.e., the dynamic models of the individual zones 206) can be added for $N_k$ to determine an aggregate quantum concentration model:

$$\overline{V}\frac{d\overline{N}}{dt} = \sum_k V_k \frac{dN_k}{dt}$$

$$= \sum_k (f_k(N_0 - N_k) + I_k q)$$

$$= \overline{I}q + \sum_k f_k\left((1-\lambda)(1-x)\frac{\sum_{k'} f_{k'} N_{k'}}{\sum_{k'} f_{k'}} - N_k\right)$$

$$= \overline{I}q + (1-\lambda)(1-x)\sum_{k'} f_{k'} N_{k'} - \sum_k f_k N_k$$

$$= \overline{I}q - (\lambda + x - \lambda x)\sum_k f_k N_k$$

$$\approx \overline{I}q - (\lambda + x - \lambda x)\overline{f}\overline{N}$$

according to some embodiments, assuming that $N_k \approx \overline{N}$ for each zone 206. The aggregate quantum concentration model is shown below:

$$V\frac{d\overline{N}}{dt} = \overline{T}q - (\lambda + x - \lambda x)\sum_k f_k N_k \approx \overline{T}q - (\lambda + x - \lambda x)\overline{f}\overline{N}$$

according to some embodiments.

Defining aggregate temperature, humidity, heat load, and moisture gain parameters:

$$\overline{T} = \frac{\sum_k V_k T_k}{\overline{V}}$$

$$\overline{\omega} = \frac{\sum_k V_k \omega_k}{\overline{V}}$$

$$\overline{Q}(\cdot) = \sum_k Q_k(\cdot)$$

$$\overline{w} = \sum_k w_k$$

allows the k thermal models $$\rho c V_k \left(\frac{dT_k}{dt}\right)$$

to be added:

$$\rho c \overline{V} \frac{d\overline{T}}{dt} = \sum_k \rho c V_k \frac{dT_k}{dt}$$

$$= \sum_k (\rho c f_k (T_0 - T_k) + Q_k(T_k))$$

$$= \sum_k Q_k(T_k) + \sum_k \rho c f_k \left(xT_a + (1-x)\frac{\sum_{k'} f_{k'} T_{k'}}{\sum_{k'} f_{k'}} - T_k - \Delta T_c\right)$$

$$= \sum_k Q_k(T_k) + (1-x)\sum_{k'} \rho c f_{k'} T_{k'} + \sum_k \rho f_k (xT_a - T_k - \Delta T_c)$$

$$= \sum_k Q_k(T_k) + \rho c \sum_k f_k (x(T_a - T_k) - \Delta T_c)$$

$$\approx \overline{Q}(\overline{T}) + \rho c \overline{f}(x(T_a - \overline{T}) - \Delta T_c)$$

according to some embodiments (assuming that $T_k \approx \overline{T}$ for each zone 206). This yields the aggregate thermal model:

$$\rho c \overline{V} \frac{d\overline{T}}{dt} =$$

$$\sum_k Q_k(T_k) + \rho c \sum_k f_k (x(T_a - T_k) - \Delta T_c) \approx \overline{Q}(\overline{T}) + \rho c \overline{f}(x(T_a - \overline{T}) - \Delta T_c)$$

according to some embodiments.

The moisture model $$\rho V_k \left(\frac{d\omega_k}{dt}\right)$$

can similarly be aggregated to yield an aggregate moisture model:

$$\rho \overline{V} \frac{d\overline{\omega}}{dt} = \overline{w} + \rho \sum_k f_k(x(\omega_a - \omega_k) - \Delta \omega_c) \approx \overline{w} + \rho \overline{f}(x(\omega_a - \overline{\omega}) - \Delta \omega_c)$$

to predict an evolution of volume-averaged humidity, according to some embodiments.

In some embodiments, model manager 416 stores and uses the aggregate quantum concentration model, the aggregate thermal model, and/or the aggregate moisture model described hereinabove. Model manager 416 can populate the various parameters of the aggregate models and provide the aggregate models to optimization manager 412 for use in the optimization.

Referring still to FIG. 4, memory 406 includes optimization manager 412. Optimization manager 412 can be configured to use the models provided by model manager 416 and various constraints provided by constraint generator 410 to construct an optimization problem for HVAC system 200 (e.g., to determine design outputs and/or to determine control parameters, setpoints, control decisions, etc., for UV lights 306 and/or AHU 304). Optimization manager 412 can construct an optimization problem that uses the individual or aggregated temperature, humidity, and/or quantum concentration models subject to constraints to minimize energy use. In some embodiments, decision variables of the optimization problem formulated and solved by optimization manager 412 are the flows $f_k$ (or the aggregate $\overline{f}$ if the optimization problem uses the aggregate models), the outdoor air fraction x and the infectious quanta removal fraction $\lambda$.

The infectious quanta removal fraction $\lambda$ is defined as:

$$\lambda = \lambda_{filter} + \lambda_{UV}$$

where $\lambda_{filter}$ is an infectious quanta removal fraction that results from using filter 308 (e.g., an amount or fraction of infectious quanta that is removed by filter 308), and $\lambda_{UV}$ is an infectious quanta removal fraction that results from using UV lights 306 (e.g., an amount or fraction of infectious quanta that is removed by operation of UV lights 306). In some embodiments, $\lambda_{filter}$ is a design-time constant (e.g., determined based on the chosen filter 308), whereas $\lambda_{UV}$ is an adjustable or controllable variable that can be determined by optimization manager 412 by performing the optimization of the optimization problem. In some embodiments, $\lambda_{UV}$ is a discrete variable. In some embodiments, $\lambda_{UV}$ is a continuous variable.

Instantaneous electricity or energy consumption of HVAC system 200 is modeled using the equation (e.g., an objective function that is minimized):

$$E = \eta_{coil}\rho\overline{f}(c\Delta T_c + L\Delta\omega_c) + \eta_{fan}\overline{f}\Delta P + \eta_{UV}\lambda_{UV}$$

where L is a latent heat of water, $\Delta P$ is a duct pressure drop, $\eta_{coil}$ is an efficiency of the cooling coil of AHU 304, $\eta_{fan}$ is an efficiency of a fan of AHU 304, and $\eta_{UV}$ is an efficiency of the UV lights 306, according to some embodiments. In some embodiments, optimization manager 412 is configured to store and use the energy consumption model shown above for formulating and performing the optimization. In some embodiments, the term $\eta_{coil}\rho\bar{f}(c\Delta T_c + L\Delta\omega_c)$ is an amount of energy consumed by the cooling coil or heating coil of the AHU 304 (e.g., over an optimization time period or time horizon), the term $\eta_{fan}\bar{f}\Delta P$ is an amount of energy consumed by the fan of the AHU 304, and $\eta_{UV}\lambda_{UV}$ is the amount of energy consumed by the UV lights 306. In some embodiments, the duct pressure drop $\Delta P$ is affected by or related to a choice of a type of filter 308, where higher efficiency filters 308 (e.g., filters 308 that have a higher value of $\eta_{filter}$) generally resulting in a higher value of the duct pressure drop $\Delta P$ and therefore greater energy consumption. In some embodiments, a more complex model of the energy consumption is used by optimization manager 412 to formulate the optimization problem (e.g., a non-linear fan model and a time-varying or temperature-dependent coil efficiency model).

In some embodiments, the variables $\Delta T_c$ and $\Delta\omega_c$ for the cooling coil of the AHU 304 are implicit dependent decision variables. In some embodiments, a value of a supply temperature $T_{AHU}$ is selected for the AHU 304 and is used to determine the variables $\Delta T_c$ and $\Delta\omega_c$ based on inlet conditions to the AHU 304 (e.g., based on sensor data obtained by sensor manager 414). In such an implementation, model manager 416 or optimization manager 412 may determine that $T_0 = T_{AHU}$ and an equation for $\omega_0$.

Optimization manager 412 can use the models (e.g., the individual models, or the aggregated models) provided by model manager 416, and constraints provided by constraint generator 410 to construct the optimization problem. Optimization manager 412 may formulate an optimization problem to minimize energy consumption subject to constraints on the modeled parameters, $\omega$, and N and additional constraints:

$$\min_{f_t, x_t, \lambda_t} \sum_t E_t \quad \text{(Energy Cost)}$$
$$\text{s.t.} \quad \ldots \quad \text{(Dynamic Models for } T_t, \omega_t, \text{ and } N_t\text{)}$$
$$\quad \ldots \quad \text{(Infection Probability Constraint)}$$
$$T_t^{min} \leq T_t \leq T_t^{max} \quad \text{(Temperature Bounds)}$$
$$\omega_t^{min} \leq \omega_t \leq \omega_t^{max} \quad \text{(Humidity Bounds)}$$
$$x_t f_t \geq F_t^{min} \quad \text{(Fresh-Air Ventilation Bound)}$$
$$f_t^{min} \leq f_t \leq f_t^{max} \quad \text{(VAV Flow Bounds)}$$
$$0 \leq x_t \leq 1 \quad \begin{pmatrix}\text{Outdoor-Damper Bounds}\\\text{Air}\end{pmatrix}$$

where $\sum_t E_t$ is the summation of instantaneous electricity or energy consumption of the HVAC system 200 over an optimization time period, subject to the dynamic models for $T_t$, $\omega_t$, and $N_t$ (either zone-by-zone individual models, or aggregated models as described above), an infection probability constraint (described in greater detail below), temperature boundary constraints $$T_t^{min} \leq T_t \leq T_t^{max},$$

maintaining $T_t$ between a minimum temperature boundary $$T_t^{min}$$

and a maximum temperature boundary $$T_t^{max}$$

humidity boundary constraints $$\omega_t^{min} \leq \omega_t \leq \omega_t^{max},$$

maintaining the humidity $\omega_t$ between a minimum humidity boundary $$\omega_t^{min}$$

and a maximum humidity boundary $$\omega_t^{max}$$

a fresh air ventilation boundary $$x_t f_t \geq F_t^{min},$$

maintaining the fresh air ventilation $x_t f_t$ above or equal to a minimum required amount $$F_t^{min}$$

a VAV flow boundary $$f_t^{min} \leq f_t \leq f_t^{max},$$

maintaining the volumetric flow rate $f_t$ between a minimum boundary $$f_t^{min}$$

and a maximum boundary $$f_t^{max}$$

and an outdoor air damper bound/constraint ($0 \leq x_t \leq 1$ maintaining the outdoor air fraction $x_t$ between 0 and 1). In some embodiments, optimization manager 412 is configured to discretize the dynamic models (e.g., the individual dynamic models or the aggregate dynamic models) using matrix exponentials or approximately using collocation methods.

The boundaries on tempearture $$\left(T_t^{min} \le T_t \le T_t^{max}\right)$$

and humidity $$\left(\omega_t^{min} \le \omega_t \le \omega_t^{max}\right)$$

can be determined by optimization manager 412 based on user inputs or derived from comfort requirements. The temperature and humidity bounds may be enforced by optimization manager 412 as soft constraints. The remaining bounds (e.g., the fresh-air ventilation bound, the VAV flow bounds, and the outdoor-air damper bounds) can be applied to input quantities (e.g., decision variables) by optimization manager 412 as hard constraints for the optimization. In some embodiments, the fresh-air ventilation bound is enforced by optimization manager 412 to meet the American Society of Heating, Refrigerating, and Air-Conditioning Engineers (ASHRAE) standards. In some embodiments, the fresh-air ventilation bound is replaced with a model and corresponding bounds for CO2 concentration.

In some embodiments, the various constraints generated by constraint generator 410 or other constraints imposed on the optimization problem can be implemented as soft constraints, hard constraints, or a combination thereof. Hard constraints may impose rigid boundaries (e.g., maximum value, minimum value) on one or more variables in the optimization problem such that any feasible solution to the optimization problem must maintain the hard constrained variables within the limits defined by the hard constraints. Conversely, soft constraints may be implemented as penalties that contribute to the value of the objective function (e.g., adding to the objective function if the optimization problem seeks to minimize the objective function or subtracting from the objective function if the optimization problem seeks to maximize the objective function). Soft constraints may be violated when solving the optimization problem, but doing so will incur a penalty that affects the value of the objective function. Accordingly, soft constraints may encourage optimization manager 412 to maintain the values of the soft constrained variables within the limits defined by the soft constraints whenever possible to avoid the penalties, but may allow optimization manager 412 to violate the soft constraints when necessary or when doing so would result in a more optimal solution.

In some embodiments, constraint generator 410 may impose soft constraints on the optimization problem by defining large penalty coefficients (relative to the scale of the other terms in the objective function) so that optimization manager 412 only violates the soft constraints when absolutely necessary. However, it is contemplated that the values of the penalty coefficients can be adjusted or tuned (e.g., by a person or automatically by constraint generator 410) to provide an optimal tradeoff between maintaining the soft constrained variables within limits and the resulting cost (e.g., energy cost, monetary cost) defined by the objective function. One approach which can be used by constraint generator 410 is to use penalties proportional to amount by which the soft constraint is violated (i.e., static penalty coefficients). For example, a penalty coefficient of 0.1 $/° C.·hr for a soft constrained temperature variable would add a cost of $0.10 to the objective function for every 1° C. that the temperature variable is outside the soft constraint limit for every hour of the optimization period. Another approach which can be used by constraint generator 410 is to use variable or progressive penalty coefficients that depend on the amount by which the soft constraint is violated. For example, a variable or progressive penalty coefficient could define a penalty cost of 0.1 $/° C.·hr for the first 1° C. by which a soft constrained temperature variable is outside the defined limit, but a relatively higher penalty cost of 1.0 $/° C.·hr for any violations of the soft constrained temperature limit outside the first 1° C.

Another approach which can be used by constraint generator 410 is to provide a "constraint violation budget" for one or more of the constrained variables. The constraint violation budget may define a total (e.g., cumulative) amount by which a constrained variable is allowed to violate a defined constraint limit within a given time period. For example a constraint violation budget for a constrained temperature variable may define 30° C.·hr (or any other value) as the cumulative amount by which the constrained temperature variable is allowed to violate the temperature limit within a given time period (e.g., a day, a week, a month, etc.). This would allow the temperature to violate the temperature constraint by 30° C. for a single hour, 1° C. for each of 30 separate hours, 0.1° C. for each of 300 separate hours, 10° C. for one hour and 1° C. for each of 20 separate hours, or any other distribution of the 30° C.·hr amount across the hours of the given time period, provided that the cumulative temperature constraint violation sums to 30° C.·hr or less. As long as the cumulative constraint violation amount is within (e.g., less than or equal to) the constraint violation budget, constraint generator 410 may not add a penalty to the objective function or subtract a penalty from the objective function. However, any further violations of the constraint that exceed the constraint violation budget may trigger a penalty. The penalty can be defined using static penalty coefficients or variable/progressive penalty coefficients as discussed above.

The infection probability constraint (described in greater detail below) is linear, according to some embodiments. In some embodiments, two sources of nonlinearity in the optimization problem are the dynamic models and a calculation of the coil humidity reduction $\Delta\omega_c$. In some embodiments, the optimization problem can be solved using nonlinear programming techniques provided sufficient bounds are applied to the input variables.

Infection Probability Constraint

Referring still to FIG. 4, memory 406 is shown to include a constraint generator 410. Constraint generator 410 can be configured to generate the infection probability constraint, and provide the infection probability constraint to optimization manager 412. In some embodiments, constraint generator 410 is configured to also generate the temperature bounds, the humidity bounds, the fresh-air ventilation bound, the VAV flow bounds, and the outdoor-air damper bounds and provide these bounds to optimization manager 412 for performing the optimization.

For the infection probability constraint, the dynamic extension of the Wells-Riley equation implies that there should be an average constraint over a time interval during which an individual is in the building. An individual i's probability of infection $P_{i,[0,T]}$ over a time interval [0, T] is given by:

$$P_{i,[0,T]} = 1 - \exp\left(-p\Delta \sum_t \delta_{it} N_t\right), \quad \delta_{it} = \begin{cases} 1 & \text{if } i \text{ present at time } t \\ 0 & \text{else} \end{cases}$$

according to some embodiments. Assuming that the individual's probability of infection $P_{i,[0,T]}$ is a known value, an upper bound $P^{max}$ can be chosen for $P_{i,[0,T]}$ and can be implemented as a linear constraint:

$$\sum_t \delta_{it} N_t \leq -\frac{1}{p\Delta}\log(1 - P^{max})$$

according to some embodiments. In some embodiments, the variable $\delta_{it}$ may be different for each individual in the building 10 but can be approximated as described herein.

The above linear constraint is an average constraint that gives optimization manager 412 (e.g., an optimizer) a maximum amount of flexibility since the average constraint may allow a higher concentration of infectious quanta during certain times of the day (e.g., when extra fresh-air ventilation is expensive due to outdoor ambient conditions) as long as the higher concentrations are balanced by lower concentrations of the infectious quanta during other times of the day. However, the $\delta_{it}$ sequence may be different for each individual in the building 10. For purposes of the example described herein it is assumed that generally each individual is present a total of 8 hours (e.g., if the building 10 is an office building). However, the estimated amount of time the individual is within the building can be adjusted or set to other values for other types of buildings. For example, when the systems and methods described herein are implemented in a restaurant or store, the amount of time the individual is assumed to be present in the building can be set to an average or estimated amount of time required to complete the corresponding activities (e.g., eating a meal, shopping, etc.). While an occupancy time of the building by each individual may be reasonably known, the times that the individual is present in the building may vary (e.g., the individual may be present from 7 AM to 3 PM, 9 AM to 5 PM, etc.). Therefore, to ensure that the constraint is satisfied for all possible $\delta_{it}$ sequences, the constraint may be required to be satisfied when summing over 8 hours of the day that have a highest concentration.

This constraint is represented using linear constraints as:

$$M\eta + \sum_t \mu_t \leq -\frac{1}{p\Delta}\log(1 - P^{max})$$

$$\mu_t + \eta \geq N_t \; \forall \, t$$

where $\eta$ and $\mu_t$ are new auxiliary variables in the optimization problem, and M is a number of discrete timesteps corresponding to 8 hours (or any other amount of time that an individual is expected to occupy building 10 or one of building zones 206). This formulation may work since $\eta$ is set to an Mth highest value of $N_t$ and each of the $\mu_t$ satisfy $\mu_t = \max(N_t - \eta, 0)$. Advantageously, this implementation of the infection probability constraint can be generated by constraint generator 410 and provided to optimization manager 412 for use in the optimization problem when controller 310 is implemented to perform control decisions for HVAC system 200 (e.g., when controller 310 operates in an on-line mode).

An alternative implementation of the infection probability constraint is shown below that uses a pointwise constraint:

$$N_t \leq N_t^{max} = -\frac{1}{Mp\Delta}\log(1 - P^{max})$$

where $N_t$ is constrained to be less than or equal to $N_t^{max}$ for a maximum infection probability value $P^{max}$. In some embodiments, the pointwise constraint shown above is generated by constraint generator 410 for when optimization manager 412 is used in an off-line or design implementation. In some embodiments, the pointwise constraint shown above, if satisfied in all zones 206, ensures that any individual will meet the infection probability constraint. Such a constraint may sacrifice flexibility compared to the other implementation of the infection probability constraint described herein, but translates to a simple box constraint similar to the other bounds in the optimization problem, thereby facilitating a simpler optimization process.

In some embodiments, the maximum allowable or desirable infection probability $P^{max}$ is a predetermined value that is used by constraint generator 410 to generate the infection probability constraints described herein. In some embodiments, constraint generator 410 is configured to receive the maximum allowable or desirable infection probability $P^{max}$ from a user as a user input. In some embodiments, the maximum allowable or desirable infection probability $P^{max}$ is an adjustable parameter that can be set by a user or automatically generated based on the type of infection, time of year, type or use of the building, or any of a variety of other factors. For example, some buildings (e.g., hospitals) may be more sensitive to preventing disease spread than other types of buildings and may use lower values of $P^{max}$. Similarly, some types of diseases may be more serious or life-threatening than others and therefore the value of $P^{max}$ can be set to relatively lower values as the severity of the disease increases. In some embodiments, the value of $P^{max}$ can be adjusted by a user and the systems and methods described herein can run a plurality of simulations or optimizations for a variety of different values of $P^{max}$ to determine the impact on cost and disease spread. A user can select the desired value of $P^{max}$ in view of the estimated cost and impact on disease spread using the results of the simulations or optimizations.

Model Enhancements

Referring still to FIG. 4, optimization manager 412, constraint generator 410, and/or model manager 416 can implement various model enhancements in the optimization. In some embodiments, optimization manager 412 is configured to add a decision variable for auxiliary (e.g., controlled) heating (e.g., via baseboard heat or VAV reheat coils). In some embodiments, an effect of the auxiliary heating is included in the dynamic model of temperature similar to the disturbance heat load $Q_k(\cdot)$. Similar to the other decision variables, the auxiliary heating decision variable may be subject to bounds (e.g., with both set to zero during cooling season to disable auxiliary heating) that are generated by constraint generator 410 and used by optimization manager 412 in the optimization problem formulation and solving. In some embodiments, the auxiliary heating also results in optimization manager 412 including another term for associated energy consumption in the energy consumption equation (shown above) that is minimized.

In some embodiments, certain regions or areas may have variable electricity prices and/or peak demand charges. In some embodiments, the objective function (e.g., the energy consumption equation) can be augmented by optimization manager 412 to account for such cost structures. For example, the existing energy consumption $E_t$ that is minimized by optimization manager 412 may be multiplied by a corresponding electricity price $P_t$. A peak demand charge may require the use of an additional parameter $e_t$ that represents a base electric load of building 10 (e.g., for non-HVAC purposes). Optimization manager 412 can include such cost structures and may minimize overall cost associated with electricity consumption rather than merely minimizing electrical consumption. In some embodiments, optimization manager 412 accounts for revenue which can be generated by participating in incentive based demand response (IBDR) programs, frequency regulation (FR) programs, economic load demand response (ELDR) programs, or other sources of revenue when generating the objective function. In some embodiments, optimization manager 412 accounts for the time value of money by discounting future costs or future gains to their net present value. These and other factors which can be considered by optimization manager 412 are described in detail in U.S. Pat. No. 10,359, 748 granted Jul. 23, 2019, U.S. Patent Application Publication No. 2019/0347622 published Nov. 14, 2019, and U.S. Patent Application Publication No. 2018/0357577 published Dec. 13, 2018, each of which is incorporated by reference herein in its entirety.

In some embodiments, certain locations have time-varying electricity pricing, and therefore there exists a potential to significantly reduce cooling costs by using a solid mass of building 10 for thermal energy storage. In some embodiments, controller 310 can operate to pre-cool the solid mass of building 10 when electricity is cheap so that the solid mass can later provide passive cooling later in the day when electricity is less expensive. In some embodiments, optimization manager 412 and/or model manager 416 are configured to model this effect using a model augmentation by adding a new variable $$T_k^m$$

to represent the solid mass of the zone 206 evolving as:

$$\rho c_m V_k^m \frac{dT_k^m}{dt} = h_k^m (T_k - T_k^m)$$

with a corresponding term:

$$\rho c V_k \frac{dT_k}{dt} = \ldots + h_k^m (T_k^m - T_k)$$

added to the air temperature model (shown above). This quantity can also be aggregated by model manager 416 to an average value $T^m$ similar to $T$.

For some diseases, infectious particles may naturally become deactivated or otherwise removed from the air over time. To consider these effects, controller 310 can add a proportional decay term to the infectious quanta model (in addition to the other terms of the infectious quanta model discussed above). An example is shown in the following equation:

$$V \frac{dN}{dt} = \ldots - V\beta N$$

where $\beta$ represents the natural decay rate (in $s^{-1}$) of the infectious species and the ellipsis represents the other terms of the infectious quanta model as discussed above. Because the natural decay subtracts from the total amount of infectious particles, the natural decay term is subtracted from the other terms in the infectious quanta model. For example, if a given infectious agent has a half-life $t_{1/2}$ of one hour (i.e., $t_{1/2}=1$ hr=3600 s), then the corresponding decay rate is given by:

$$\beta = \frac{\ln(2)}{t_{1/2}} \approx 1.925 \times 10^{-4} s^{-1}$$

This extra term can ensure that infectious particle concentrations do not accumulate indefinitely over extremely long periods of time.

Off-Line Optimization

Figure 5:
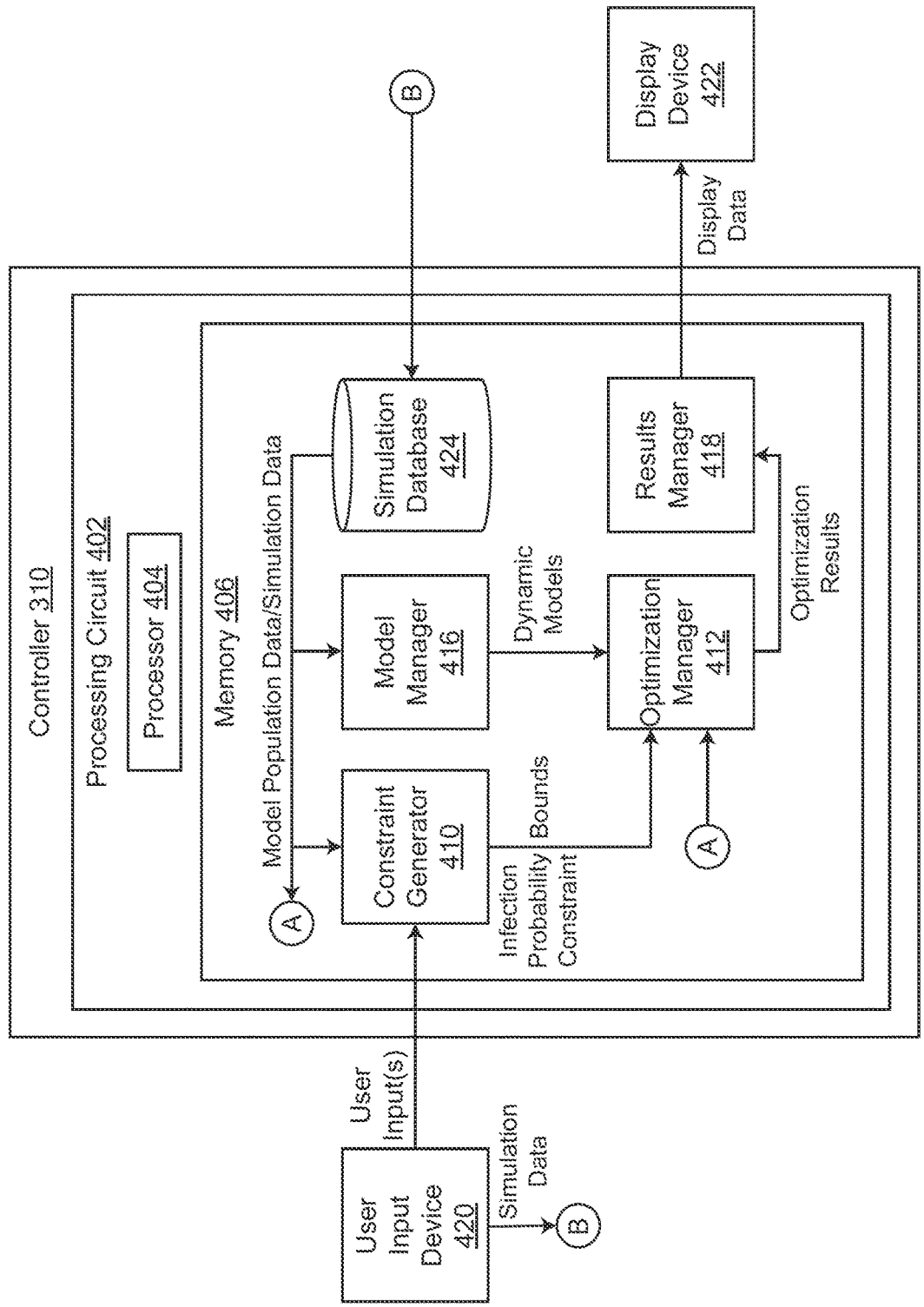
FIG. 5 is a block diagram illustrating the controller of FIG. 3 in greater detail, showing operations performed when the controller is used in an off-line or planning mode for making design suggestions to minimize energy consumption of the HVAC system and provide sufficient disinfection, according to some embodiments.

Referring particularly to FIG. 5, controller 310 can be configured for use as a design or planning tool for determining various design parameters of HVAC system 300 (e.g., for determining a size of filter 308, UV lights 306, etc.). In some embodiments, controller 310 implemented as a design tool, a planning tool, a recommendation tool, etc., (e.g., in an off-line mode) functions similarly to controller 310 implemented as a real-time control device (e.g., in an on-line mode). However, model manager 416, constraint generator 410, and optimization manager 412 may receive required sensor input data (i.e., model population data) from a simulation database 424. Simulation database 424 can store values of the various parameters of the constraints or boundaries, the dynamic models, or typical energy consumption costs or operational parameters for energy-consuming devices of the HVAC system 200. In some embodiments, simulation database 424 also stores predicted or historical values as obtained from sensors of HVAC system 200. For example, simulation database 424 can store typical ambient temperature, humidity, etc., conditions for use in performing the off-line simulation.

When controller 310 is configured for use as the design tool (shown in FIG. 5), controller 310 may receive user inputs from user input device 420. The user inputs may be initial inputs for various constraints (e.g., a maximum value of the probability of infection for the simulation) or various required input parameters. The user can also provide simulation data for simulation database 424 used to populate the models or constraints, etc. Controller 310 can output suggestions of whether to use a particular piece of equipment (e.g., whether or not to use or install UV lights 306), whether to use AHU 304 to draw outside air, etc., or other factors to minimize cost (e.g., to optimize the objective function, minimize energy consumption, minimize energy consumption monetary cost, etc.) and to meet disinfection goals (e.g., to provide a desired level of infection probability). In some embodiments, controller 310 may provide different recommendations or suggestions based on a location of building 10. In some embodiments, the recommendations notify the user regarding what equipment is needed to keep the infection probability of zones 206 within the threshold while not increasing energy cost or carbon footprint.

Compared to the on-line optimization (described in greater detail below), the optimization problem formulated by optimization manager 412 for the off-line implementation includes an additional constraint on the infectious quanta concentration (as described in greater detail above). In some embodiments, the infectious quanta concentration can be controlled or adjusted by (a) changing the airflow into each zone 206 (e.g., adjusting $f_i$), (b) changing the fresh-air intake fraction (e.g., adjusting x), or (c) destroying infectious particles in the AHU 304 via filtration or UV light (e.g., adjusting $\lambda$).

It should be noted that the first and second control or adjustments (e.g., (a) and (b)) may also affect temperature and humidity of the zones 206 of building 10. However, the third control option (c) (e.g., adjusting the infectious quanta concentration through filtration and/or operation of UV lights) is independent of the temperature and humidity of the zones 206 of building 10 (e.g., does not affect the temperature or humidity of zones 206 of building 10). In some embodiments, optimization manager 412 may determine results that rely heavily or completely on maintaining the infectious quanta concentration below its corresponding threshold or bound through operation of filter 308 and/or UV lights 306. However, there may be sufficient flexibility in the temperature and humidity of building zone 206 so that optimization manager 412 can determine adjustments to (a), (b), and (c) simultaneously to achieve lowest or minimal operating costs (e.g., energy consumption). Additionally, since purchasing filters 308 and/or UV lights 306 may incur significant capital costs (e.g., to purchase such devices), controller 310 may perform the optimization as a simulation to determine if purchasing filters 308 and/or UV lights 306 is cost effective.

When controller 310 is configured as the design tool shown in FIG. 5, controller 310 may provide an estimate of a total cost (both capital costs and operating costs) to achieve a desired level of infection control (e.g., to maintain the infection probability below or at a desired amount). The purpose is to run a series of independent simulations, assuming different equipment configurations (e.g., as stored and provided by simulation database 424) and for different infection probability constraints given typical climate and occupancy data (e.g., as stored and provided by simulation database 424). In some embodiments, the different equipment configurations include scenarios when filters 308 and/or UV lights 306 are installed in the HVAC system 200, or when filters 308 and/or UV lights 306 are not installed in the HVAC system 200.

After performing the simulation for different equipment configuration scenarios and/or different infection probability constraints, controller 310 can perform a cost benefit analysis based on global design decisions (e.g., whether or not to install UV lights 306 and/or filters 308). The cost benefit analysis may be performed by results manager 418 and the cost benefit analysis results can be output as display data to a building manager via display device 422. These results may aid the building manager or a building designer in assessing potential options for infection control of building 10 (as shown in FIG. 8).

Referring particularly to FIGS. 5 and 8, graph 800 illustrates a potential output of results manager 418 that can be displayed by display device 422. Graph 800 illustrates relative cost (the Y-axis) with respect to infection probability (the X-axis) for a case when both filtration and UV lights are used for infection control (represented by series 808), a case when filtration is used for infection control without using UV lights (represented by series 802), a case when UV lights are used for infection control without using filtration (represented by series 806), and a case when neither UV lights and filtration are used for infection control (represented by series 804). In some embodiments, each of the cases illustrated by series 802-808 assume that fresh-air intake is used to control infection probability. Data associated with graph 800 can be output by results manager 418 so that graph 800 can be generated and displayed on display device 422.

In some embodiments, the off-line optimization performed by optimization manager 412 is faster or more computationally efficient than the on-line optimization performed by optimization manager 412. In some embodiments, the simulation is performed using conventional rule-based control rather than a model-predictive control scheme used for the on-line optimization. Additionally, the simulation may be performed over shorter time horizons than when the optimization is performed in the on-line mode to facilitate simulation of a wide variety of design conditions.

In some embodiments, optimization manager 412 is configured to use the aggregate dynamic models as generated, populated, and provided by model manager 416 for the off-line optimization (e.g., the design optimization). When optimization manager 412 uses the aggregate dynamic models, this implies that there are three decision variables of the optimization: $\bar{f}$, x, and λ. The variable λ can include two positions at each timestep (e.g., corresponding to the UV lights 306 being on or the UV lights 306 being off). A reasonable grid size of $\bar{f}$ and x may be 100. Accordingly, this leads to 100×100×2=20,000 possible combinations of control decisions at each step, which is computationally manageable. Therefore, optimization manager 412 can select values of the variables $\bar{f}$, x, and λ via a one-step restriction of the optimization problem by simply evaluating all possible sets of control inputs and selecting the set of control inputs that achieves a lowest cost.

If additional variables are used, such as an auxiliary heating variable, this may increase the dimensionality of the optimization problem. However, optimization manager 412 can select a coarser grid (e.g., 5 to 10 choices) for the additional variable.

In some embodiments, optimization manager 412 is configured to solve a number of one-step optimization problems (e.g., formulate different optimization problems for different sets of the control variables and solve the optimization problem over a single timestep) in a training period, and then train a function approximator (e.g., a neural network) to recreate a mapping. This can improve an efficiency of the optimization. In some embodiments, optimization manager 412 is configured to apply a direct policy optimization to the dynamic models in order to directly learn a control law using multiple parallel optimization problems.

In some embodiments, when controller 310 functions as the design tool shown in FIG. 5, there are two design variables. The first design variable is whether it is cost effective or desirable to purchase and install UV lights 306, and the second design variable is whether it is cost effective or desirable to purchase and install filters 308 (e.g., advanced filtration devices).

In some embodiments, optimization manager 412 is configured to perform a variety of simulations subject to different simulation variables for each simulation month. These simulation variables can be separated into a design decision category and a random parameter category. The design decision category includes variables whose values are chosen by system designers, according to some embodiments. The random parameters category includes variables whose values are generated by external (e.g., random) processes.

The design decision category can include a first variable of whether to activate UV lights 306. The first variable may have two values (e.g., a first value for when UV lights 306 are activated and a second value for when UV lights 306 are deactivated). The design decision category can include a second decision variable of which of a variety of high-efficiency filters to use, if any. The second variable may have any number of values that the building manager wishes to simulate (e.g., 5) and can be provided via user input device 420. The design decisions category can also include a third variable of what value should be used for the infection probability constraint (as provided by constraint generator 410 and used in the optimization problem by optimization manager 412). In some embodiments, various values of the third variable are also provided by the user input device 420. In some embodiments, various values of the third variable are predetermined or stored in simulation database 424 and provided to optimization manager 412 for use in the simulation. The third variable may have any number of values as desired by the user (e.g., 3 values).

The random parameters category can include an ambient weather and zone occupancy variable and a number of infected individuals that are present in building 10 variable. In some embodiments, the ambient weather and zone occupancy variable can have approximately 10 different values. In some embodiments, the number of infected individuals present can have approximately 5 different values.

In order to determine a lowest cost for a given month, optimization manager 412 can aggregate the variables in the random parameters category (e.g., average) and then perform an optimization to minimize the energy consumption or cost over feasible values of the variables of the design decisions category. In some embodiments, some of the design-decision scenarios are restricted by a choice of global design decisions. For example, for optimization manager 412 to calculate monthly operating costs assuming UV lights 306 are chosen to be installed but not filtration, optimization manager 412 may determine that a lowest cost scenario across all scenarios is with no filtration but with the UV lights 306 enabled or disabled. While this may be unusual (e.g., for the UV lights 306 to be disabled) even though the UV lights 306 are installed, various conditions (e.g., such as weather) may make this the most cost effective solution.

In some embodiments, simulation logic performed by optimization manager 412 may be performed in a Tensorflow (e.g., as operated by a laptop computer, or any other sufficiently computationally powerful processing device). In order to perform 1,500 simulation scenarios for each month, or 18,000 for an entire year, with a timestep of 15 minutes, this implies a total of approximately 52 million timesteps of scenarios for a given simulation year.

In some embodiments, optimization manager 412 requires various simulation data in order to perform the off-line simulation (e.g., to determine the design parameters). In some embodiments, the simulation data is stored in simulation database 424 and provided to any of constraint generator 410, model manager 416, and/or optimization manager 412 as required to perform their respective functions. The simulation data stored in simulation database 424 can include heat-transfer parameters for each zone 206, thermal and moisture loads for each zone 206, coil model parameters of the AHU 304, fan model parameters of the AHU 304, external temperature, humidity, and solar data, filtration efficiency, pressure drop, and cost versus types of the filter 308, disinfection fraction and energy consumption of the UV lights 306, installation costs for the UV lights 306 and the filter 308, typical breathing rate p, a number of infected individuals T in building zones 206, and disease quanta generation q values for various diseases. In some embodiments, the heat-transfer parameters for each zone 206 may be obtained by simulation database 424 from previous simulations or from user input device 420. In some embodiments, the thermal and moisture loads for each zone 206 are estimated based on an occupancy of the zones 206 and ASHRAE guidelines. After this simulation data is obtained in simulation database 424, controller 310 may perform the simulation (e.g., the off-line optimization) as described herein.

It should be understood that as used throughout this disclosure, the term "optimization" may signify a temporal optimization (e.g., across a time horizon) or a static optimization (e.g., at a particular moment in time, an instantaneous optimization). In some embodiments, optimization manager 412 is configured to either run multiple optimizations for different equipment selections, or is configured to treat equipment configurations as decision variables and perform a single optimization to determine optimal equipment configurations.

It should also be understood that the term "design" as used throughout this disclosure (e.g., "design data" and/or "design tool") may include equipment recommendations (e.g., recommendations to purchase particular equipment or a particular type of equipment such as a particular filter) and/or operational recommendations for HVAC system 200. In other words, "design data" as used herein may refer to any information, metrics, operational data, guidance, suggestion, etc., for selecting equipment, an operating strategy, or any other options to improve financial metrics or other control objectives (e.g., comfort and/or infection probability).

For example, controller 310 as described in detail herein with reference to FIG. 5 may be configured to provide recommendations of specific models to purchase. In some embodiments, controller 310 is configured to communicate with an equipment performance database to provide product-specific selections. For example, controller 310 can search the database for equipment that has particular specifications as determined or selected by the optimization. In some embodiments, controller 310 may also provide recommended or suggested control algorithms (e.g., model predictive control) as the design data. In some embodiments, controller 310 may provide a recommendation or suggestion of a general type of equipment or a general equipment configuration without specifying a particular model. In some embodiments, controller 310 may also recommend a specific filter or a specific filter rating. For example, optimization manager 412 can perform multiple optimizations with different filter ratings and select the filter ratings associated with an optimal result.

On-Line Optimization

Referring again to FIG. 4, controller 310 can be implemented as an on-line controller that is configured to determine optimal control for the equipment of building 10. Specifically, controller 310 may determine optimal operation for UV lights 306 and AHU 304 to minimize energy consumption after UV lights 306 and/or filter 308 are installed and HVAC system 200 is operational. When controller 310 is configured as an on-line controller, controller 310 may function similarly to controller 310 as configured for off-line optimization and described in greater detail above with reference to FIG. 5. However, controller 310 can determine optimal control decisions for the particular equipment configuration of building 10.

In some embodiments, optimization manager 412 is configured to perform model predictive control similar to the techniques described in U.S. patent application Ser. No.

15/473,496, filed Mar. 29, 2017, the entire disclosure of which is incorporated by reference herein.

While optimization manager 412 can construct and optimize the optimization problem described in greater detail above, and shown below, using MPC techniques, a major difference is that optimization manager 412 performs the optimization with an infectious quanta concentration model as described in greater detail above.

$$\min_{f_t, x_t, \lambda_t} \sum_t E_t \quad \text{(Energy Cost)}$$

s.t. ⋯ (Dynamic Models for $T_t$, $\omega_t$, and $N_t$)

⋯ (Infection Probability Constraint)

$T_t^{min} \leq T_t \leq T_t^{max}$ (Temperature Bounds)

$\omega_t^{min} \leq \omega_t \leq \omega_t^{max}$ (Humidity Bounds)

$x_t f_t \geq F_t^{min}$ (Fresh–Air Ventilation Bound)

$f_t^{min} \leq f_t \leq f_t^{max}$ (VAV Flow Bounds)

$0 \leq x_t \leq 1$ (Outdoor–Air Damper Bounds)

Therefore, the resulting optimization problem has additional constraints on this new variable (the infectious quanta concentration) but also new flexibility by determined decisions for activating UV lights 306. In some embodiments, the optimization performed by optimization manager 412 can balance, in real time, a tradeoff between takin gin additional outdoor air (which generally incurs a cooling energy penalty) and activating the UV lights 306 (which requires electricity consumption). Additionally, the addition of infectious agent control can also provide additional room optimization of HVAC system 200 during a heating season (e.g., during winter). Without considering infectious quanta concentrations, solutions generally lead to a minimum outdoor airflow below a certain break-even temperature, below which heating is required throughout building 10. However, since the optimization problem formulated by optimization manager 412 can determine to increase outdoor air intake, this can provide an additional benefit of disinfection.

For purposes of real-time or on-line optimization, the HVAC system 200 can be modeled on a zone-by-zone basis due to zones 206 each having separate temperature controllers and VAV boxes. In some embodiments, zone-by-zone temperature measurements are obtained by controller 310 from zone sensors 312 (e.g., a collection of temperature, humidity, CO2, air quality, etc., sensors that are positioned at each of the multiple zones 206). In some embodiments, optimization manager 412 is configured to use zone-level temperature models but aggregate humidity and infectious quanta models for on-line optimization. Advantageously, this can reduce a necessary modeling effort and a number of decision variables in the optimization problem. In some embodiments, if the AHU 304 serves an excessive number of zones 206, the zone-level thermal modeling may be too computationally challenging so optimization manager 412 can use aggregate temperature models.

After optimization manager 412 has selected whether to use individual or aggregate models (or some combination thereof), optimization manager 412 can implement a constraint in the form:

$$\frac{dx}{dt} = f(x(t), u(t), p(t)) \text{ for all } t \in [0, T]$$

given a horizon t, where u(t) is a decision, control, or adjustable variable, and p(t) are time-varying parameters (the values of which are forecasted ahead of time). In some embodiments, optimization manager 412 is configured to implement such a constraint by discretizing the u(t) and p(t) signals into piecewise-constant values $u_n$ and $p_n$ where the discrete index n represents the time interval $t \in [n\Delta, (n+1)\Delta]$ for a fixed sample time $\Delta$. Optimization manager 412 may then transform the constraint to:

$$\frac{dx}{dt} = f(x(t), u_j, p_j) \text{ for all } t \in [n\Delta, (n+1)\Delta] \text{ and } n \in \{0, \ldots, N-1\}$$

where $N=T/\Delta$ the total number of timesteps. In some embodiments, optimization manager 412 is configured to evaluate this constraint using advanced quadrature techniques. For example, optimization manager 412 may transform the constraint to:

$$x_{n+1} = F(x_n, u_n, p_n)$$

where x(t) is discretized to $x_n$ and F(·) represents a numerical quadrature routine. In some embodiments, if the models provided by model manager 416 are sufficiently simple, optimization manager 412 can derive an analytical expression for F(·) to perform this calculation directly.

In some embodiments, optimization manager 412 uses an approximate midpoint method to derive the analytical expression:

$$x_{n+1} = x_k + f\left(\frac{x_{n+1} + x_n}{2}, u_n, p_n\right)\Delta$$

where the ordinary differential equation f(·) is evaluated at a midpoint of the time interval.

In some embodiments, optimization manager 412 is configured to repeatedly solve the optimization problem at regular intervals (e.g., every hour) to revise an optimized sequence of inputs for control signal generator 408. However, since the optimization is nonlinear and nonconvex, it may be advantageous to decrease a frequency at which the optimization problem is solved to provide additional time to retry failed solutions.

In some embodiments, optimization manager 412 uses a daily advisory capacity. For example, optimization manager 412 may construct and solve the optimization problem once per day (e.g., in the morning) to determine optimal damper positions (e.g., of AHU 304), UV utilizations (e.g., operation of UV lights 306), and zone-level airflows. Using the results of this optimization, optimization manager 412 may be configured to pre-schedule time-varying upper and lower bounds on the various variables of the optimized solution, but with a range above and below so that optimization manager 412 can have sufficient flexibility to reject local disturbances. In some embodiments, regulatory control systems of HVAC system 200 are maintained but may saturate at new tighter bounds obtained from the optimization problem. However, optimization manager 412 may be configured to re-optimize during a middle of the day if ambient sensor data from ambient sensors 314 (e.g., ambient temperature, outdoor temperature, outdoor humidity, etc.) and/or weather forecasts and/or occupancy forecasts indicate that the optimization should be re-performed (e.g., if the weather forecasts are incorrect or change).

In some embodiments, optimization manager 412 is configured to reduce an amount of optimization by training a neural network based on results of multiple offline optimal solutions (e.g., determined by controller 310 when performing off-line optimizations). In some embodiments, the neural network is trained to learn a mapping between initial states and disturbance forecasts to optimal control decisions. The neural network can be used in the online implementation of controller 310 as a substitute for solving the optimization problem. One advantage of using a neural network is that the neural network evaluation is faster than performing an optimization problem, and the neural network is unlikely to suggest poor-quality local optima (provided such solutions are excluded from the training data). The neural network may, however, return nonsensical values for disturbance sequences. However, this downside may be mitigated by configuring controller 310 to use a hybrid trust-region strategy in which optimization manager 412 solves the optimization problem via direct optimization at a beginning of the day, and then for the remainder of the day, controller 310 uses neural-network suggestions if they are within a predefined trust region of the optimal solution. If a neural-network suggestion is outside of the predefined trust region, optimization manager 412 may use a previous optimal solution that is within the predefined trust region.

In some embodiments, the optimization problem is formulated by optimization manager 412 assuming the zone-level VAV flows $f_k$ are the decision variables. In some systems, however, a main interface between controller 310 and equipment of HVAC system 200 is temperature setpoints that are sent to zone-level thermostats. In some embodiments, optimization manager 412 and control signal generator 408 are configured to shift a predicted optimal temperature sequence backward by one time interval and then pass these values (e.g., results of the optimization) as the temperature setpoint. For example, if the forecasts over-estimate head loads in a particular zone 206, then a VAV damper for that zone will deliver less airflow to the zone 206, since less cooling is required to maintain a desired temperature.

When optimization manager 412 uses the constraint on infectious quanta concentration, controller 310 can now use the zone-level airflow to control two variables, while the local controllers are only aware of one. Therefore, in a hypothetical scenario, the reduced airflow may result in a violation of the constraint on infection probability. In some embodiments, optimization manager 412 and/or control signal generator 408 are configured to maintain a higher flow rate at the VAV even though the resulting temperature may be lower than predicted. To address this situation, optimization manager 412 may use the minimum and maximum bounds on the zone-level VAV dampers, specifically setting them to a more narrow range so that the VAV dampers are forced to deliver (at least approximately) an optimized level of air circulation. In some embodiments, to meet the infectious quanta concentration, the relevant bound is the lower flow limit (as any higher flow will still satisfy the constraint, albeit at higher energy cost). In some embodiments, a suitable strategy is to set the VAV minimum position at the level that delivers 75% to 90% of the optimized flow. In some embodiments, a VAV controller is free to dip slightly below the optimized level when optimization manager 412 over-estimates heat loads, while also having the full flexibility to increase flow as necessary when optimization manager 412 under-estimates heat loads. In the former case, optimization manager 412 may slightly violate the infectious quanta constraint (which could potentially be mitigated via rule-based logic to activate UV lights 306 if flow drops below planned levels), while in the latter case, the optimal solution still satisfies the constraint on infectious quanta. Thus, optimization manager 412 can achieve both control goals without significant disruption to the low-level regulatory controls already in place.

On-Line Optimization Process

Figure 6:
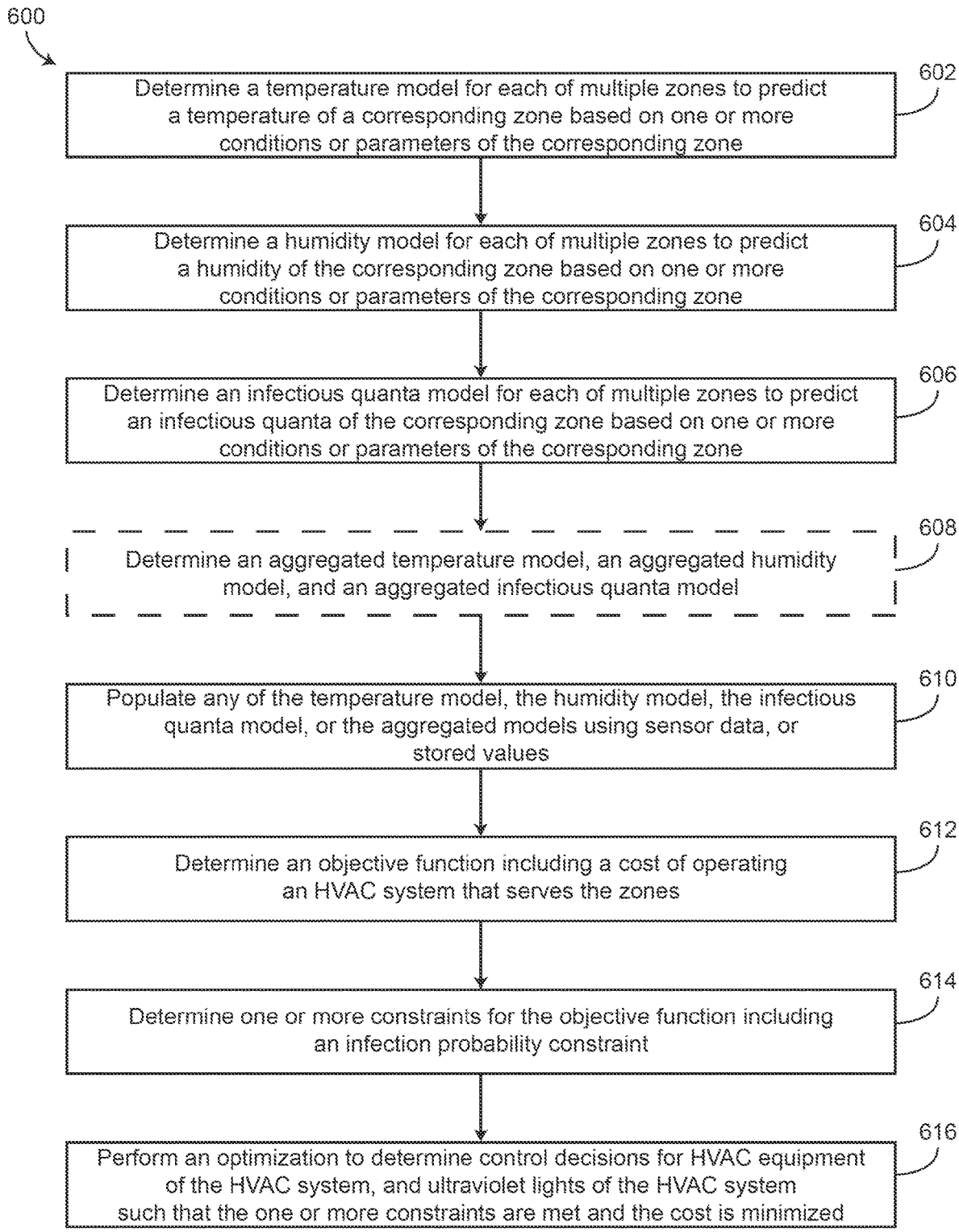
FIG. 6 is a flow diagram of a process which can be performed by the controller of FIG. 3 for determining control decisions for an HVAC system to minimize energy consumption and provide sufficient disinfection, according to some embodiments.

Referring particularly to FIG. 6, a process 600 for performing an on-line optimization to minimize energy consumption and satisfy an infection probability constraint in a building is shown, according to some embodiments. Process 600 can be performed by controller 310 when controller 310 is configured to perform an on-line optimization. In some embodiments, process 600 is performed in real time for HVAC system 200 to determine optimal control of AHU 304 and/or UV lights 306. Process 600 can be performed for an HVAC system that includes UV lights 306 configured to provide disinfection for supply air that is provided to one or more zones 206 of a building 10, filter 308 that filters an air output of an AHU, and/or an AHU (e.g., AHU 304). Process 600 can also be performed for HVAC systems that do not include filter 308 and/or UV lights 306.

Process 600 includes determining a temperature model for each of multiple zones to predict a temperature of a corresponding zone based on one or more conditions or parameters of the corresponding zone (step 602), according to some embodiments. The temperature model can be generated or determined by model manager 416 for use in an optimization problem. In some embodiments, the temperature model is:

$$\rho c V_k \left(\frac{dT_k}{dt}\right) = \rho c f_k (T_0 - T_k) + Q_k(T_k)$$

where $\rho$ is a mass density of air, c is a heat capacity of air, $V_k$ is a volume of the kth zone, $f_k$ is a volumetric flow of air into the kth zone, $T_0$ is the temperature of air output by the AHU, $T_k$ is the temperature of the kth zone, and $Q_k$ is the heat load on the kth zone. Step 602 can be performed by model manager 416 as described in greater detail above with reference to FIGS. 4-5.

Process 600 includes determining a humidity model for each of the multiple zones to predict a humidity of the corresponding zone based on one or more conditions or parameters of the corresponding zone (step 604), according to some embodiments. Step 604 can be similar to step 602 but for the humidity model instead of the temperature model. In some embodiments, the humidity model is:

$$\rho V_k \left(\frac{d\omega_k}{dt}\right) = \rho f (\omega_0 - T_0) + w_k$$

for a kth zone 206. In some embodiments, step 604 is performed by model manager 416 as described in greater detail above with reference to FIGS. 4-5.

Process 600 incudes determining an infectious quanta concentration model for each of the multiple zones to predict an infectious quanta of the corresponding zone based on one or more conditions or parameters of the corresponding zone (step 606), according to some embodiments. In some embodiments, the infectious quanta concentration model is similar to the humidity model of step 604 or the temperature model of step 602. The infectious quanta concentration model can be:

$$V_k\left(\frac{dN_k}{dt}\right) = f_k(N_0 - N_k) + I_k q$$

according to some embodiments. In some embodiments, step 606 is performed by model manager 416.

Process 600 includes determining an aggregated temperature model, an aggregated humidity model, an aggregated infectious quanta model, an aggregated thermal model, and an aggregated moisture model (step 608), according to some embodiments. In some embodiments, step 608 is optional. Step 608 can include generating or determining each of the aggregated models by determining a volume-average across zones 206. The aggregate infectious quanta model is:

$$\bar{V}\frac{d\bar{N}}{dt} = \bar{I}q - (\lambda + x - \lambda x)\sum_k f_k N_k \approx \bar{I}q - (\lambda + x - \lambda x)\bar{f}\bar{N}$$

according to some embodiments. The aggregated thermal model is:

$$\rho c \bar{V}\frac{d\bar{T}}{dt} =$$
$$\sum_k Q_k(T_k) + \rho c \sum_k f_k(x(T_a - T_k) - \Delta T_c) \approx \bar{Q}(\bar{T}) + \rho c \bar{f}(x(T_a - \bar{T}) - \Delta T_c)$$

according to some embodiments. The aggregated moisture model is:

$$\rho \bar{V}\frac{d\bar{\omega}}{dt} = \bar{w} + \rho \sum_k f_k(x(\omega_a - \omega_k) - \Delta\omega_c)$$
$$\approx \bar{w} + \rho \bar{f}(x(\omega_a - \bar{\omega}) - \Delta\omega_c)$$

according to some embodiments. In some embodiments, the aggregated thermal and moisture models are aggregate thermal models. Step 608 can be optional. Step 608 can be performed by model manager 416.

Process 600 includes populating any of the temperature model, the humidity model, the infectious quanta model, or the aggregated models using sensor data or stored values (step 610), according to some embodiments. In some embodiments, step 610 is performed by model manager 416. In some embodiments, step 610 is optional. Step 610 can be performed based on sensor data obtained from zone sensors 312.

Process 600 includes determining an objective function including a cost of operating an HVAC system that serves the zones (step 612), according to some embodiments. In some embodiments, step 612 is performed by optimization manager 412 using the dynamic models and/or the aggregated models provided by model manager 416. The objective function may be a summation of the energy consumption, energy cost, or other variable of interest over a given time period. The instantaneous energy consumption at a discrete time step is given by:

$$E = \eta_{coil}\rho \bar{f}(c\Delta T_c + L\Delta\omega_c) + \eta_{fan}\bar{f}\Delta P + \eta_{UV}\lambda_{UV}$$

which can be summed or integrated over all time steps of the given time period as follows:

$$\int_0^T E(t)dt \approx \Delta \sum_t E_t$$

where $\Delta$ is the duration of a discrete time step, according to some embodiments.

Process 600 includes determining one or more constraints for the objective function including an infection probability constraint (step 614), according to some embodiments. In some embodiments, step 614 is performed by constraint generator 410. The one or more constraints can include the infection probability constraint, temperature bounds or constraints, humidity bounds or constraints, fresh-air ventilation bounds or constraints, VAV flow bounds or constraints, and/or outdoor-air damper bounds or constraints. The infection probability constraint is:

$$M\eta + \sum_t \mu_t \leq -\frac{1}{p\Delta}\log(1 - P^{max})$$

$$\mu_t + \eta \geq N_t \,\forall\, t$$

or:

$$N_t \leq N_t^{max} = -\frac{1}{Mp\Delta}\log(1 - P^{max})$$

according to some embodiments.

Process 600 includes performing an optimization to determine control decisions for HVAC equipment of the HVAC system, and ultraviolet lights of the HVAC system such that the one or more constraints are met and the cost is minimized (step 616), according to some embodiments. Step 616 can be performed by optimization manager 412 by minimizing the objective function subject to the one or more constraints (e.g., the temperature, humidity, etc., bounds and the infection probability constraint). Step 616 can also include constructing the optimization problem and constructing the optimization problem based on the objective function, the dynamic models (or the aggregated dynamic models), and the one or more constraints. The control decisions can include a fresh-air fraction x for an AHU of the HVAC system (e.g., AHU 304), whether to turn on or off the UV lights, etc.

Off-Line Optimization Process

Figure 7:
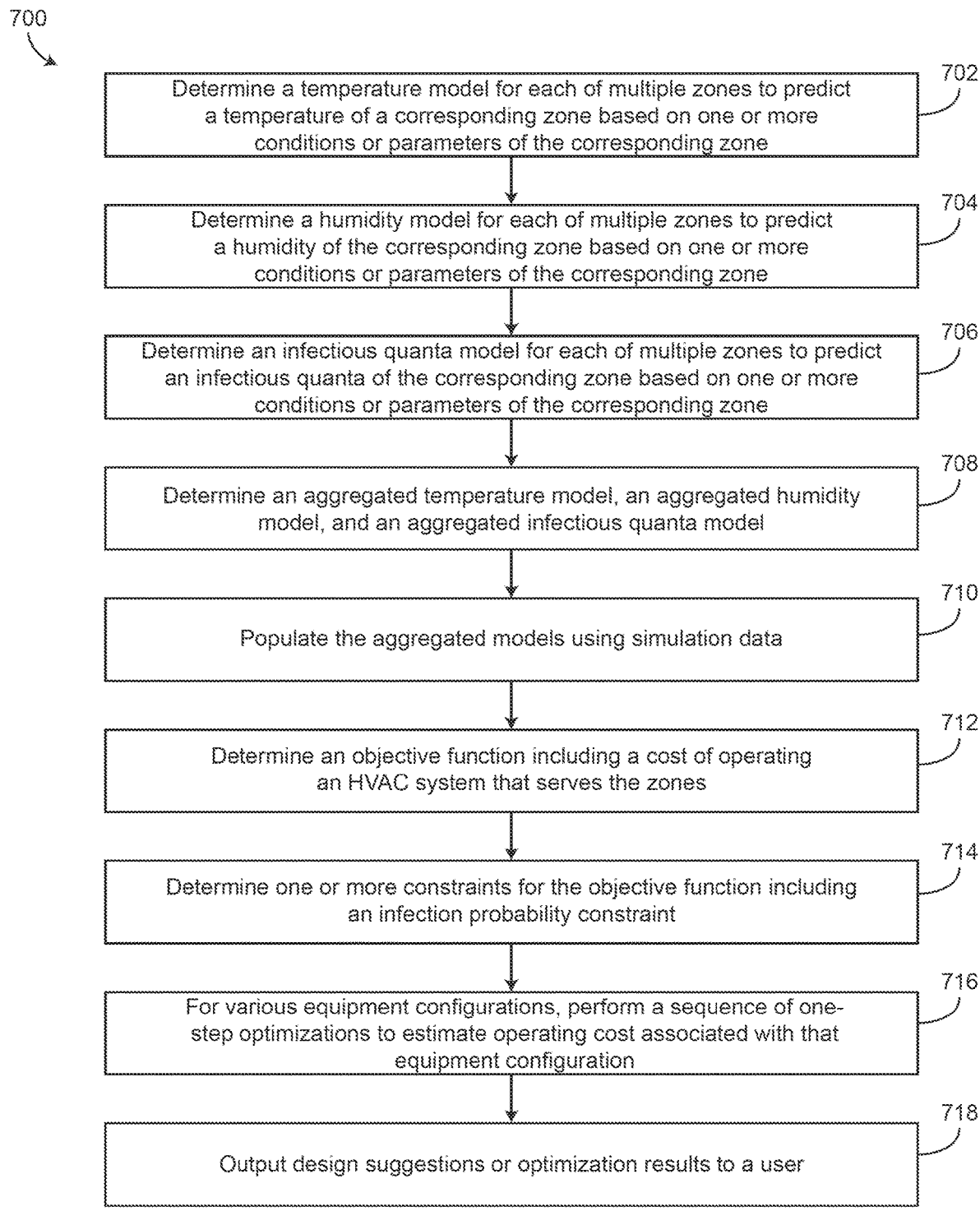
FIG. 7 is a flow diagram of a process which can be performed by the controller of FIG. 3 for determining design suggestions for an HVAC system to minimize energy consumption and provide sufficient disinfection, according to some embodiments.
Figure 8:
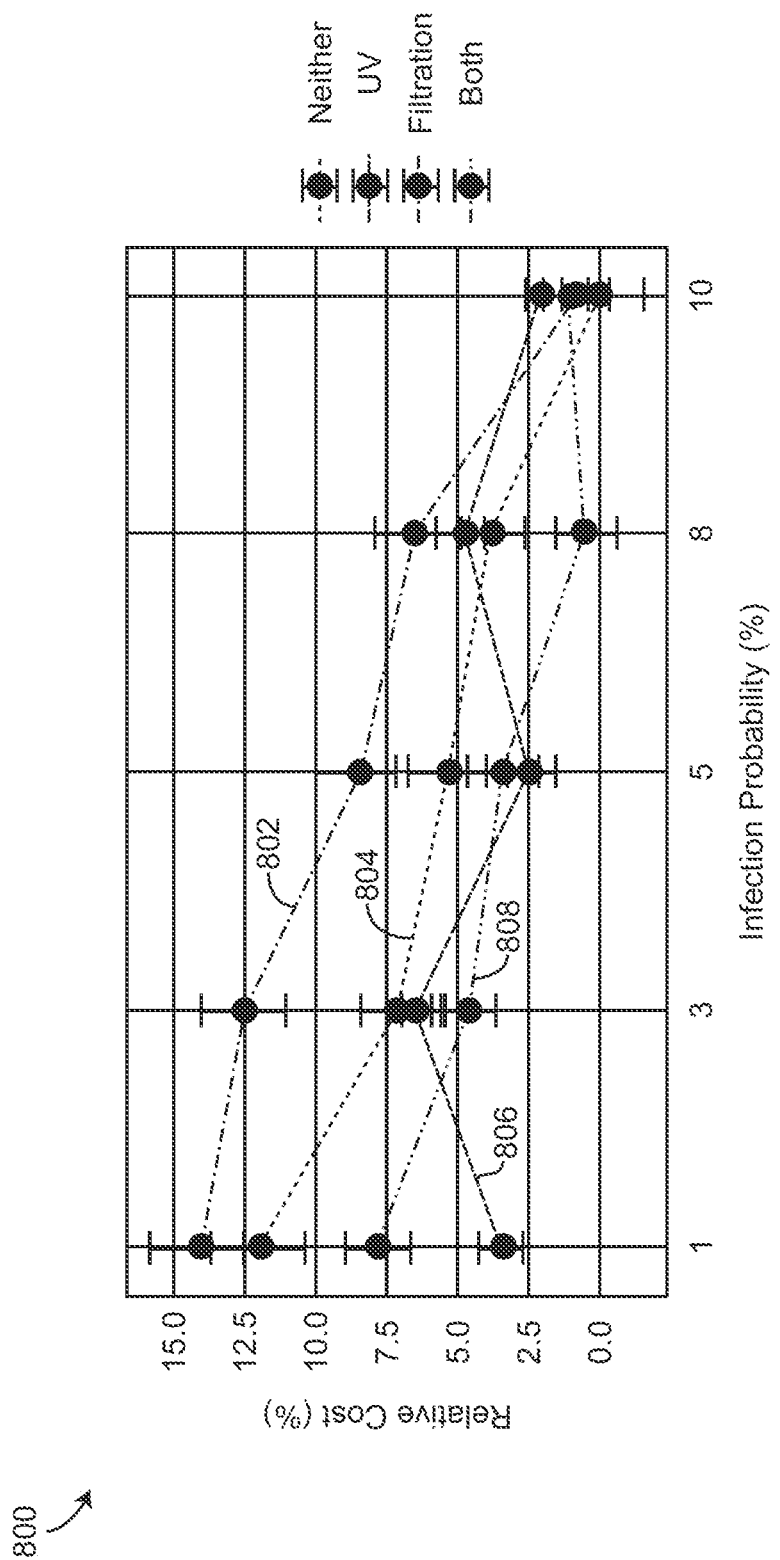
FIG. 8 is a graph of various design suggestions or information that can be provided by the controller of FIG. 3, according to some embodiments.

Referring particularly to FIG. 7, a process for performing an off-line optimization to determine equipment configurations that minimize energy consumption or cost and satisfy an infection probability constraint is shown, according to some embodiments. Process 700 may share similarities with process 600 but can be performed in an off-line mode (e.g., without determining control decisions or based on real-time sensor data) to determine or assess various design decisions and provide design information to a building manager. Process 700 can be performed by controller 310 when configured for the off-line mode (as shown in FIG. 5).

Process 700 includes steps 702-708 that can be the same as steps 602-608 of process 600. However, while step 608 may be optional in process 600 so that the optimization can be performed using a combination of individual dynamic models and aggregate dynamic models, step 708 may be non-optional in process 700. In some embodiments, using the aggregate dynamic models reduces a computational complexity of the optimization for process 700. Process 700 can be performed for a wide variety of design parameters (e.g., different equipment configurations) whereas process 600 can be performed for a single equipment configuration (e.g., the equipment configuration that process 600 is used to optimize). Therefore, it can be advantageous to use aggregate models in process 700 to reduce a complexity of the optimization problem.

Process 700 includes populating the aggregated models using simulation data (step 710). In some embodiments, step 710 is performed by model manager 416 using outputs from simulation database 424 (e.g., using values of various parameters of the aggregate models that are stored in simulation database 424). In some embodiments, step 710 is performed using known, assumed, or predetermined values to populate the aggregated models.

Process 700 includes determining an objective function including a cost of operating an HVAC system that serves the zones (step 712), and determining one or more constraints for the objective function including an infection probability constraint (step 714), according to some embodiments. In some embodiments, step 712 and step 714 are similar to or the same as steps 612 and 614 of process 600.

Process 700 includes performing a sequence of one-step optimizations for various equipment configurations to estimate an operating cost associated with that equipment configuration (step 716), according to some embodiments. In some embodiments, step 716 is performed by optimization manager 412. Optimization manager 412 can construct different optimization problems for different equipment configurations using the aggregate temperature model, the aggregated humidity model, the aggregated infectious quanta model, the one or more constraints, and the objective function. In some embodiments, optimization manager 412 is configured to solve the optimization problems for the different equipment configurations over a single time step. The results of the optimizations problems can be output to results manager 418 for displaying to a user.

Process 700 includes outputting design suggestions or optimizations results to a user (step 718), according to some embodiments. In some embodiments, step 718 includes outputting costs associated with different equipment configurations (e.g., equipment configurations that include UV lights for disinfection and/or filters for disinfection) to a user (e.g., via a display device) so that the user (e.g., a building manager) can determine if they wish to purchase additional disinfection equipment (e.g., UV lights and/or filters). For example, step 718 can include operating a display to provide graph 800 (or a similar graph) to a user.

Although process 700 is described primarily as an "off-line" process, it should be understood that process 700 is not limited to off-line implementations only. In some embodiments, process 700 can be used when controller 310 operates in an on-line mode (as described with reference to FIGS. 4 and 6). In some embodiments, the results generated by performing process 700 and/or the results generated when operating controller 310 in the off-line mode (e.g., recommended equipment configurations, recommended operating parameters, etc.) can be used to perform on-line control of HVAC equipment or perform other automated actions. For example, controller 310 can use the recommended equipment configurations to automatically enable, disable, or alter the operation of HVAC equipment in accordance with the recommended equipment configurations (e.g., enabling the set of HVAC equipment associated with the lowest cost equipment configuration identified by the simulations/optimizations). Similarly, controller 310 can use the recommended operating parameters to generate and provide control signals to the HVAC equipment (e.g., operating the HVAC equipment in accordance with the recommended operating parameters).

In general, the controller 310 can use the optimization/simulation results generated when operating controller 310 in the off-line mode to generate design data including one or more recommended design parameters (e.g., whether to include or use UV lights 306 for disinfection, whether to include or use filter 308 for disinfection, whether to use fresh/outdoor air for disinfection, a recommended type or rating of UV lights 306 or filter 308, etc.) as well as operational data including one or more recommended operational parameters (e.g., the fraction of fresh/outdoor air that should exist in the supply air provided to the building zone, operating decisions for UV lights 306, an amount of airflow to send to each building zone, etc.). The design data may include a recommended equipment configuration that specifies which HVAC equipment to use in the HVAC system to optimize the energy consumption, energy cost, carbon footprint, or other variable of interest while ensuring that a desired level of disinfection is provided.

Controller 310 can perform or initiate one or more automated actions using the design data and/or the operational data. In some embodiments, the automated actions include automated control actions such as generating and providing control signals to UV lights 306, AHU 304, one or more VAV units, or other types of airside HVAC equipment that operate to provide airflow to one or more building zones. In some embodiments, the automated action include initiating a process to purchase or install the recommended set of HVAC equipment defined by the design data (e.g., providing information about the recommended set of HVAC equipment to a user, automatically scheduling equipment upgrades, etc.). In some embodiments, the automated actions include providing the design data and/or the operational data to a user interface device (e.g., display device 422) and/or obtaining user input provided via the user interface device. The user input may indicate a desired level of disinfection and/or a request to automatically update the results of the optimizations/simulations based on user-selected values that define the desired infection probability or level of disinfection. Controller 310 can be configured to provide any of a variety of user interfaces (examples of which are discussed below) to allow a user to interact with the results of the optimizations/simulations and adjust the operation or design of the HVAC system based on the results.

User Interfaces

Figure 9:
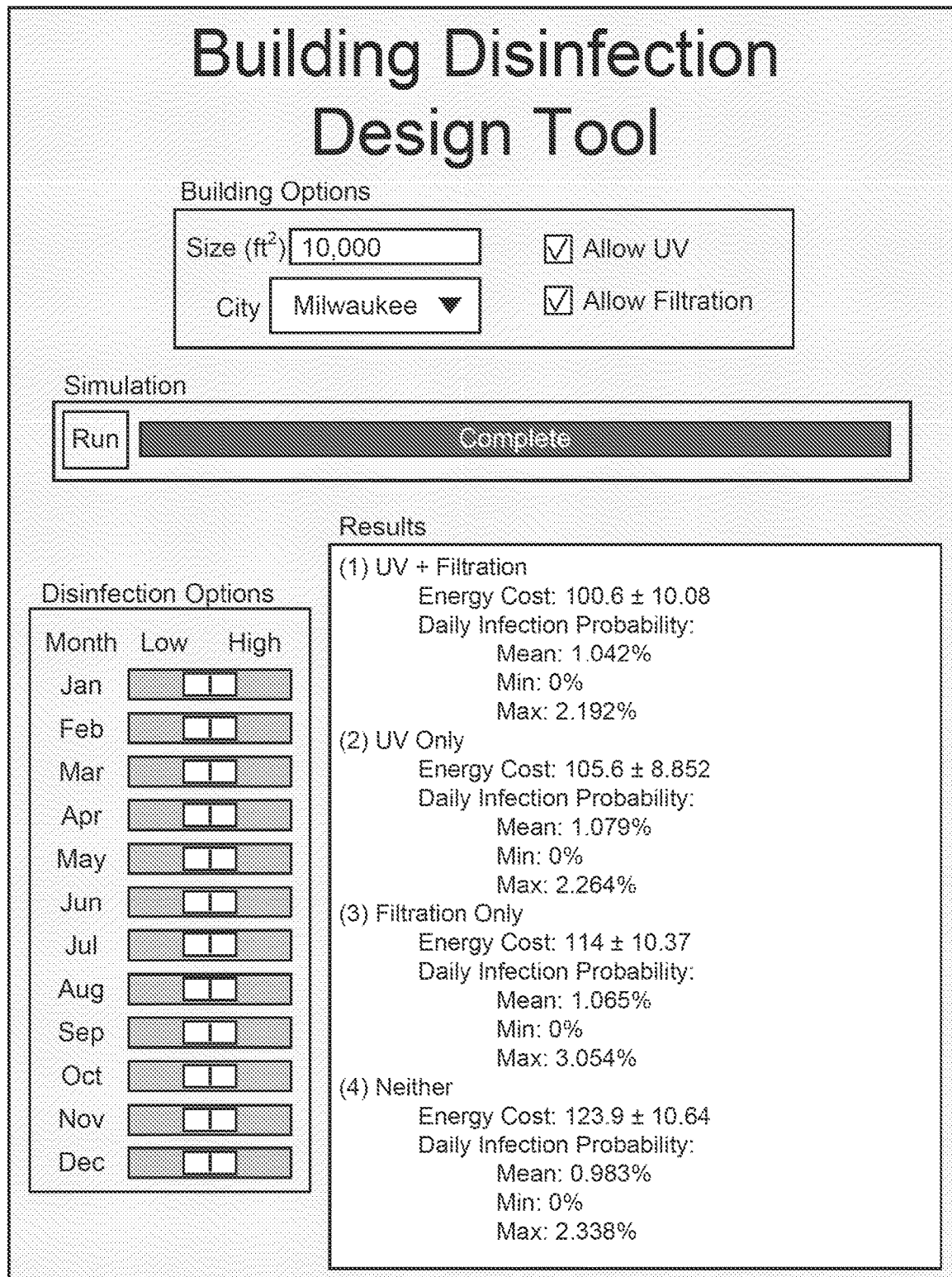
FIG. 9 is a drawing of a user interface that can be used to specify building options and disinfection options and provide simulation results, according to some embodiments.

Referring now to FIGS. 5 and 9, in some embodiments, user input device 420 is configured to provide a user interface 900 to a user. An example of a user interface 900 that can be generated and presented via user input device 420 is shown in FIG. 9. User interface 900 may allow a user to provide one or more user inputs that define which equipment are available in the building or should be considered for design purposes (e.g., filtration, UV, etc.) as well as the desired infection probability (e.g., low, medium, high, percentages, etc.). The inputs provided via user interface 900 can be used by controller 310 to set up the optimization problem or problems to be solved by optimization manager 412. For example, constraint generator 410 can use the inputs received via user interface 900 to generate the various bounds, boundaries, constraints, infection probability constraint, etc., that are used by optimization manager 412 to perform the optimization. After completing all of the simulation scenarios, the results can be presented to the user via the "Results" portion of user interface 900 that allows the user to explore various tradeoffs.

As an example, the "Building Options" portion of user interface 900 allows the user to specify desired building and climate parameters such as the square footage of the building, the city in which the building is located, etc. The user may also specify whether UV disinfection and/or advanced filtration should be considered in the simulation scenarios (e.g., by selecting or deselecting the UV and filtration options). The "Disinfection Options" portion of user interface 900 allows the user to specify the desired level of disinfection or infection probability. For example, the user can move the sliders within the Disinfection Options portion of user interface 900 to define the desired level of disinfection for each month (e.g., low, high, an intermediate level, etc.). Alternatively, user interface 900 may allow the user to define the desired level of disinfection by inputting infection probability percentages, via a drop-down menu, by selecting or deselecting checkboxes, or any other user interface element.

After specifying the desired parameters and clicking the "Run" button, optimization manager 412 may perform one or more simulations (e.g., by solving one or more optimization problems) using the specified parameters. Once the simulations have completed, results may be displayed in the "Results" portion of user interface 900. The results may indicate the energy cost, energy consumption, carbon footprint, or any other metric which optimization manager 412 seeks to optimize for each of the design scenarios selected by the user (e.g., UV+Filtration, UV Only, Filtration Only, Neither). The results may also indicate the daily infection probability for each of the design scenarios (e.g., mean infection probability, minimum infection probability, maximum infection probability). In some embodiments, an initial simulation or simulations are run using default settings for the disinfection options. In some embodiments, the results include equipment recommendations (e.g., use UV+Filtration, use UV Only, use Filtration Only, use Neither). The results of each simulation can be sorted to present the most optimal results first and the least optimal results last. For example, user interface 900 is shown presenting the simulation result with the least energy consumption first and the most energy consumption last. In other embodiments, the results can be sorted by other criteria such as infection probability or any other factor.

The user can adjust desired disinfection options on a monthly basis (e.g., by adjusting the sliders within the Disinfection Options portion of user interface 900), at which point the results may be re-calculated by averaging over the appropriate subset of simulation instances, which can be performed in real time because the simulations need not repeated. Advantageously, this allows the user to adjust the disinfection options and easily see the impact on energy cost, energy consumption, carbon footprint, etc., as well as the impact on infection probability for each of the design scenarios. Additional display options beyond what is shown in FIG. 9 may be present in various embodiments, for example to selectively disable UV and/or filtration in certain months or to consider worst-case instances for each month rather than mean values. In addition, various other graphical displays could be added to provide more detailed results. User interface 900 may initially present optimization results and/or equipment recommendations based on default settings, but then the user is free to refine those settings and immediately see updates to cost estimates and suggested equipment.

Although a specific embodiment of user interface 900 is shown in FIG. 9, it should be understood that this example is merely one possible user interface that can be used in combination with the systems and methods described herein. In general, controller 310 can operate user input device 420 to provide a user interface that includes various sliders, input fields, etc., to receive a variety of user inputs from the user via user input device 420. In some embodiments, user input device 420 is configured to receive a desired level of disinfection, a desired level of infection probability, etc., from the user and provide the desired level of disinfection, or desired level of infection probability to constraint generator 410 as the user input(s). In some embodiments, the user interface includes a knob or a slider that allows the user to adjust between a level of energy savings and a level of infection control. For example, the user may adjust the knob or slider on the user input device 420 to adjust the infection probability constraint (e.g., to adjust thresholds or boundaries associated with the infection probability constraint). In some embodiments, the user In some embodiments, an infection spread probability is treated by constraint generator 410 as a constraint, or as a value that is used by constraint generator 410 to determine the infection probability constraint. If a user desires to provide a higher level of disinfection (e.g., a lower level of infection spread probability) and therefore an increased energy consumption or energy consumption cost, the user may adjust the knob or slider on the user interface of user input device 420 to indicate a desired trade-off between energy consumption and infection probability. Likewise, if the user desired to provide a lower level of disinfection (e.g., a higher level of infection spread probability) and therefore a lower energy consumption or energy consumption cost, the user may adjust the knob or slider on the user interface of the user input device 420 to indicate such a desired tradeoff between energy consumption or energy consumption cost and disinfection control.

In some embodiments, user input device 420 is configured to provide analytics, data, display data, building data, operational data, diagnostics data, energy consumption data, simulation results, estimated energy consumption, or estimated energy consumption cost to the user via the user interface of user input device 420. For example, results manager 418 may operate the user input device 420 and/or the display device 422 to provide an estimated energy consumption or energy consumption cost to the user (e.g., results of the optimization of optimization manager 412 when operating in either the on-line or off-line mode/configuration). In some embodiments, user input device 420 and display device 422 are a same device (e.g., a touchscreen display device, etc.) that are configured to provide the user interface, while in other embodiments, user input device 420 and display device 422 are separate devices that are configured to each provide their own respective user interfaces.

For example, controller 310 can perform the off-line or planning or design tool functionality as described in greater detail above in real-time (e.g., as the user adjusts the knob or slider) to determine an estimated energy consumption or energy consumption cost given a particular position of the knob or slider (e.g., given a particular desired level of infection or disinfection control as indicated by the position of the knob or slider). In some embodiments, controller 310 is configured to operate the user input device 420 and/or the display device 422 to provide or display the estimated energy consumption or estimated energy consumption cost as the user adjusts the knob or slider. In this way, the user can be informed regarding an estimation of costs or energy consumption associated with a specific level of disinfection control (e.g., with a particular infection probability constraint). Advantageously, providing the estimation of costs or energy consumption associated with the specific level of disinfection control to the user in real-time or near real-time facilitates the user selecting a level of disinfection control that provides sufficient or desired disinfection control in addition to desired energy consumption or energy consumption costs.

Pareto Optimization

Figure 10:
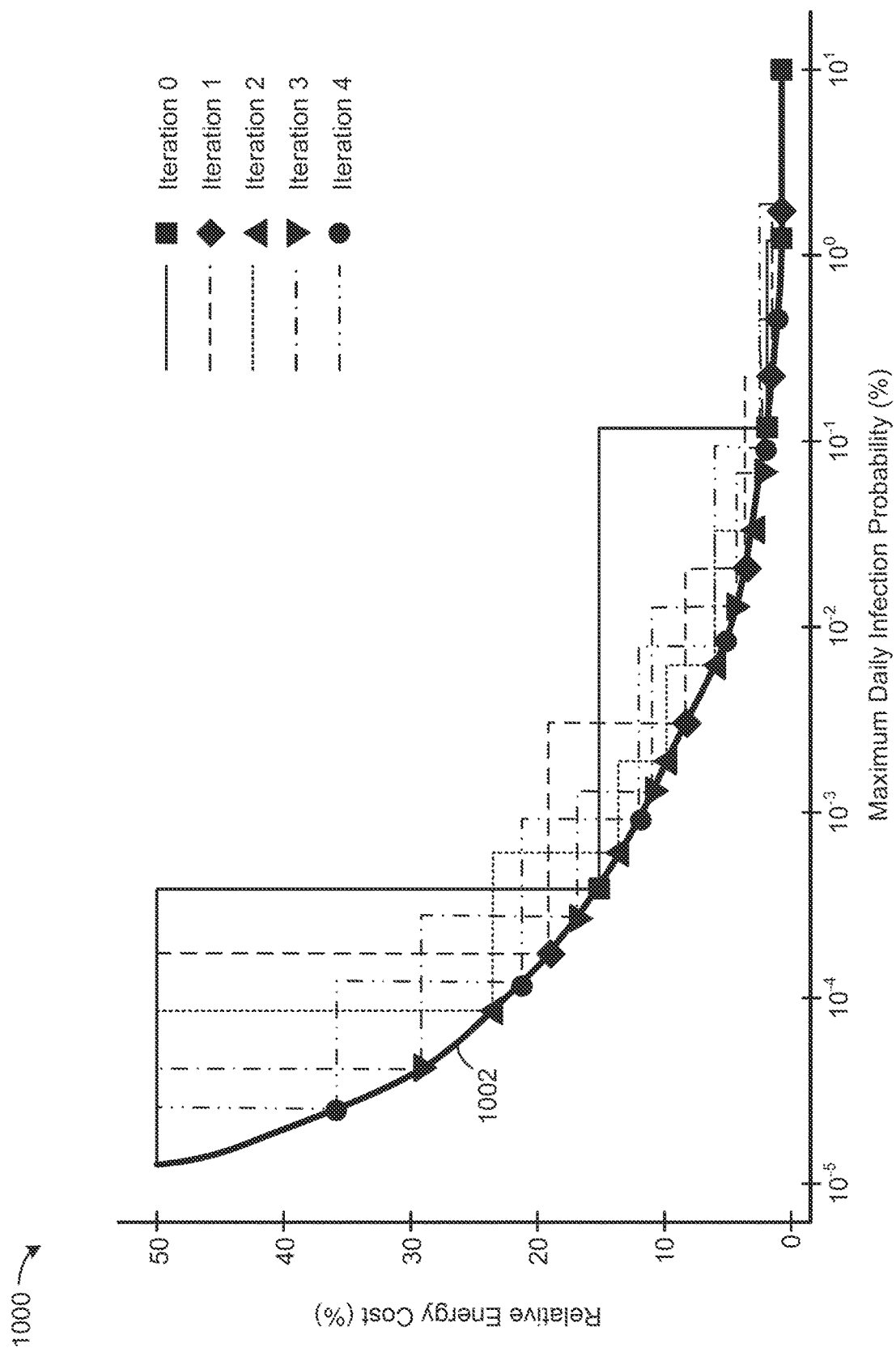
FIG. 10 is a graph illustrating a technique which can be used by the controller of FIG. 3 to estimate a Pareto front of a tradeoff curve for relative energy cost vs. infection probability, according to some embodiments.

Referring now to FIG. 10, a graph 1000 illustrating a Pareto search technique which can be used by controller 310 is shown, according to an exemplary embodiment. In some cases, users may want a more detailed tradeoff analysis than merely comparing a set of optimization results for a set of selected infection probabilities. For such cases, controller 310 may use a more detailed Pareto search that iteratively determines points on a Pareto front 1002 for an energy cost vs. infection probability tradeoff curve. By running additional simulations, this tradeoff curve can be plotted as accurately as possible so that users can fully evaluate the entire continuum of infection probabilities, (e.g., to look for natural breakpoints where additional disinfection probability begins to get more expensive).

To determine the points on the Pareto front 1002, controller 310 may start with a small number of infection probabilities already simulated for a given month and plot them against monthly energy cost. Then, additional candidate infection probabilities can be selected (e.g., as the points furthest from already completed simulations). After simulating instances with the new infection probabilities, these points are added to the plot, and the process repeats to the desired accuracy. Many criteria for selecting new points are possible, but one possible strategy is to choose the midpoint of successive points with the largest area (i.e., of the rectangle whose opposite corners are given by the two existing points) between them. This strategy prioritizes regions where the curve is changing rapidly and leads to efficient convergence.

As an example, consider the case in graph 1000. The goal is to obtain an approximation of the true Pareto front 1002, which is illustrated in FIG. 10 for ease of explanation, but may not be truly known. The instances of the optimization run for the small number of infection probabilities result in the points marked with squares in graph 1000 for Iteration 0. This gives a very coarse approximation of the true front. Controller 310 may then select new points in each iteration, run those simulations, and add those points to graph 1000. For example, the points marked with diamond shapes in graph 1000 show the points selected for Iteration 1 the points marked with triangles in graph 1000 show the points selected for Iteration 2, the points marked with inverted triangles in graph 1000 show the points selected for Iteration 3, and the points marked with circles in graph 1000 show the points selected for Iteration 4. By the end of Iteration 4, the empirical Pareto front is a good approximation of the true front 1002, and of course additional iterations can be performed to further improve accuracy. The empirical Pareto front generated using this technique can be used by controller 300 to solve a Pareto optimization problem to determine an optimal tradeoff between the costs and benefits of selecting different infection probability values in the infection probability constraint.

In some embodiments, determining the infection probability constraint (e.g., to provide an optimal level of disinfection control, or an optimal level of infection probability spread) and the resulting energy consumption or energy consumption costs required for HVAC system 200 to operate to achieve the infection probability constraint is a Pareto optimization problem. For example, at a certain point, additional disinfection control may require undesirably high energy consumption or energy consumption costs. In some embodiments, controller 310 may solve a Pareto optimization problem given various inputs for the system to determine one or more inflection points along a curve between cost (e.g., energy consumption or energy consumption cost) and a benefit (e.g., disinfection control, infection probability, disinfection, etc.) or to determine an optimal tradeoff between the cost and the benefit.

In some embodiments, controller 310 is configured to operate display device 422 and/or user input device 420 to provide an infection probability constraint associated with the optimal tradeoff between the cost and the benefit. In some embodiments, controller 310 can operate according to various modes that can be selected by the user via the user interface of user input device 420. For example, the user may opt for a first mode where controller 310 solves the Pareto optimization problem to determine the infection probability constraint associated with the optimal tradeoff point between the cost (e.g., the energy consumption or energy consumption cost) and the benefit (e.g., the disinfection control, a provided level of disinfection, an infection probability, etc.). In the first mode, the controller 310 can automatically determine the infection probability constraint based on the results of the Pareto optimization problem. In some embodiments, controller 310 still operates display device 422 to provide estimated, actual, or current energy consumption or energy consumption costs and infection probability constraints.

In a second mode, controller 310 can provide the user the ability to manually adjust the tradeoff between the cost and the benefit (e.g., by adjusting the slider or knob as described in greater detail above). In some embodiments, the user may select the desired tradeoff between infection control and energy consumption or energy consumption costs based on the provided estimations of energy consumption or energy consumption costs.

In a third mode, controller 310 can provide the user additional manual abilities to adjust the infection probability constraint directly. In this way, the user may specifically select various boundaries (e.g., linear boundaries if the infection probability constraint is implemented as a linear constraint as described in greater detail above) for the infection probability constraint. In some embodiments, the user may select between the various modes (e.g., the first mode, the second mode, and/or the third mode).

It should be understood that while the Pareto optimization as described herein is described with reference to only two variables (e.g., energy consumption or energy consumption cost and disinfection control), the Pareto optimization may also account for various comfort parameters or variables (e.g., temperature and/or humidity of zones 206, either individually or aggregated). In some embodiments, controller 310 may also operate display device 422 to provide various comfort parameters that result from a particular position of the knob or slider that is provided on the user interface of user input device 420. In some embodiments, additional knobs, sliders, input fields, etc., are also provided on the user interface of user input device 420 to receive various inputs or adjustments for desired comfort parameters (e.g., temperature and/or humidity). In some embodiments, controller 310 (e.g., results manager 418) is configured to use the dynamic models for temperature or humidity as described above to determine estimations of the various comfort parameters as the user adjusts the knobs or sliders (e.g., the knobs or sliders associated with disinfection control and/or energy consumption or energy cost consumption). Similarly, controller 310 can solve the Pareto optimization problem as a multi-variable optimization problem to determine an inflection point or a Pareto efficiency on a surface (e.g., a 3d graph or a multi-variable optimization) which provides an optimal tradeoff between cost (e.g., the energy consumption, the energy consumption cost, etc.), comfort (e.g., temperature and/or humidity), and disinfection control (e.g., the infection probability constraint).

Infection Control Tool

Overview

Referring now to FIGS. 11-20, a user tool according to the various techniques as described herein is shown and described. The user tool can receive user inputs regarding actual or hypothetical settings, equipment upgrades, etc., and can provide a calculation or estimation of an infection probability, operating costs, or energy consumption for the different hypothetical settings, equipment upgrades, etc. In some embodiments, the calculations or estimations are determined in real-time and provided to the user in response to receiving an updated user input. In this way, the user can perform a trial and error approach to determine appropriate or desired settings or equipment upgrades to achieve a desired infection probability, operating and/or purchase costs, and energy consumption. In some embodiments, the user tool described herein with reference to FIGS. 11-20 is usable with building 10. In some embodiments, the user tool described herein is a design tool or a tool to provide hypothetical results to a user. Advantageously, the systems and methods described herein with reference to FIGS. 11-29 may facilitate an improvement in design recommendations, equipment upgrades, or equipment operation to reduce infection risks for the building 10 while accounting for costs associated with the design recommendations, equipment upgrades, or equipment operation. The user tool may obtain and use data from a third party (e.g., the CDC) relating to population, regional, national, etc., information of an infectious disease. For example, the data from the third party may be a prevalence of the infectious disease, number of new cases, etc., in a population that is regional to the building 10, the nation, a population of expected visitors, a population of employees of the building 10, etc.

As air is circulated in building 10, pathogens may be exhaled by infectious individuals, which can be spread across large air volumes of building 10. These pathogens may infect healthy individuals that are within building 10. To decrease or manage the spread of such pathogens and control an infection probability, HVAC systems (e.g., HVAC system 200) can be retrofitted with filtration (e.g., high-efficiency filtration) and/or UV lamps (e.g., in-duct UV lamps, recirculating devices that include UV lamps, etc.). Both filtration and UV lamps may lead to significant reduction in infectious particle concentration of recirculated air, thereby reducing an infection rate or an infection probability in building 10. In some embodiments, a similar effect can be achieved by venting a higher fraction of air to ambient (e.g., external or outside the building 10), and increasing fresh-air intake to compensate for the vented air. However, each of these approaches (UV lamps, filtration, and fresh-air intake) may incur additional capital and/or operating costs (e.g., through purchase costs, additional energy consumption, etc.). A most effective use of these three approaches may be dependent on climate or user preferences, according to some embodiments. In some embodiments, an effectiveness of these approaches can also depend on other non-HVAC related decisions (such as a requirement for users to wear masks while in building 10 and/or reduced occupancy limits).

The user tool described herein can use the techniques described in greater detail above with reference to FIGS. 3-10 to provide real-time calculations of various decision parameters such as infection probability, cost, and/or energy consumption given different inputs provided by the user, according to some embodiments. In some embodiments, the user tool described herein can assess various possibilities for building infection control using the Wells-Riley infection equation, and HVAC energy calculations to determine resulting infection probability, operating costs, or energy consumption for different disinfection strategies. For a given building and climate, the user tool can provide a real-time or near real-time estimate of whether the installation of advanced filtration capacity, UV lamps, etc., are necessary to control the spread of infection or if increased ventilation is sufficient. The user tool can also provide an estimate of a maximum number of occupants for which runaway spread of the disease can be prevented.

User Tool

Figure 11:
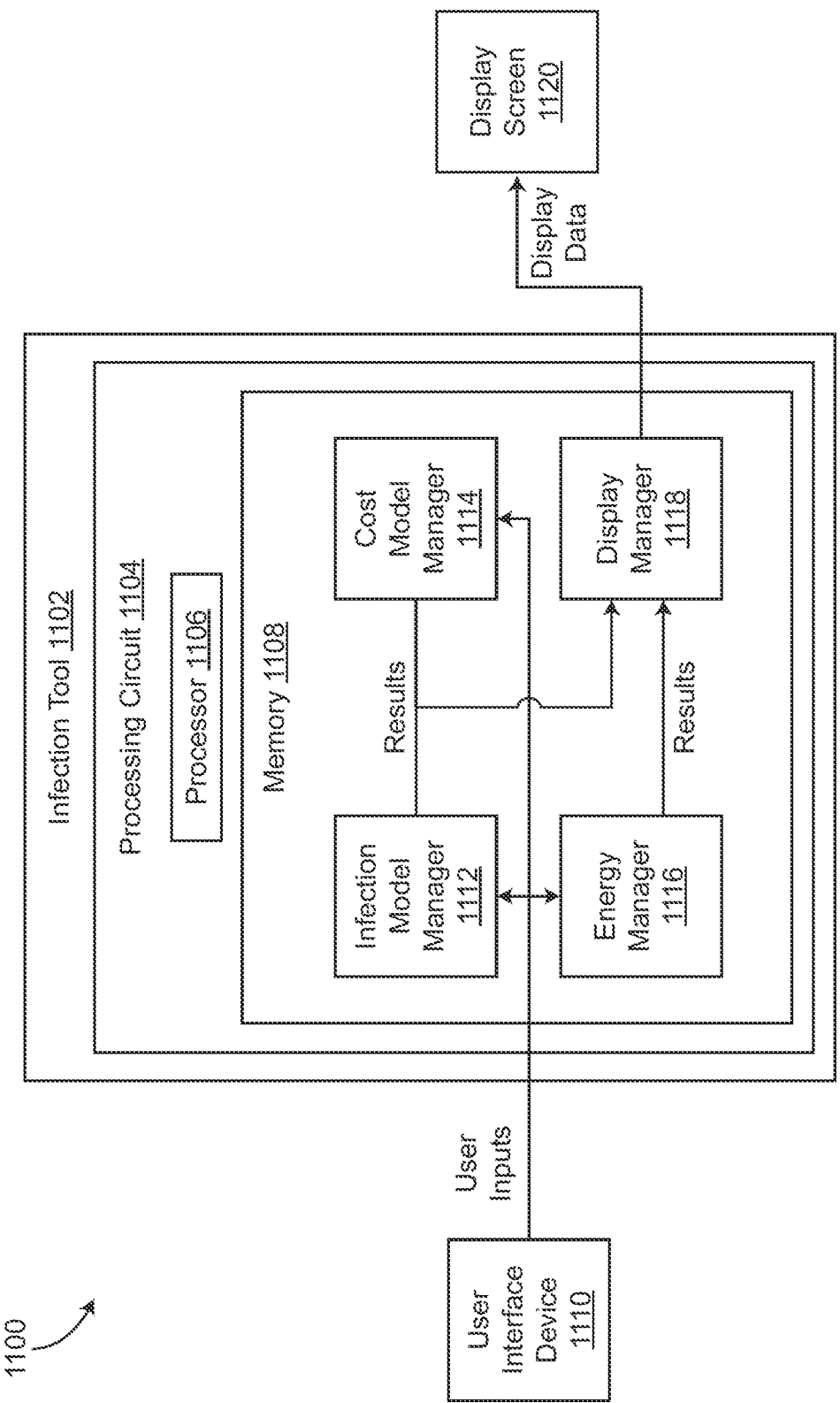
FIG. 11 is a block diagram of an infection control system including an infection control tool, according to some embodiments.

Referring particularly to FIG. 11, an infection control system 1100 is shown, according to some embodiments. In some embodiments, infection control system 1100 includes an infection control tool 1102 (e.g., the user tool), a user interface device 1110 and a display screen 1120. In some embodiments, the user interface device 1110 and the display screen 1120 are different components of the same device. For example, the user interface device 1110 may include the display screen 1120 and may facilitate both inputs from the user and outputs to the user (e.g., calculated results for different options or scenarios).

Infection control tool 1102 includes a processing circuit 1104 including a processor 1106 and memory 1108. Processing circuit 1104 can be communicably connected with a communications interface of infection control tool 1102 such that processing circuit 1104 and the various components thereof can send and receive data via the communications interface. Processor 1106 can be implemented as a general purpose processor, an application specific integrated circuit (ASIC), one or more field programmable gate arrays (FPGAs), a group of processing components, or other suitable electronic processing components.

Memory 1108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1108 can be or include volatile memory or non-volatile memory. Memory 1108 can include database components, object code components, script components, or any other type of information structure for supporting the various activities and information structures described in the present application. According to some embodiments, memory 1108 is communicably connected to processor 1106 via processing circuit 1104 and includes computer code for executing (e.g., by processing circuit 1104 and/or processor 1106) one or more processes described herein.

In some embodiments, infection control tool 1102 is implemented within a single computer (e.g., one server, one housing, etc.). In various other embodiments infection control tool 1102 can be distributed across multiple servers or computers (e.g., that can exist in distributed locations).

In some embodiments, infection control tool 1102 is configured to use two different models. Specifically, infection control tool 1102 can use an infection model for the spread of the infection inside the building (e.g., building 10) and another model for estimating or predicting costs incurred by a given disinfection strategy. In some embodiments, the infection model is used and implemented by infection model manager 1112. In some embodiments, the model for estimating or predicting costs is used and implemented by cost model manager 1114.

In some embodiments, the infection model and/or the model for estimating costs include one or more sub-models. In some embodiments, modeling a spread of infection may require a model for a concentration of infectious particles in air of the building 10 and a model for a probability that an individual becomes sick after being exposed to a given concentration of infectious particles. In some embodiments, operating costs include additional heating and cooling due to increased ventilation, higher fan power consumption due to increased airflow, and more expensive filters that require periodic replacement or maintenance.

Infection model manager 1112 is configured to use a modified version of the Wells-Riley equation, shown below:

$$P = 1 - \exp\left(-\frac{(1-\mu)Iqpt}{\lambda f + kV}\right)$$

with:

$$\mu = 1-(1-\mu_{infectious})(1-\mu_{susceptible})$$

$$\lambda = 1-(1-\lambda_{OA})(1-\lambda_{filter})(1-\lambda_{UV})$$

$$k = k_{deposition} + k_{deactivation}$$

according to some embodiments.

The previous equations are derived from a dose-based infection probability model and a simple dynamic model for infectious particle concentration based on a mass balance, according to some embodiments. For the dose-based model, a variable d is defined as a total dose of infectious particles received by an individual (e.g., a number of particles inhaled over the relevant period), according to some embodiments. After exposure to a given dose, the probability of infection is assumed to be given by:

$$P = 1 - \exp\left(-\frac{d}{d_0}\right)$$

where $d_0$ is a disease-dependent scaling factor referred to as the "quantum" of infectious particles, according to some embodiments. An individual inhaling air with a volumetric concentration of n particles/m³ at a rate of p m³/hr over a period of t hours thus receives a dose of:

$$d = (1-\mu_{susceptible})npt$$

in which $\mu_{susceptible}$ gives the fractional reduction in infectious particles actually inhaled due to wearing a mask, according to some embodiments. A direct measurement of particle numbers can be challenging to obtain, so the model may be derived using a normalized dose $D=d/d_0$ (expressed in quanta, i.e., multiples of $d_0$) and a corresponding normalized concentration $N:=n/d_0$ (expressed in quanta/m³), according to some embodiments.

With this normalization, it can be determined:

$$P = 1 - \exp(-(1-\mu_{susceptible})Npt)$$

as the probability of infection, according to some embodiments.

In some embodiments, for the dynamic model, a uniform concentration n (in particles/m³) of airborne infectious particles is assumed, yielding:

$$V\frac{dn}{dt} = f(n_0 - n) + \dot{r}_{gen} - kVn$$

where $n_0$ is an infectious particle concentration in the supply air, $\dot{r}_{gen}$ is an internal rate of generation for infectious particles, and the remaining quantities are as before. The three terms on the right-hand side of the equation shown above represent a net inflow of infectious particles due to air circulation (assuming constant system volume), the internal generation of infectious particles in the space by infectious individuals, and the destruction of infectious particles due to deposition and deactivation, according to some embodiments. As with the dose model, infection model manager 1112 may use quantum-normalized values, which can be obtained by dividing both the $\dot{r}_{gen}$ and n values by the quantum $d_0$ to find:

$$V\frac{dN}{dt} = f(N_0 - N) + \dot{R}_{gen} - kVN$$

where $\dot{R}_{gen} = \dot{r}_{gen}/d_0$.

To calculate $N_0$, it is noted that the supply air stream is a mixture of $\lambda_{OA}$ outdoor air (with an infectious particle concentration of $N_{OA}$) and $1-\lambda_{OA}$ recirculated air (which is assumed to have the same infectious particle concentration N as the space), according to some embodiments. This mixed air stream is then passed through filters (e.g., filter 308), which reduces its infectious particle concentration by a factor of $1-\lambda_{filter}$ and then through UV irradiation (e.g., UV lights 306), which further reduces concentration by $1-\lambda_{UV}$, according to some embodiments. Thus, the supply air infectious particle concentration can be given by:

$$N_0 = (\lambda_{OA}N_{OA} + (1-\lambda_{OA})N)(1-\lambda_{filter})(1-\lambda_{UV})$$

in which it is generally assumed that $N_{OA}=0$ (i.e., that there are no infectious particles in the outdoor air), according to some embodiments.

For the generation term, $\dot{R}_{gen}$, it is noted that there is a given infectious particle concentration $N_{gen}$ in the exhaled breath of infectious individuals, according to some embodiments. Thus, with I infectious individuals, each exhaling at a rate of p m³/hr, it can be determined that:

$$\dot{R}_{gen} \approx Ip(1-\mu_{infectious})N_{gen}$$

according to some embodiments.

In some embodiments, $\mu_{infectious}$ gives fractional reduction in infectious particles that actually become airborne as a result of the infectious individual wearing a mask. However, during intermittent respiratory events like coughing or sneezing, the rate of infectious particle release can be significantly higher. Thus, this term can be defined as:

$$\dot{R}_{gen} := I(1-\mu_{infectious})q$$

where q is a disease-dependent constant expressed in quanta/hr (e.g., in normalized units).

Combining $P=1-\exp(-(1-\mu_{susceptible})Npt)$, $$V\frac{dN}{dt} = f(N_0 - N) + \dot{R}_{gen} - kVN,$$

and $\dot{R}_{gen}=I(1-\mu_{infectious})q$ yields the final ODE model which can be used by:

$$V\frac{dN}{dt} = (1 - \mu_{infectious})Iq - (\lambda f + kV)N$$

where:

$\lambda = 1-(1-\lambda_{OA})(1-\lambda_{filter})(1-\lambda_{UV})$ assuming $N_{OA}=0$, according to some embodiments.

At the steady-state concentration $N_{ss}$, $dN/dt=0$, which implies that:

$$N_{ss} = \frac{(1 - \mu_{infectious})Iq}{\lambda f + kV}$$

according to some embodiments.

Thus, assuming that susceptible individuals are subject to this average concentration over their exposure period, $N_{ss}$ can be substituted from $$N_{ss} = \frac{(1 - \mu_{infectious})Iq}{\lambda f + kV}$$

as N in $P=1-\exp(-(1-\mu_{susceptible})Npt)$ to find:

$$P = 1 - \exp\left(-\frac{(1-\mu)Iqpt}{\lambda f + kV}\right)$$

according to some embodiments.

The resulting spread of the infection to susceptible individuals can be summarized via a reproductive number as:

$R_{mean}=SP/I$ according to some embodiments. Infection model manager 1112 also uses the above equation to determine the reproductive number.

The variables in the above equations are defined below:
P is an infection probability for an individual given an exposure time, breathing rate, and indoor conditions;
I is a number of infectious (e.g., actively contagious) individuals in a space (e.g., building 10);
S is a number of susceptible individuals in the space, $\mu$ is a fractional reduction in infectious particle transmission due to the individuals in the space wearing masks;
$\mu_{infectious}$ is a fractional reduction in airborne infectious particle generation due to masks being worn by infectious individuals in the space;
$\mu_{susceptible}$ is a fractional reduction in inhaled infectious particles due to masks being worn by susceptible individuals;
q is an infectious quanta generation rate (e.g., in quanta/hour) for an infectious individual;
p is an inhalation rate for individuals in the space (e.g., in m³/hour);
t is a total exposure time (e.g., in hours) for an individual;
$\lambda$ is an effective fractional disinfection for recirculated air;
$\lambda_{OA}$ is an intake fraction for fresh outdoor air, assumed to be free of any infectious particles;
$\lambda_{filter}$ is a fractional entrapment of infectious particles in the recirculating air due to filtration;
$\lambda_{UV}$ is a fractional deactivation of infectious particles in the recirculating air due to UV irradiation or operation of the UV lamps;
f is a total recirculating airflow (e.g., in m³/hour);
k is an effective decay rate for airborne infectious particles (e.g., in hr⁻¹);
$k_{deposition}$ is a deposition rate for airborne infectious particles onto surfaces (e.g., in hr⁻¹);
$k_{deactivation}$ is a natural deactivation rate for airborne infectious particles (e.g., in hr⁻¹); and
$R_{mean}$ is the mean reproductive number for infection transmission (a unitless value) given the average number of susceptible individuals that have become infected by each infectious individual.

In some embodiments, the infection probability P, the fractional reduction $\mu$, the fractional reduction $\mu_{infectious}$, the fractional reduction $\mu_{susceptible}$, the effective fractional disinfection $\lambda$, the intake fraction $\lambda_{OA}$, the fractional entrapment $\lambda_{filter}$, and the fractional deactivation $\lambda_{UV}$ are normalized values (e.g., having values between 0 and 1).

The goal of infection control system 1100 is to maintain the infection probability P (as estimated by infection model manager 1112) sufficiently low (e.g., at a user-desired level) so that the reproductive number R is maintained below a value of 1. This can be accomplished (e.g., by infection control tool 1102, controller 310) using the following approaches (or any combination thereof):
Masks: requiring occupants of the building 10 to wear masks (increasing $\mu$);
Ventilation: increasing the intake of fresh air (increasing $\lambda_{OA}$);
Advanced Filtration: using a higher-efficiency filter (increasing $\lambda_{filter}$);
UV Disinfection: installing UV disinfection lamps (increasing $\lambda_{UV}$);
Airflow: increasing recirculation rates so that air is cleaned (e.g., via ventilation, filtration, and UV disinfection) more frequently (increasing f); and
Occupancy Control: reducing the number of individuals allowed in the space (decreasing S).

Filtration or UV lights (e.g., disinfection devices) can be applied, generally, in two different ways or according to two different form factors. For example, filtration or disinfection devices can be positioned centrally in the HVAC system (e.g., within an air-handler or a rooftop unit), as described in greater detail above with reference to FIGS. 1-10. The filtration or UV lights can also be implemented as a separate device that is positioned in the building 10 or within a room or space of the building 10. These devices may be free to operate, completely independently, of the HVAC system. In some embodiments, such devices are permanently installed within the space. In some embodiments, such devices are portable and may be installed or removed in the spaces. For example, a MACH 10 is an example of a permanently installed fan filter unit that operates in the zone, independently of any HVAC system, to provide filtration. Similarly, an UVC troffer is an example of a permanently mounted or installed UV disinfection tunnel that is mounted in the zone. Additionally, a portable air filter unit can be used.

Using the equations shown above, infection model manager 1112 can quantify an effect that these seven approaches have on infection transmission. In some embodiments, infection model manager 1112 receives user inputs from user interface device 1110 to determine the infection probability P and/or the reproductive number R. In some embodiments, the user inputs obtained from user interface device 1110 include any of:
- whether occupants are required to wear masks;
- an increased ventilation;
- whether advanced filtration is used, or which filter is selected;
- whether UV disinfection is used;
- increased recirculation rates so that the air is cleaned more frequently;
- occupancy control data (e.g., a reduced capacity);
- an average airflow (e.g., percent of the design airflow of the equipment);
- a supply airflow (e.g., in CFM);
- a ventilation rate (e.g., a percent of outdoor air);
- a filter rating of a selected filter;
- a UVC kill tunnel effectiveness (e.g., between 0% and 100% or between 0 and 1);
- a UVC troffer percentage;
- a MACH 10 fan filter percentage;
- occupancy data such as:
  - a total number of occupants in the space (e.g., in building 10 or in a room or space of building 10);
  - a probability of an individual becoming sick;
  - a number of sick individuals in the building 10 (e.g., assumed to be 0.5 by default);
  - an exposure time (e.g., an expected number of hours per day that an individual is expected to be within the building 10);
  - an occupancy start time of the building 10;
  - an occupancy end time of the building 10; and
  - a number of days per week that building 10 is occupied;
- building location data such as:
  - what city in which the building 10 is located;
  - a balance point at the location of building 10;
  - an occupancy category of the space or of building 10 (e.g., per ASHRAE 62.1);
  - space size information (e.g., area and/or ceiling height);
- equipment data such as:
  - a design airflow rate;
  - a cooling coefficient of performance (COP);
  - a gas heating efficiency;
  - a supply fan mechanical efficiency;
  - a supply fan electrical efficiency; and
- energy cost data such as:
  - electricity costs (e.g., in $/kWh); and
  - natural gas costs (e.g., in $/MMBTU).

In some embodiments, infection model manager 1112 is configured to use the user inputs to estimate or predict the effect of the various inputs on infection transmission. These effects can then be weighted against the extra costs that are incurred.

In some embodiments, the mask effectiveness y is provided to infection model manager 1112 as a user input (e.g., provided by the user through user interface device 1110). In some embodiments, if occupants are not required to wear a mask, or if none of the occupants are wearing masks, then $\mu = \mu_{infectious} = \mu_{susceptible} = 0$. When two different populations (e.g., infectious individuals and susceptible individuals) are wearing a same type of mask, it is expected that $\mu_{infectious} > \mu_{susceptible}$ (e.g., that the mask is more effective in preventing infectious particles from being exhaled by the infectious population than in preventing particles from being inhaled by the susceptible individuals). This may occur because infectious particles can tend to be exhaled in agglomerates of smaller particles, which therefore have a larger effective size, which can be trapped by the masks. However, once these agglomerates become airborne, the agglomerates may split into smaller individual particles that can pass through cloth masks. In some embodiments, infection model manager 1112 assumes that the quanta generation rate q is between 60 quanta/hour and 185 quanta/hour. In some embodiments, the quanta generation rate q is a predetermined or predefined value, a user input value, or a value that is obtained based on data from a health organization. In some embodiments, the inhalation rate is assumed to be 0.67 m³/hour, which falls between suggested values for sedentary and light-intensity activity in adults. In some embodiments, infection model manager 1112 is configured to adjust the inhalation rate based on building-specific age distributions (e.g., a school for children versus a nursing home for elderly), or based on an expected activity in building 10.

In some embodiments, the exposure time t is an adjustable parameter with a default value of 7 hours. The exposure time t represents a period over which the infection probability P is calculated. For the purposes of calculating the reproductive number R, the exposure time t may be equal to a latent infectious period of each infectious individual (e.g., an amount of time that the infectious individuals are actively contagious and present in the building 10 or the occupied space). For example, standard influenza individuals are infectious for 1 day prior to onset of symptoms and for 5 to 7 days after symptoms develop. Therefore, assuming that infectious individuals may stay home once symptoms develop, the appropriate latent period may be 6 hours to 8 hours for the standard influenza, corresponding to an amount of time that the individual remains in building 10 during their asymptomatic period. For COVID-19, a total contagious period may last 10 to 14 days. In some embodiments, infection model manager 1112 assumes that a latent period of 1 day for COVID-19, as would be suitable for influenza, but may adjust the latent period based on additional information indicating an amount of time that individuals with COVID-19 are infectious.

For the airflow f, infection model manager 1112 can use an adjustable fraction of a design airflow of the installed system. Design flows for specific systems are expressed in cubic feet per meter (cfm), with general guidelines in cfm per square foot, according to some embodiments. These design values give a maximum possible value for f, with the default value generally between 40% and 50% of the upper limit, according to some embodiments.

In some embodiments, the fractional disinfection λ includes three components for outdoor-air ventilation, advanced filtration, and UV irradiation. For the outdoor-air term, $\lambda_{OA}$ is simply the fraction of recirculated air that is drawn in from outside (and thus a corresponding amount of the return air is exhausted). A minimum value of the outdoor-air term $\lambda_{OA}$ is determined as a function of the total flow f and minimum ventilation requirements per ASHRAE Standard 62.1, according to some embodiments. In some embodiments, a maximum value of the outdoor-air term $\lambda_{OA}$ is 1. For filtration, $\lambda_{filter}$ is determined by infection model manager 1112 based on the filter type, with values ranging from approximately 0.4 (e.g., for a MERV-7 filter) to 0.999 (e.g., for a HEPA filter), according to some embodiments. Manufacturer data may provide particle-size-dependent filtration efficiencies, from which a weighted average is calculated by infection model manager 1112 using the size distribution for the relevant infectious particles, according to some embodiments. Finally, for UV irradiation, $\lambda_{UV}$ is an adjustable value, since UV intensity can be adjusted based on duct size and average velocity to deliver a lethal dose, according to some embodiments.

For the deposition rate $k_{deposition}$, infection model manager 1112 uses a range of 1.0 $hr^{-1}$ to 2.7 $hr^{-1}$ with a mean of 1.7 $hr^{-1}$, according to some embodiments. These are weighted values for influenza based on typical size distributions for human expired aerosols, according to some embodiments. These values can be updated when more information for COVID-19 becomes available, according to some embodiments. In some embodiments, for $k_{deactivation}$, infection model manager 1112 currently uses a default value of 0 $hr^{-1}$ so that the calculations are robust to the case of long lifetimes. COVID-19 may have half-lives ranging from 1.1 hr to over 15 hrs, which correspond to $k_{deactivation}$ of 0.63 $hr^{-1}$ and 0.058 $hr^{-1}$ respectively.

The volume of the space, V, is calculated (e.g., by infection model manager 1112) from a specified floor area (e.g., square footage) and height (e.g., ceiling height), according to some embodiments. In some embodiments, the floor are and/or the height are input by the user via user interface device 1110. A maximum value for the total number of susceptible individuals, S, is calculated by infection model manager 1112 based on the floor area using standard occupant densities based on a building type from ASHRAE Standard 62.1, according to some embodiments. In some embodiments, the maximum value can be reduced by infection model manager 1112 based on an imposition of tighter occupancy limits (e.g., provided as a user input). In some embodiments, the number of infectious individuals I is assumed to be 1 by infection model manager 1112, to yield the highest value of the reproductive number R.

In some embodiments, infection model manager 1112 is configured to use the above equations based on user inputs in real-time or near real-time to determine the probability of infection. In some embodiments, infection model manager 1112 is configured to determine multiple different probabilities of infection for different options (e.g., different sets of user inputs). Infection model manager 1112 outputs the probability of infection (or the multiple probabilities of infection) to display manager 1118, so that the probabilities of infection can be displayed on display screen 1120 for the different options.

Referring still to FIG. 11, infection control tool 1102 includes cost model manager 1114 and energy manager 1116 that are configured to estimate cost (e.g., monetary cost) and/or energy consumption based on user inputs provided by user interface device 1110. Similarly to infection model manager 1112, cost model manager 1114 and energy manager 1116 can determine costs and energy consumption for multiple different options (e.g., different sets of user inputs).

To assess a cost of a particular disinfection strategy, cost model manager 1114 and/or energy manager 1116 may consider energy costs associated with heating, cooling, running fans, in addition to a replacement cost of chosen filters. In some embodiments, all values are calculated by cost model manager 1114 and energy manager 1116 on an annualized basis.

In order to estimate heating and cooling costs, cost model manager 1114 and/or energy manager 1116 may use heating degree days and cooling degree days. Heating degree days and cooling degree days are calculated (e.g., by cost model manager 1114 or energy manager 1116) as:

$$D_{heating} = \delta \sum_t \max(\bar{T} - T_{OA}(t), 0)$$

-continued
$$D_{cooling} = \delta \sum_t \max(T_{OA}(t) - \bar{T}, 0)$$

where $T_{OA}(t)$ is an outdoor air temperature at time t, $\bar{T}$ is a chosen balance temperature (generally 65° F.), and δ is a discretization frequency for the ambient temperature data (1 hr in the case of hourly typical meteorological year data).

In some embodiments, energy manager 1116 is configured to calculate incremental energy cost that results from various infection measures taken or proposed to be taken. In some embodiments, energy manager 1116 is configured to estimate additional energy costs resulting from additional ventilation. Energy manager 1116 may calculate heating energy using the equation:

$$E_{heating} = \lambda_{ventilation} V \rho_{air} C_{p,air} HDD \left(\frac{1}{\eta_{heating}}\right) \alpha$$

where $E_{heating}$ is energy required for heating (e.g., in MJ, assuming fuel is natural gas), $\rho_{air}$ is the density of air (e.g., 1.2 kg/m³), $C_{p,air}$ is specific heat capacity of air (e.g., in 1000 J/(kg-K)), HDD is heating degree days during times of building operation (e.g., K-days, or $D_{heating}$), $\eta_{heating}$ is conversion efficiency of heating equipment used, and $\alpha$ is a unit conversion factor (e.g., 24 hours/day×$10^{-6}$ MJ/J).

In some embodiments, an amount of energy required for cooling on an annual basis is calculated similarly using the equation:

$$E_{cooling} = \lambda_{ventilation} V \rho_{air} C_{p,air} CDD \left(\frac{1}{\eta_{cooling}}\right) \beta$$

where $E_{cooling}$ is the electricity required for cooling (e.g., in kWh), $\eta_{cooling}$ is electric efficiency of the cooling equipment, CDD are cooling degree days during times of building operation (e.g., K-days or $D_{cooling}$), and $\beta$ is a units conversion factor (e.g., 24 hours/day×0.277 kWh/MJ×$10^{-6}$ MJ/J).

For fan energy, energy manager 1116 can use a model:

$$E_{fan} = \frac{1}{\eta_{fan}} (\Delta P_0 + \Delta P_{filter}) \delta \sum_t \alpha_{fan}(t)$$

where $\eta_{fan}$ is an overall fan efficiency (e.g., assumed to be equal to 0.5), $\Delta P_0$ is a base fan pressure drop equal to XXXXX Pa, $\Delta P_{filter}$ is an additional pressure drop due to the filter (e.g. filter 308, which varies by type of filter), and $\alpha_{fan}(t)$ is a fractional fan airflow as a function of time. The value of $\alpha_{fan}(t)$ is given as:

$$\alpha_{fan}(t) = \begin{cases} 1 & \text{if occupied at time } t \\ 0.5 & \text{else} \end{cases}$$

according to some embodiments.

In some embodiments, it is assumed that the fan airflow is equal to f when the building (e.g., building 10) is occupied and equal to half of f when unoccupied. It should be noted that the filter pressure drop $\Delta P_{filter}$ may vary over a life of the filter, but since the relationship is a linear function of time, infection control tool 1102 can use the average value and assume it is constant. In order to determine a resulting cost, $E_{fan}$ is multiplied by the fan energy cost $\phi_{fan}$, which is just the mean electricity price. In some embodiments, the resulting cost is determined by cost model manager 1114.

Energy consumption associated with UV irradiation is calculated as:

$$E_{UV} = \epsilon_{UV} \lambda_{UV} \delta \sum_t \alpha_{UV}(t)$$

according to some embodiments. In some embodiments, $\epsilon_{UV}$ is a scale factor to convert from the disinfection fraction $\lambda_{UV}$ to the required energy consumption, which is taken as XXXXX kW. Similar to the fan case, $\alpha_{UV}(t)$ is the fractional use of the UV lamps as a function of time, taken as:

$$\alpha_{UV}(t) = \begin{cases} 1 & \text{if occupied at time } t \\ 0 & \text{else} \end{cases}$$

according to some embodiments. The above values of $\alpha_{UV}(t)$ indicate that the UV lamps are only operated during occupied hours, according to some embodiments. The associated energy cost is calculated as the product of $E_{UV}$ and its energy price $\phi_{UV}$, which is equal to the electricity price.

Finally, cost associated with filters is calculated using a mean lifetime $\tau_{filter}$ that is roughly constant across filter types, according to some embodiments. Thus, over the course of a year:

$$M_{filter} = \frac{t_{year}}{\tau_{filter}}$$

according to some embodiments. In some embodiments, filters must be purchased, each at a unit cost of $\phi_{filter}$ that varies significantly with filter type and is taken from manufacturer's data.

In some embodiments, the overall annual operating cost is determined by cost model manager 1114 using:

Annual Cost=Cost$_{annual}$=$\phi_{heating}E_{heating}$+
$\phi_{cooling}E_{cooling}$+$\phi_{fan}E_{fan}$+$\phi_{UV}E_{UV}$+$\phi_{fiber}M_{filter}$ with the various terms calculated by cost model manager 1114 and/or energy manager 1116 as described herein. Similarly, energy manager 1116 can calculate an annual energy usage:

Annual Energy=$E_{annual}$=$E_{heating}$+$E_{cooling}$+$E_{fan}$+$E_{UV}$ according to some embodiments.

Referring still to FIG. 11, memory 1108 includes display manager 1118, according to some embodiments. In some embodiments, display manager 1118 is configured to receive or obtain results of infection model manager 1112, cost model manager 1114, and energy manager 1116 and generate display data or control signals for display screen 1120. In some embodiments, the results include an infection probability P (e.g., as determined by infection model manager 1112), an annual cost (e.g., as determined by cost model manager 1114), and estimated energy consumption (e.g., as determined by energy manager 1116). In some embodiments, display manager 1118 is configured to receive the results from infection model manager 1112, cost model manager 1114, and energy manager 1116 for multiple options of infection control (e.g., different sets of user inputs provided via user interface device 1110), and operate display screen 1120 to display the results for the different options. In this way, a user can compare different potential approaches (e.g., from a cost, energy, and/or infection probability perspective) to determine a best solution.

In some embodiments, infection control tool 1102 receives the user inputs for different potential options to control infection spread, calculates the infection probability, annual cost, annual energy consumption, etc., for each of the different options, and operates display screen 1120 to display the results of infection model manager 1112, cost model manager 1114, and energy manager 1116. When a user adjusts one or more user inputs for one or more of the different options, infection control tool 1102 can automatically re-perform its functionality to determine updated results (e.g., updated values of the infection probability, the energy consumption, and/or the cost), and may operate display screen 1120 to provide the updated results to the user. In this way, a user can adjust different settings of the various options to determine a desired solution for infection control.

In some embodiments, cost model manager 1114 is configured to estimate an incremental cost that is incurred by an infection control strategy relative to a baseline cost (e.g., an annual cost, assuming no steps are taken to address infection control). In some embodiments, cost model manager 1114 is configured to provide the incremental cost for each of the options to display manager 1118.

User Interfaces

Referring now to FIGS. 12-19, various user interfaces or display data is shown, according to some embodiments. In some embodiments, the display data (e.g., the graphs, tables, charts, etc.) shown in FIGS. 12-19 can be provided on display device 1120 (e.g., by display manager 1118).

Figure 12:
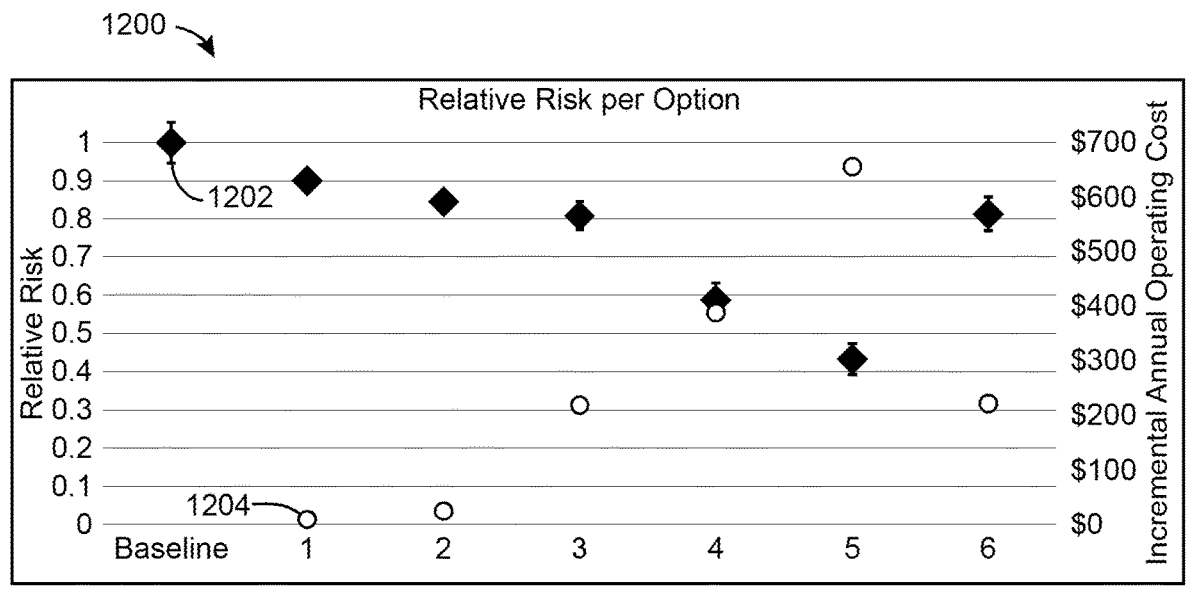
FIG. 12 is a graph showing relative risk and incremental operating costs for a baseline scenario, and six other scenarios for infection control, according to some embodiments.

Referring particularly to FIG. 12, a graph 1200 illustrating relative risk and incremental annual operating cost for different options is shown, according to some embodiments. In some embodiments, graph 1200 is provided to a user on display screen 1120 (e.g., by infection control tool 1102). Graph 1200 includes a series 1202 that illustrates relative risk for a baseline scenario, and six other scenarios (e.g., as input by the user via user interface device 1110), according to some embodiments. Graph 1200 also includes a series 1204 that illustrates incremental annual operating cost for the baseline scenario and the six other scenarios. In some embodiments, the relative risk a ratio between an infection probability P for the baseline and an infection probability P for each of the different options (e.g., options 1-6, as illustrated on the X-axis of graph 1200). In some embodiments, each data point of the series 1204 includes a value and error bars illustrating uncertainty in the value. The error bars can be determined by infection model manager 1112. In some embodiments, the error bars illustrate Series 1204 illustrates the incremental cost incurred for each of the different options to affect infection control, according to some embodiments. In some embodiments, the incremental cost is determined by cost model manager 1114 using the techniques described above for each of the different options (e.g., options 1-6).

Figure 13:
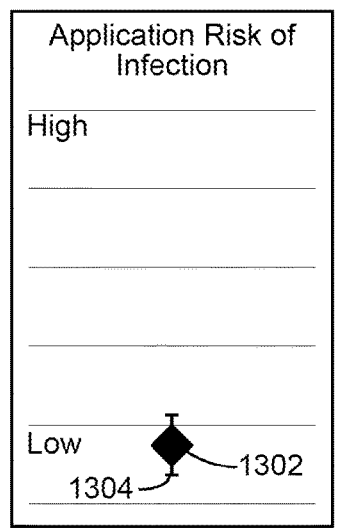
FIG. 13 is a graph of an application risk of infection for a baseline scenario of a building, according to some embodiments.

Referring now to FIG. 13, a graph 1300 shows an application risk of infection, according to some embodiments. Graph 1300 can be displayed on display screen 1120. Graph 1300 includes a data point 1302 illustrating an average or mean infection probability for the baseline scenario, according to some embodiments. For example, infection model manager 1112 can determine an infection probability for building 10, assuming that no precautions are taken to address the spread of infection. Data point 1302 also includes error bars 1304, according to some embodiments. In some embodiments, error bars 1304 illustrate an uncertainty, standard deviation, or σ value associated with the infection probability for the baseline scenario. In some embodiments, the error bars 1304 are calculated by infection model manager 1112 (e.g., an uncertainty associated with the infection probability for the baseline scenario).

Graph 1300 can include an axis illustrating a range from a high risk of infection to a low risk of infection. This can provide the user with information so that the user knows if additional precautions should be taken to control infection spread.

Referring particularly to FIG. 14, a user interface 1400 is shown, through which a user can input various data for infection control tool 1102 to perform its respective functionality, according to some embodiments. User interface 1400 can be provided on display screen 1120 and/or user interface device 1110 (which may be a same device, or different components of a same device). User interface 1400 illustrates information that can be provided to and received from the user regarding occupancy, according to some embodiments. Specifically, the user may input a total number of people that are present in the space (e.g., in building 10). In some embodiments, the probability of an individual being sick is 1% by default (as shown) but may be updated or adjusted by the user. In some embodiments, a number of sick people (as shown in FIG. 14) is a value that is calculated by infection model manager 1112 based on the number of people in the space and a probability of an individual being sick (e.g., by multiplying these two values).

In some embodiments, the user may also input an exposure time (e.g., an amount of time that each individual is expected to occupy the building). In some embodiments, the exposure time (e.g., exposure time t) can be adjusted by the user based on an expected occupancy time of the building occupants, or based on a type of space or building. For example, at a workout facility or a gym, an occupant may be expected to spend, on average, an hour in the building 10. However, if the building 10 is an office, the occupant may be expected to spend, on average, 8 hours at the office, daily. Likewise, if building 10 is a law firm, the occupant may be expected to spend, on average, 12 hours at the law firm, daily.

In some embodiments, the user may also input an indication of whether or not masks are required in the building 10 via user interface 1400. In some embodiments, when a user updates one or more of the inputs of user interface 1400 as described herein with reference to FIG. 14, infection control tool 1102 may automatically update any of the calculated values of user interface 1400 (e.g., the number of sick individuals), or any of the other user interfaces described herein (e.g., user interface 1500 as described with reference to FIG. 15 below).

Referring still to FIG. 14, user interface is shown to include a different set of occupancy data (both input data and calculated data) for six different options. The user may adjust any of the total number of people in the space, the probability of an occupant being sick, an exposure time, or whether masks are required, in any combination for each of the six different options. In this way, the user may adjust and view the effect of the adjustments for the different options.

Referring now to FIG. 15, a user interface 1500 is shown that can be displayed to the user (e.g., via display screen 1120) and through which a user may input various information for the baseline scenario and/or any of the six different options. In some embodiments, user interface 1500 is displayed on display screen 1120 simultaneously with user interface 1400. For example, the baseline and the six different options of user interface 1400 may be the same baseline and six different options of user interface 1500.

User interface 1500 includes fields for an average airflow (e.g., a % of a design airflow) for the building 10, a supply airflow (e.g., in CFM), a CFM per square foot of the building 10, a ventilation rate (e.g., a % of outdoor air), a ventilation airflow (e.g., in CFM), a percentage of ASHRAE 62.1, a filter rating, a UVC kill tunnel effectiveness, a UVC troffer percentage, and a MACH 10 fan filter, for each of the baseline and the six different options. In some embodiments, the average airflow, the supply airflow, the ventilation rate, the filter rating, the UVC kill tunnel effectiveness, the UVC troffer percentage, and the MACH 10 fan filter fields, are all input fields that are configured to receive a user input (e.g., be populated by a user) for any of the baseline and/or the six different options. In some embodiments, the supply airflow is used as an input for pressure drop calculations that do not use a design airflow. In some embodiments, the ventilation rate (e.g., the % of outdoor air) is an absolute percentage of outdoor air that is used. In some embodiments, the CFM per square foot of the building 10, the ventilation airflow, and the percentage of ASHRAE 62.1 fields are calculated fields based on user inputs. In some embodiments, the CFM per square foot of the building 10 is equal to the supply airflow in CFM (input by the user) divided by a square footage or footprint of the space of building 10.

In some embodiments, the percentage of ASHRAE 62.1 is an output field that displays a calculated percentage of currently considered airflow relative to ASHRAE 62.1 standard. In some embodiments, a user may adjust the ventilation rate (the % of outdoor air) to increase the percentage of ASHRAE 62.1 (e.g., to drive the percentage of ASHRAE 62.1 to 100% so that the ASHRAE standard is satisfied). In some embodiments, the percentage of ASHRAE 62.1 is a ratio between the ventilation airflow and a ventilation airflow set by ASHRAE 62.1 standard based on the occupancy of building 10 (e.g., as input via user interface 1400).

The filter rating, the UVC kill tunnel effectiveness, the UVC troffer percentage, and the MACH 10 fan filter fields indicate different approaches that can be implemented to control infection spread, according to some embodiments. However, such approaches are not exhaustive and are shown for illustrative purposes. The user may select a different filter rating for each of the six options. In some embodiments, infection model manager 1112 is configured to use or include a filter database that includes various parameters of different rated filters. In some embodiments, infection model manager 1112 can use the different filter ratings for the six different options to determine the infection probability for each of the six options (e.g., as illustrated in graph 1200).

Referring now to FIG. 16, a user interface 1600 is shown, according to some embodiments. In some embodiments, user interface 1600 is displayed on display screen 1120. In some embodiments, user interface 1600 is not displayed on display screen 1120 but may be displayed in response to receiving a user request to view user interface 1600. In some embodiments, user interface 1600 is not displayed to a user, but is shown and described herein for illustrative purposes to describe the functionality of infection control tool 1102.

Referring still to FIG. 16, user interface 1600 is shown to include fields for infection risk results, an average infection risk, an uncertainty of an infection risk (e.g., a standard deviation), a 95% confidence interval of the infection risk, an average ratio, an uncertainty of the ratio (sigma), a 95% confidence interval of the ratio, and various cost fields, according to some embodiments. In some embodiments, the cost fields include fields for ventilation costs, filter costs, UVC kill tunnel costs, UVC troffer costs, MACH 10 costs, and total costs. Each of the fields described herein are included for the baseline, and each of the six different options.

In some embodiments, the infection risk results are determined by dividing the average infection risk (shown in FIG. 16) by the probability of an individual being sick (shown in user interface 1400 of FIG. 14). The infection risk results can be determined (for each of the baseline and six different options, by infection model manager 1112).

In some embodiments, the average infection risk is the infection probability P as determined by infection model manager 1112. In some embodiments, infection model manager 1112 is configured to determine an average of multiple infection probabilities P that are obtained using a random seed generation technique, and an expected average quanta (e.g., 122.5 for COVID-19) and an expected uncertainty of the average quanta (e.g., 31.88 for COVID-19). In some embodiments, the expected average quanta and the expected uncertainty of the average quanta are values that are predetermined or stored in infection model manager 1112 (e.g., based on research for a particular disease).

Infection model manager 1112 can use a random seed generator to estimate a normalized distribution for the quanta (e.g., multiple values of the quanta for COVID-19 or any other disease, the multiple values having an average of the expected average quanta, and an uncertainty of the expected uncertainty of the quanta). Infection model manager 1112 may similarly use the random seed technique to generate multiple pulmonary vent rates (e.g., the inhalation rate p), and multiple deposition rates (e.g., the deposition rate for infectious particles onto surfaces, $k_{deposition}$), each of which form a normal distribution, with a mean or average at an expected value and a distribution (e.g., a standard deviation) at an expected uncertainty. For example, an expected average pulmonary vent rate (e.g., the inhalation rate p) may be 3 cubic meters per hour, with an expected uncertainty or standard deviation of 0.13 cubic meters per hour. Likewise, the deposition rate $k_{deposition}$ may have an expected average value of $1.65 \text{ hr}^{-1}$, with an expected uncertainty of $0.33 \text{ hr}^{-1}$.

Infection model manager 1112 can use the multiple values of the quanta q, the multiple pulmonary vent rates (e.g., p), and the multiple deposition rates $k_{deposition}$ to determine multiple values of the infection probability P. These multiple values of the infection probability P can then be averaged by infection model manager 1112 to determine the average infection risk (shown in user interface 1600 of FIG. 16). The multiple values of the infection probability P can also be used by infection model manager 1112 to determine the standard deviation of the average infection risk. In some embodiments, infection model manager 1112 also uses the standard deviation of the average infection risk to determine a 95% confidence interval for the average infection risk.

Infection model manager 1112 can also determine a ratio between the baseline average infection risk (e.g., the infection probability P for the baseline conditions, determined using the random seed technique described herein) and the infection risk for each of the different options. In some embodiments, infection model manager 1112 determines the ratio for each of the six options, in addition to an uncertainty (or standard deviation) for each of the ratios of the six options, and a 95% confidence interval of the ratios for each of the six options. In some embodiments, the 95% confidence intervals for the ratios of the six different options are the error bars for series 1202 as shown in graph 1200 of FIG. 12.

Cost model manager 1114 can be configured to determine incremental costs for ventilation, filtration, UVC kill tunnel, UVC troffer, and MACH 10, as shown in FIG. 16. In some embodiments, these fields show incremental cost (e.g., additional cost incurred) for using ventilation, filtration, UVC kill tunnel, UVC troffer, or MACH 10 relative to baseline costs for each of the six different options. In some embodiments, cost model manager 1114 is also configured to determine a total cost (e.g., a total additional cost incurred) for each of the six different options (e.g., by summing the additional costs incurred from ventilation, filtration, the UVC kill tunnel, the UVC troffer, or the MACH 10). In some embodiments, the total cost (shown at the bottom row of user interface 1600) is plotted as series 1204 on graph 1200.

Referring particularly to FIG. 17, another user interface 1700 to allow a user to input various building, occupancy, equipment setup, and energy cost data is shown, according to some embodiments. User interface 1700 can be displayed by display screen 1120. In some embodiments, the user may input a city in which building 10 is located, a balance point, an occupancy category of building 10 (per ASHRAE 62.1), an area (e.g., square footage or footprint) of building 10, and a ceiling height of building 10. In some embodiments, infection control tool 1102 can use the provided building data to determine a volume of the building 10 (as shown). In some embodiments, user interface 1700 allows a user to input an occupancy start time of day, an occupancy end time of day, and a number of days per week that building 10 is occupied. In some embodiments, user interface 1700 also allows a user to input a design airflow rate of equipment of building 10, a cooling coefficient of performance, a gas heating efficiency, a supply fan mechanical efficiency, and a supply fan electrical efficiency. In some embodiments, user interface 1700 also allows a user to input various energy costs, such as electricity energy costs, and natural gas energy costs. Infection control tool 1102 can calculate the volume of building 10, ASHRAE 62.1 default occupancy, occupant density, supply airflow, and various ASHRAE 62.1 variables (such as Rp, Ra, and vent floor), as shown on user interface 1700.

Referring particularly to FIG. 18, a user interface 1800 is shown. User interface 1800 can similarly be displayed on display screen 1120. User interface 1800 includes various Wells-Riley variables, such as the quanta generation rate for a particular disease (e.g., the expected average value of q used in the random seed technique, which may be 122.5 for COVID-19), an average pulmonary vent rate (e.g., the expected average value of p used in the random seed technique, which may be 3.00 or adjusted based on expected occupant activity), and various ventilation costs.

Referring particularly to FIG. 19, a user interface 1900 is shown that can be similarly displayed on display screen 1120. User interface 1900 includes various design data that is provided by a user. The design data may include a design airflow (e.g., in CFM or cubic meters per second), a filter area, and/or a face velocity. In some embodiments, user interface 1900 also includes a number of filters, an expected filter life, a fraction of a day that building 10 is occupied, a number of weeks that building 10 is expected to be occupied, a number of days per week that building 10 will be occupied, and a total amount of time that building 10 will be occupied.

Referring particularly to FIGS. 21 and 22, user interface 2100 and 2200 are shown, according to some embodiments.

In some embodiments, user interfaces 2100 and 2200 show filter data for various rated filters (e.g., MERV 8, MERV 11, and MERV 13). In some embodiments, infection model manager 1112 is configured to store various filter data for different rated filters, so that the filter data can be retrieved when the user inputs or selects a filter rating. In some embodiments, the filter efficiency (e.g., the average and/or the sigma) are provided as user inputs for the different rated filters.

Referring now to FIG. 23, table 2300 shows the random seed technique that is used to generate the infection probability, according to some embodiments. Specifically, table 2300 includes an expected mean value for the quanta generation (e.g., 122.5, assuming COVID-19), and an expected uncertainty (e.g., sigma) for the quanta generation (e.g., 31.88 . . . ). Table 2300 also includes a mean or expected value of the pulmonary vent rate (e.g., 3 cubic meters per hour), and an expected uncertainty (e.g., sigma) for the pulmonary vent rate (e.g., 0.1279 as shown). Similarly, table 2300 includes an expected or average value of $k_{deposition}$ (e.g., 1.65) and an expected uncertainty or standard deviation of $k_{deposition}$ (e.g., 0.3316). In some embodiments, a random seed technique is used to generate quanta data sets 2302, pulmonary vent rate data sets 2304, and $k_{deposition}$ data sets 2306. These sets 2302-2306 (shown in FIG. 23) can then be used to calculate or estimate an infection probability set 2308. In some embodiments, the infection probability set 2308 is calculated by infection model manager 1112 using the sets 2302-2306 that are generated by infection model manager 1112 using the random seed technique. Infection model manager 1112 can then use the infection probability set 2308 to determine an average infection probability (e.g., by averaging the infection probability set 2308).

FIG. 23 shows infection probability calculations using the random seed technique for a baseline scenario. Infection model manager 1112 can use similar techniques to calculate infection probability for each of the different scenarios and can determine a ratio between the average infection probability for the baseline scenario and the average infection probability of each of the other scenarios.

Referring particularly to FIG. 24, a table 2400 shows various parameters and their values that are used by energy manager 1116 and/or cost model manager 1114 to estimate ventilation or heating/cooling costs. The parameters shown in table 2400 include area (e.g., floor area), height (e.g., ceiling height), V (e.g., space volume), $\lambda_{vent}$ (e.g., additional ventilation), $C_{p,air}$ (specific heat of air), $\rho_{air}$ (density of air), $\eta_{heating}$ (heating efficiency) and $\eta_{cooling}$ (cooling efficiency), α, β, cost of electricity, and cost of gas. These parameters are used by cost model manager 1114 to determine heating and cooling cost.

Referring particularly to FIG. 25, table 2500 is shown to illustrate heating degree days, cooling degree days, heating cost, cooling cost, and total cost. In some embodiments, the heating cost and the cooling cost can be determined by cost model manager 1114 as described in greater detail above. In some embodiments, the heating degree days and the cooling degree days are stored in a database (e.g., for different locations) and are selected by infection control tool 1102 in response to the user providing an input that indicates a location of building 10. In some embodiments, the heating degree days and the cooling degree days for different locations are determined by infection model manager 1112 based on historical data (e.g., dry bulb and wet bulb temperatures over time). Examples of such historical data are shown in table 2600 of FIG. 26.

It should be understood that while the user interfaces described herein use a single baseline and six different options, any number of options may be used. For example, the user interfaces may include input/output fields for inputting or outputting any of the data described herein for more or less than six different options. Six options are shown for illustrative purposes only, but the systems and methods described herein should not be understood to be limited to only six options.

Process

Referring particularly to FIG. 20, a process 2000 for providing a user or a manager of a building with relevant information regarding potential options to control infection spread is shown, according to some embodiments. Process 2000 includes steps 2002-2018 and can be performed by infection control system 1100.

Process 2000 includes obtaining user input data for a baseline calculation and different infection control options (step 2002), according to some embodiments. In some embodiments, the user input data includes any of the user input data described herein and shown in FIGS. 14-19. For example, the user input data can include any of:
whether occupants are required to wear masks;
an increased ventilation;
whether advanced filtration is used, or which filter is selected;
whether UV disinfection is used;
increased recirculation rates so that the air is cleaned more frequently;
occupancy control data (e.g., a reduced capacity);
an average airflow (e.g., percent of the design airflow of the equipment);
a supply airflow (e.g., in CFM);
a ventilation rate (e.g., a percent of outdoor air);
a filter rating of a selected filter;
a UVC kill tunnel effectiveness (e.g., between 0% and 100% or between 0 and 1);
a UVC troffer percentage;
a MACH 10 fan filter percentage;
occupancy data such as:
  a total number of occupants in the space (e.g., in building 10 or in a room or space of building 10);
  a probability of an individual becoming sick;
  a number of sick individuals in the building 10 (e.g., assumed to be 0.5 by default);
  an exposure time (e.g., an expected number of hours per day that an individual is expected to be within the building 10);
  an occupancy start time of the building 10;
  an occupancy end time of the building 10; and
  a number of days per week that building 10 is occupied;
building location data such as:
  what city in which the building 10 is located;
  a balance point at the location of building 10;
  an occupancy category of the space or of building 10 (e.g., per ASHRAE 62.1);
  space size information (e.g., area and/or ceiling height);
equipment data such as:
  a design airflow rate;
  a cooling coefficient of performance (COP);
  a gas heating efficiency;
  a supply fan mechanical efficiency;
  a supply fan electrical efficiency; and
energy cost data such as:
  electricity costs (e.g., in $/kWh); and
  natural gas costs (e.g., in $/MMBTU).

In some embodiments, the user input data is obtained from a user via user interface device 1110.

Process 2000 includes using a random seed technique to generate data sets for a quanta of a disease, a pulmonary vent rate, and a deposition parameter (step 2004), according to some embodiments. In some embodiments, the data sets are generated to provide a normal distribution of each of the quanta, the pulmonary vent rate, and the deposition parameter. For example, the quanta of the disease may have a known or expected value (e.g., 122.5), and a known or expected uncertainty. Similarly, the pulmonary vent rate, and the deposition parameter may have known or expected average values and known or expected uncertainties. In some embodiments, the quanta of the disease is the variable q as described in the present disclosure. In some embodiments, the pulmonary vent rate is the variable p as described in the present disclosure. In some embodiments, the deposition parameter is the variable $k_{deposition}$ as described in the present disclosure. In some embodiments, step 2004 is performed by infection model manager 1112. In some embodiments, the quanta of the disease, the pulmonary vent rate, and the deposition parameter are provided by a third party service (e.g., the CDC) and are representative of current conditions or prevalence of an outbreak in a regional area, a national area, etc.

Process 2000 includes repeating step 2004 for each of the baseline calculation and the different infection control options (step 2006), according to some embodiments. In some embodiments, a data set is generated for each of the baseline calculation and the different infection control options, based on the user input data. Step 2006 can be performed by infection model manager 1112.

Process 2000 includes determining an average infection probability for each of the baseline calculation and the different infection control options using the data sets (step 2008), according to some embodiments. In some embodiments, step 2008 includes averaging a data set of infection probability values that are determined based on the data sets generated in step 2004. Step 2008 can be performed by infection model manager 1112.

Process 2000 includes determining a ratio between the average infection probability of the baseline scenario and each of the different infection control options (step 2010), according to some embodiments. In some embodiments, step 2010 is performed by infection control tool 1102.

Process 2000 includes operating a display to provide the ratios of each of the baseline calculation and the different infection control options to a user (step 2012), according to some embodiments. In some embodiments, step 2012 is performed by display manager 1118 and display screen 1120 based on the results of infection model manager 1112. In some embodiments, providing the ratios of each of the baseline calculation and the different infection control options includes providing a graph to the user via display screen 1120.

Process 2000 includes estimating an incremental cost relative to a baseline cost for each of the different infection control options (step 2014), according to some embodiments. In some embodiments, step 2014 is performed by cost model manager 1114. In some embodiments, step 2014 is performed by summing an estimated incremental ventilation cost, an incremental filtration cost, an incremental UVC kill tunnel cost, an incremental UVC troffer cost, and an incremental MACH 10 cost. In some embodiments, the incremental cost is determined using the equation Annual Cost=$Cost_{annual}$=$\phi_{heating}E_{heating}+\phi_{cooling}E_{cooling}+\phi_{fan}E_{fan}+\phi_{UV}E_{UV}+\phi_{filter}M_{filter}$.

Process 2000 includes operating a display to provide the incremental costs for each of the different infection control options (step 2016), according to some embodiments. In some embodiments, step 2016 is similar to step 2012. In some embodiments, step 2016 includes providing the incremental costs for each of the different infection control options on a graph (e.g., on the graph provided in step 2012).

Process 2000 includes reperforming steps 2002-2016 to update the displayed ratios and the displayed incremental costs to the user in real-time in response to changes in the user input data (step 2018), according to some embodiments. In some embodiments, steps 2002-2016 are reperformed in response to a user adjusting any of the user input data. Advantageously, this allows the displayed data (e.g., the displayed data provided in steps 2012 and 2016) to be updated or displayed in real-time when the user changes or adjusts the user input data.

Graphs

Figure 27:
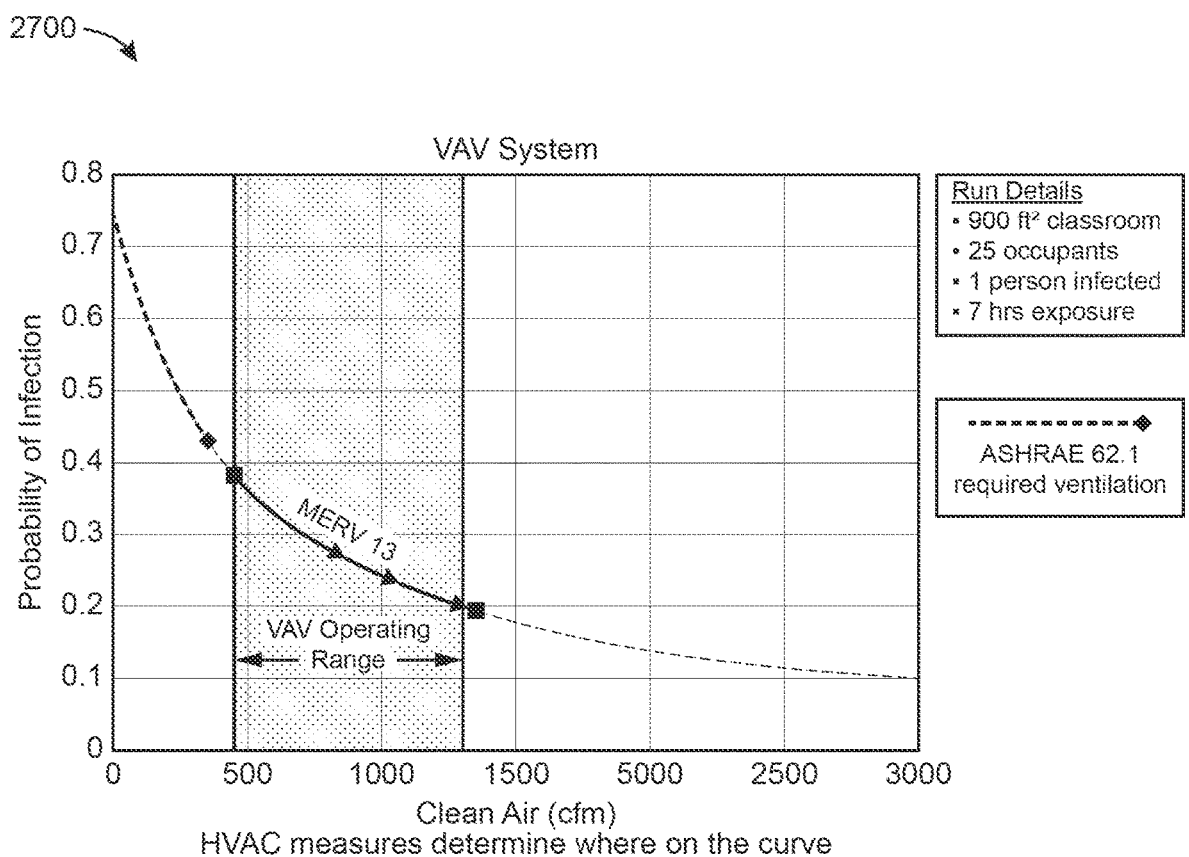
FIG. 27 is a graph showing probability of infection with respect to clean air airflow for an HVAC system that uses a MERV 13 filter, according to some embodiments.
Figure 28:
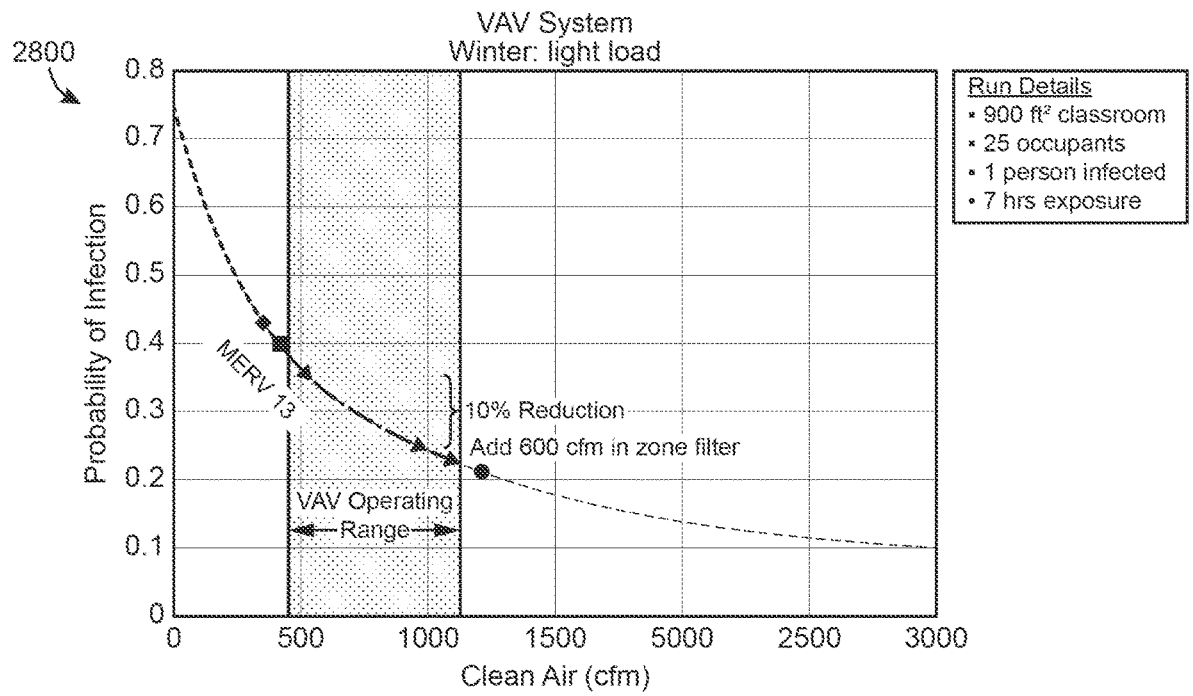
FIG. 28 is a graph showing probability of infection with respect to clean air airflow for an HVAC system that uses a MERV 13 filter and an in-zone filtration device during winter, according to some embodiments.
Figure 29:
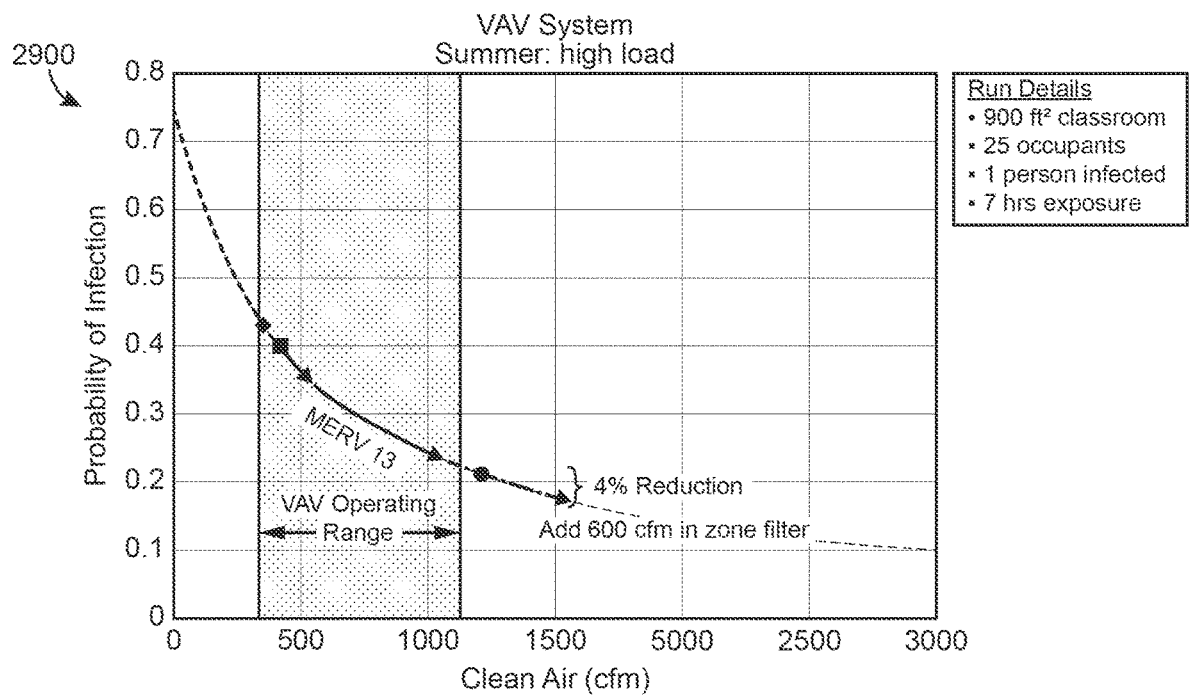
FIG. 29 is a graph showing probability of infection with respect to clean air airflow for an HVAC system that uses a MERV 13 filter and an in-zone filtration device during summer, according to some embodiments.

Referring now to FIGS. 27-29, graphs 2700-2900 illustrate an effect of using in-zone filtration devices. Graphs 2700-2900 show probability of infection (the Y-axis) with respect to clean air airflow rate in cfm (the X-axis), according to some embodiments. Graph 2700 illustrates an effect of using a MERV 13 filter that is positioned at an air handling unit of HVAC equipment, according to some embodiments. However, as shown in graphs 2800 and 2900 the probability of infection can be further reduced by adding an in-zone filtration device. For example, graphs 2800 and 2900 show the effect that a 600 cfm in-zone filtration device has, in addition to the MERV 13 filter that is positioned at the air handling unit. Graph 2800 shows that, during winter time, the in-zone filtration device can result in an additional 10% reduction in the probability of infection, according to some embodiments. Graph 2900 shows that, during summer time, the in-zone filtration device can result in an additional 4% reduction in the probability of infection.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. An infection control tool, the infection control tool comprising processing circuitry configured to:
    receive one or more inputs defining a configuration of an HVAC system for each of a baseline scenario and one or more other scenarios, the baseline scenario and the one or more other scenarios include different infection control techniques implemented with different types of infection control equipment installed at a building;
    construct optimization problems for the baseline scenario and the one or more other scenarios to optimize infection risk and at least one of energy consumption or operating cost;
    execute the optimization problems with a model of the building and one or more constraints of parameters controlled by operation of the infection control equipment to simulate the baseline scenario and the one or more other scenarios using the one or more inputs to estimate the infection risk and at least one of the energy consumption or the operating cost for each of the one or more other scenarios relative to the baseline scenario;
    generate user interface data configured to cause a display to provide the infection risk and at least one of the energy consumption or the operating cost to a user;
    update the simulation of the baseline scenario and the one or more other scenarios using user input received via the display adjusting a level of disinfection to operate the different types of the infection control equipment with over one or more time periods; and
    generate data to update the display to provide updated infection risk and at least one of updated energy consumption or t operating cost based on the update to the simulation;
    wherein the infection control tool implements at least one infection control technique via the HVAC system per a selection of the baseline scenario or the one or more other scenarios.

2. The infection control tool of claim 1, wherein the baseline scenario is a scenario when no additional measures are taken at the HVAC system to control a spread of an infectious disease within the building.

3. The infection control tool of claim 1, wherein the one or more other scenarios comprise the different infection control techniques to control a spread of an infectious disease within the building.

4. The infection control tool of claim 3, wherein the different infection control techniques comprise at least one of:
 a filtration technique;
 an ultraviolet technique to sterilize air provided to the building; or
 an outdoor air technique comprising drawing outdoor air to replace air within the building.

5. The infection control tool of claim 1, wherein the processing circuitry is configured to estimate the infection risk using a Wells-Riley equation.

6. The infection control tool of claim 3, wherein the one or more inputs define the different infection control techniques.

7. The infection control tool of claim 4, wherein the filtration technique is performed by a filtration device, wherein the filtration device is positioned either at an air handler of the HVAC system, or locally within a space of the building so that the filtration device operates independently of the HVAC system.

8. The infection control tool of claim 4, wherein the ultraviolet technique is performed by UV lights, wherein the UV lights are positioned either at an air handler of the HVAC system, or locally within a space of the building so that the UV lights operate independently of the HVAC system.

9. The infection control tool of claim 1, wherein the processing circuitry is configured to estimate the infection risk of the one or more other scenarios relative to the baseline scenario by:
 estimating an infection probability for the baseline scenario based on the one or more inputs and using a random seed technique;
 estimating an infection probability for each of the one or more other scenarios based on the one or more inputs and using the random seed technique; and
 comparing the infection probability for the baseline scenario to the infection probability for each of the one or more other scenarios to determine a ratio for each of the one or more other scenarios.

10. The infection control tool of claim 1, wherein estimating the infection risk comprises:
 using a random seed technique to generate data sets for each of an infectious quanta of a disease, a pulmonary vent rate, and a deposition parameter; and
 determining an average infection probability as the infection risk for each of the baseline scenario and the one or more other scenarios for the data sets.

11. The infection control tool of claim 10, wherein the deposition parameter comprises a deposition rate of airborne infectious particles onto a surface.

12. A method for controlling infection in a building, the method comprising
 receiving one or more inputs defining a configuration of an HVAC system for each of a baseline scenario and one or more other scenarios, the baseline scenario and the one or more other scenarios include different infection control techniques implemented with different types of infection control equipment installed at the building;
 constructing optimization problems for the baseline scenario and the one or more other scenarios to optimize infection risk and at least one of energy consumption or operating cost;
 executing the optimization problems with a model of the building and one or more constraints of parameters controlled by operation of the infection control equipment to simulate the baseline scenario and the one or more other scenarios using the one or more inputs to estimate the infection risk and at least one of the energy consumption or the operating cost for each of the one or more other scenarios relative to the baseline scenario;
 generating user interface data configured to cause a display to provide the infection risk and at least one of the energy consumption or the operating cost to a user;
 updating the simulation of the baseline scenario and the one or more other scenarios using user input received via the display adjusting a level of disinfection to operate the different types of the infection control equipment with over one or more time periods;
 generating data to update the display to provide updated infection risk and at least one of updated energy consumption or the operating cost based on the update to the simulation; and
 implementing at least one infection control technique via the HVAC system per a selection of the baseline scenario or the one or more other scenarios.

13. The method of claim 12, wherein the baseline scenario is a scenario when no additional measures are taken at the HVAC system to control a spread of an infectious disease within the building and wherein the one or more other scenarios comprise the different infection control techniques to control the spread of the infectious disease within the building.

14. The method of claim 12, wherein the different infection control techniques comprise at least one of:
 a filtration technique;
 an ultraviolet technique to sterilize air provided to the building; or
 an outdoor air technique comprising drawing outdoor air to replace air within the building.

15. The method of claim 14, wherein the filtration technique is performed by a filtration device, wherein the filtration device is positioned either at an air handler of the HVAC system, or locally within a space of the building so that the filtration device operates independently of the HVAC system.

16. The method of claim 14, wherein the ultraviolet technique is performed by UV lights, wherein the UV lights are positioned either at an air handler of the HVAC system, or locally within a space of the building so that the UV lights operate independently of the HVAC system.

17. The method of claim 12, wherein estimating the infection risk of the one or more other scenarios relative to the baseline scenario comprises:
 estimating an infection probability for the baseline scenario based on the one or more inputs and using a random seed technique;
 estimating an infection probability for each of the one or more other scenarios based on the one or more inputs and using the random seed technique; and
 comparing the infection probability for the baseline scenario to the infection probability for each of the one or more other scenarios to determine a ratio for each of the one or more other scenarios.

18. An infection control tool, the infection control tool comprising processing circuitry configured to:
 receive one or more user inputs defining a configuration of an HVAC system for each of a baseline scenario and one or more other scenarios, wherein the baseline scenario is a scenario when no additional measures are taken at the HVAC system to control a spread of an infectious disease and the one or more other scenarios are scenarios where different infection control techniques are implemented, the baseline scenario and the one or more other scenarios include the different infection control techniques implemented with different types of infection control equipment installed at a building;

construct optimization problems for the baseline scenario and the one or more other scenarios to optimize infection risk and at least one of an energy consumption or an operating cost;

execute the optimization problems with a model of the building and one or more constraints of parameters controlled by operation of the infection control equipment to simulate the baseline scenario and the one or more other scenarios using the one or more user inputs to estimate the infection risk and at least one of the energy consumption or the operating cost for each of the one or more other scenarios relative to the baseline scenario for a future time horizon;

operate a display to provide the infection risk and at least one of the energy consumption or the operating cost to a user;

update the simulation of the baseline scenario and the one or more other scenarios using user input received via the display adjusting a level of disinfection to operate the different types of the infection control equipment with over one or more time periods; and generate data to update the display to provide updated infection risk and at least one of updated energy consumption or the operating cost based on the update to the simulation;

wherein the infection control tool implements at least one infection control technique via the HVAC system per a selection of the baseline scenario or the one or more other scenarios.

19. The infection control tool of claim 18, wherein estimating the infection risk comprises:

using a random seed technique to generate data sets for each of an infectious quanta of a disease, a pulmonary vent rate, and a deposition parameter; and determining an average infection probability as the infection risk for each of the baseline scenario and the one or more other scenarios for the data sets.

20. The infection control tool of claim 19, wherein the deposition parameter comprises a deposition rate of airborne infectious particles onto a surface.

* * * * *